BLOCK DIAGRAM SYMBOL OF UNIT COMPUTER

INVENTORS
GORDON A. ERICKSON
RALPH A. HILEMAN
ERNEST G. MUTSCHLER
GERALD E. PICKERING
BY [signature]
ATTORNEY

DATA PROCESSING SYSTEM

Filed Aug. 24, 1962 27 Sheets-Sheet 2

LEGEND:

REGISTERS, AMPLIFIERS, AND TRANSLATORS

MODIFIER NETWORKS

| OP CODES | MNEMONIC INSTRUCTIONS | INSTRUCTION FUNCTIONS |
|---|---|---|
| 01 | Right SHift • Q | Shift (Q) Right by Y |
| 02 | Right SHift • Q | Shift (A) Right by Y |
| 03 | Right SHift • AQ | Shift (AQ) Right by Y |
| $04^{\Delta}$ | COMpare • A,• Q,• AQ | Sense (j); $(A)_i = (A)_f$ |
| 05 | Left SHift • Q | Shift (Q) Left by Y |
| 06 | Left SHift • A | Shift (A) Left by Y |
| 07 | Left SHift • AQ | Shift (AQ) Left by Y |
| 10 | ENTer • Q | $Y \rightarrow Q$ |
| 11 | ENTer • A | $Y \rightarrow A$ |
| 12 | ENTer • $B^n$ | $Y \rightarrow B^j$ |
| $13^*$ | EXternal - FunCTion • $C^n$ | $j^* \neq 0$ or 1, $(Y) \rightarrow C^{j^*}$, $j^* = 0$ or 1, (See Note, Fig. 5b) |
| 14 | SToRe • Q | $(Q) \rightarrow Y$; $k = 0$, $Q' \rightarrow Q$ |
| 15 | SToRe • A | $(A) \rightarrow Y$; $k = 4$, $A' \rightarrow A$ |
| 16 | SToRe • $B^n$ | $(B)^j \rightarrow Y$ |
| $17^*$ | SToRe • $C^n$ | $(C)^{j^*} \rightarrow Y$ |
| 20 | ADD • A | $(A) + Y \rightarrow A$ |
| 21 | SUBtract • A | $(A) - Y \rightarrow A$ |
| 22 | MULtiply | $(Q)Y \rightarrow AQ$ |
| $23^{\Delta}$ | DIVide | $(AQ)/Y \rightarrow Q$. $R \rightarrow A_f$ |
| 24 | RePLace • A + Y | $(A) + (Y) \rightarrow Y$ & A |
| 25 | RePLace • A − Y | $(A) - (Y) \rightarrow Y$ & A |
| $26^{\Delta}$ | ADD • Q | $(Q) + Y \rightarrow Q$. $(A)_i = (A)_f$ } j interpretation |
| $27^{\Delta}$ | SUBtract • Q | $(Q) - Y \rightarrow Q$. $(A)_i = (A)_f$ } reversed for A & Q |
| 30 | ENTer • Y + Q | $Y + (Q) \rightarrow A$ |
| 31 | ENTer • Y − Q | $Y - (Q) \rightarrow A$ |
| 32 | SToRe • A + Q | $(A) + (Q) \rightarrow Y$ & A |
| 33 | SToRe • A − Q | $(A) + (Q) \rightarrow Y$ & A |
| 34 | RePLace • Y + Q | $(Y) + (Q) \rightarrow Y$ & A |
| 35 | RePLace • Y − Q | $(Y) - (Q) \rightarrow Y$ & A |
| 36 | RePLace • Y + 1 | $(Y) + 1 \rightarrow Y$ & A |
| 37 | RePLace • Y − 1 | $(Y) - 1 \rightarrow Y$ & A |
| $40^{\Delta}$ | ENTer • $LP^{\Delta\Delta}$ | $L[Y(Q)] \rightarrow A$; j = 2, even parity; j = 3, odd parity |
| 41 | ADD • LP | $L[Y(Q)] + (A) \rightarrow A$ |
| 42 | SUBtract • LP | $(A) - L[Y(Q)] \rightarrow A$ |
| 43 | COMpare • MASK | $(A) - L[Y(Q)]$ SENSE (j), $(A) + L[Y(Q)]$; $(A)_j = (A)_f$ |
| $44^{\Delta}$ | RePLace • LP | $L(Y)(Q) \rightarrow Y$ & A; j = 2, even parity; j = 3, odd parity |
| 45 | RePLace • A + LP | $L(Y)(Q) + (A) \rightarrow Y$ & A |
| 46 | RePLace • A − LP | $(A) - L(Y)(Q) \rightarrow Y$ & A |
| 47 | SToRe • LP | $L(A)(Q) \rightarrow Y$; $(A)_i = (A)_f$ |
| 50 | SELective • SET | SET $(A)_n$ FOR $Y_n = 1$ |
| 51 | SELective • $CP^{\Delta\Delta}$ | COMPLEMENT $(A)_n$ FOR $Y_n = 1$ |

REPERTOIRE OF INSTRUCTIONS

Fig. 5a

| OP CODES | MNEMONIC INSTRUCTIONS | INSTRUCTION FUNCTIONS |
|---|---|---|
| 52 | SELective • CL$^{\Delta\Delta}$ | CLEAR $(A)_n$ FOR $Y_n = 1$ |
| 53 | SELective • SU$^{\Delta\Delta}$ | $Y_n \rightarrow (A)_n$ FOR $(Q)_n = 1$ |
| 54 | Replace SElective • SET | SET $(A)_n$ FOR $(Y)_n = 1, \rightarrow$ Y & A |
| 55 | Replace SElective • CP | COMPLEMENT $(A)_n$ FOR $(Y)_n = 1, \rightarrow$ Y & A |
| 56 | Replace SElective • CL | CLEAR $(A)_n$ FOR $(Y)_n = 1, \rightarrow$ Y & A |
| 57 | Replace SElective • SU | $(Y)_n \rightarrow (A)_n$ FOR $(Q)_n = 1, \rightarrow$ Y |
| 60 | JumP (arithmetic) | Jump to Y if j-condition is satisfied. (see JP & RJP j-Designators) |
| 61 | JumP (manual) | |
| 62* | JumP (if • $C^n$ has ACTIVE INput buffer) | Jump to Y if $C^{j*}$ input buffer active (see JP & RJP j-Designators) |
| 63* | JumP (if • $C^n$ has ACTIVE OUTput buffer) | Jump to Y if $C^{j*}$ output buffer active |
| 64 | Return JumP (arithmetic) | Jump to Y+1 and P+1 $\rightarrow Y_L$ if j condition is satisfied (see JP & RJP j-Designators) |
| 65 | Return JumP (manual) | |
| 66* | TERMinate • $C^n$ • INPUT | Terminate input buffer on channel j* |
| 67* | TERMinate • $C^n$ • OUTPUT | Terminate output buffer on channel j* |
| 70$^{\Delta}$ | RePeaT | Execute NI Y times |
| 71 | BSKip • $B^n$ | $(B)^j = Y$, skip NI and clear $(B)^j$; $(B)^j \neq Y$, Advance $B^j$ and read NI |
| 72 | BJumP • $B^n$ | $(B)^j = 0$, read NI; $(B)^j \neq 0$, $(B)^j - 1$ and jump to address Y |
| 73* | INput • $C^n$ (without monitor mode) | Buffer IN on $C^{j*}$; $k^* = 3, (Y) \rightarrow (00100 + j^*)$; $k^* = 1, (Y)_L \rightarrow (00100 + j^*)_L$; $k^* = 0, Y \rightarrow (00100 + j^*)_L$. |
| 74* | OUTput • $C^n$ (without monitor mode) | Buffer OUT on $C^{j*}$; $k^* = 3, (Y) \rightarrow (00120 + j^*)$; $k^* = 1, (Y)_L \rightarrow (00120 + j^*)_L$; $k^* = 0, Y \rightarrow (00120 + j^*)_L$. |
| 75* | INput • $C^n$ (with • MONITOR mode) | Buffer IN on $C^{j*}$; $k^* = 3, (Y) \rightarrow (00100 + j^*)$; $k^* = 1, (Y)_L \rightarrow (00100 + j^*)_L$; $k^* = 0, Y \rightarrow (00100 + j^*)_L$. |
| 76* | OUTput • $C^n$ (with • MONITOR mode) | Buffer OUT on $C^{j*}$; $k^* = 3, (Y) \rightarrow (00120 + j^*)$; $k^* = 1, (Y)_L \rightarrow (00120 + j^*)_L$; $k^* = 0, Y \rightarrow (00120 + j^*)_L$. mon. inter. at 00060 + j* |

REPERTOIRE OF INSTRUCTIONS

ΔΔ { LP-Logical Product
CP-Complement
SU-Substitute
CL-Clear }

Y—The operand; Y or (Y)

*, Δ } Special j & k Designators

NOTE:

Skip NI if other Computer (on channel 0 or 1) has input buffer active. Execute twice.

*Fig. 5b*

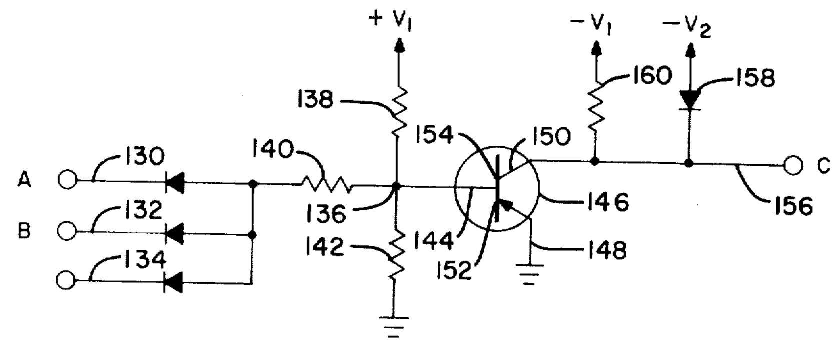
Fig. 6
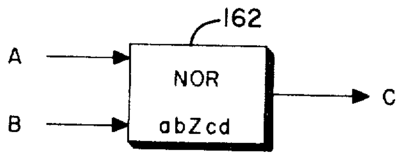
Fig. 7
| A | B | C |
|---|---|---|
| 0 | 0 | 1 |
| 0 | 1 | 0 |
| 1 | 0 | 0 |
| 1 | 1 | 0 |
$C = \overline{A+B} = \bar{A}\ \bar{B}$
Fig. 8
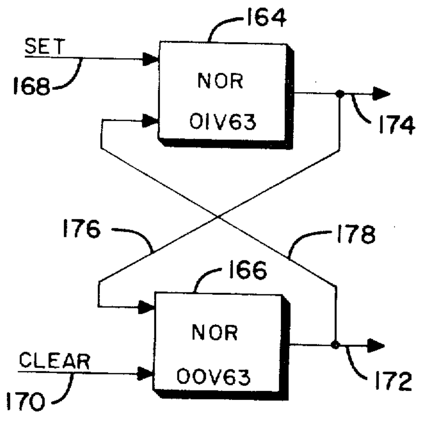
Fig. 9
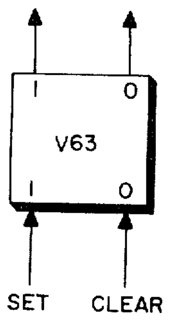
Fig. 10

Jan. 9, 1968 G. A. ERICKSON ET AL 3,363,234

DATA PROCESSING SYSTEM

Filed Aug. 24, 1962 27 Sheets-Sheet 8

FUNCTIONAL TASK DIAGRAM

SYSTEM COMMUNICATION TIMING REQUIREMENTS

DATA TRANSFER CONTROL

INTERCOMPUTER DATA TRANSFER CONTROL

INTERCOMPUTER DATA TRANSFER TIMING

TWO-COMPUTER TIMING RELATIONSHIP DIAGRAM

Jan. 9, 1968 G. A. ERICKSON ET AL 3,363,234

DATA PROCESSING SYSTEM

Filed Aug. 24, 1962

RELATION OF KEYBOARD CONTROL TO SITE

RELATION OF MAGNETIC TAPE CONTROL TO SITE

TWO-COMPUTER DATA FLOW DIAGRAM

Jan. 9, 1968 G. A. ERICKSON ET AL 3,363,234

DATA PROCESSING SYSTEM

Filed Aug. 24, 1962 27 Sheets-Sheet 14

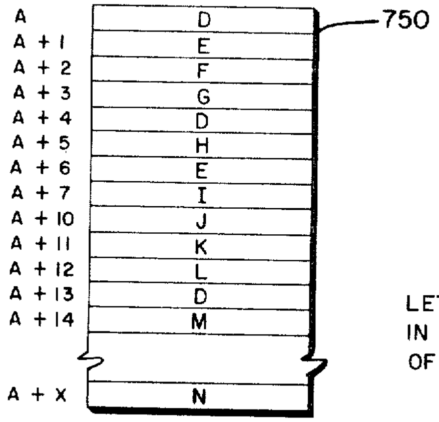

A= INITIAL ADDRESS OF SUBPROGRAM.

X= MAXIMUM NUMBER OF SUBPROGRAMS FOR EXECUTIVE ROUTINE OF REFERENCE.

LETTERS REFER TO ADDRESSES IN MAIN MEMORY SECTION OF UNIT COMPUTER.

EXAMPLE SUBPROGRAM ENTRANCE ADDRESS TABLE

Fig. 25a

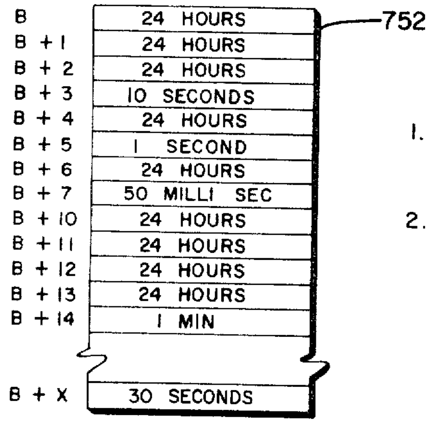

B= INITIAL ADDRESS OF PRIORITY TIME TABLE.

1. SUBPROGRAMS G, H, I, M, & N ARE PERIODIC IN NATURE.

2. THE 24 HOUR ENTRIES REPRESENT A VERY LARGE DELAY. THIS INSURES THAT THE FLAG WILL BE CLEARED AUTOMATICALLY AFTER THE FIRST REFERENCE.

EXAMPLE PRIORITY TIME TABLE

Fig. 25b

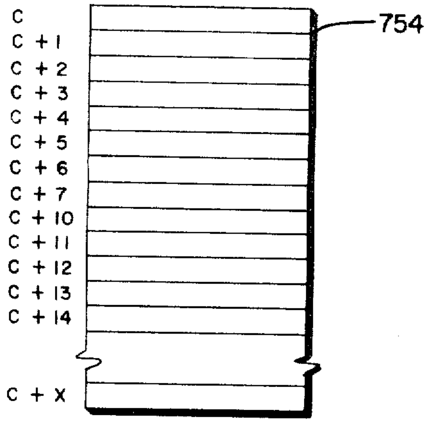

C= INITIAL ADDRESS OF SUBPROGRAM FLAG TABLE.

EXAMPLE SUBPROGRAM FLAG TABLE

Fig. 25c

EXECUTIVE ROUTINE

BASIC SUBPROGRAMS REQUIRED FOR UNIT COMPUTER A

BASIC SUBPROGRAMS REQUIRED FOR UNIT COMPUTER B

PROCESS KEYBOARD CONTROL UNIT SUBPROGRAM

FORM TEST SUBROUTINE

INTER-COMPUTER BUFFER TERMINATION ON INTERRUPT

INITIATE INTER-COMPUTER TRANSFER

OUTPUT MONITOR SUBROUTINE

BLOCK DIAGRAM OF RADIO CARRIER I EQUIPMENT

PREPARE-TO-TRANSMIT SUBROUTINE

TRANSMIT TO SYSTEM VIA RADIO CARRIER I SUBPROGRAM

END-OF-DATA INTERRUPT SUBROUTINE

INPUT BUFFER MONITOR SUBROUTINE

PREPARE-TO-RECEIVE SUBROUTINE

RECIEVE FROM SYSTEM VIA RADIO CARRIER I SUBPROGRAM

READ FROM MAGNETIC TAPE SUBPROGRAM

WRITE ON MAGNETIC TAPE SUBPROGRAM

MASTER CONTROL ROUTINE

United States Patent Office 3,363,234

Patented Jan. 9, 1968

3,363,234

DATA PROCESSING SYSTEM

Gordon A. Erickson, Ralph A. Hileman, Ernest G. Mutschler, and Gerald E. Pickering, San Diego, Calif., assignors to Sperry Rand Corporation, New York, N.Y., a corporation of Delaware Filed Aug. 24, 1962, Ser. No. 219,141
49 Claims. (Cl. 340—172.5)

SECTION A. DATA PROCESSING SYSTEM

This invention relates generally to digital data computing equipment, and more particularly to a system which utilizes multiple computers located at remote sites to perform prescribed tasks while at the same time participating in the function of the overall system.

It is well known that computers are being utilized at an ever increasing rate to perform all manner of tedious bookkeeping tasks, e.g., payroll preparation; to control the flow of process development of products, e.g., the refining of petroleum products; to provide automatic control of manufacturing machines, e.g., turret lathes; to maintain up-to-date inventories, e.g., the number of spare parts on hand, number of new insurance policies sold, etc.; and many more unrelated tasks. From this brief history of commercial types of work being performed by computer installations it can be seen that some are real-time applications, and some can be performed at computer rates which are independent of real-time. Further, it can be appreciated that a single large firm may have *all* of these types of tasks to be performed by computers at various physical locations. This gives rise to the attending problems of correlating the work being done, assigning the work to each computer installation in such a manner to yield maximum efficiency for the whole system, and having prompt access to the status of the entire system at any given location.

The data processing system, operating in real-time at various remotely located installations, is a multi-computer process control system which processes, correlates, and evaluates the process-data. Real-time inputs are inserted into the system from sensors and from other installations. Real-time outputs are provided to peripheral systems internal and external to the particular installation.

Operationally, the computer centered control installation coordinates the collection of data from the sources at the installation and from external sources via communication media; correlates the data to obtain a clear picture of the process situation; processes the data required for the decision making process; and communicates the decisions or action to the various machinery which are under the control of the installation. The rapid exchange of process information between computers at the various installations permits a high degree of system integration and coordination, and enhances the ability of the individual sites to perform their specified tasks. The utilization of a data processing system as herein disclosed in essence, provides an increased effectiveness as follows:

(1) It provides increased individual installation capability to automatically process and evaluate the process control data which the site itself collects;

(2) It automatically gives each installation immediate access to evaluated process and business information held by other installations in the system;

(3) It permits various levels of command to appraise more realistically the current business situation in its entirety (by providing common access to the total process and business information accumulated by installations in the system); and (4) It increases effectiveness in executing orders of higher management.

Three major principles are inherent in the basic data processing system: the use of general-purpose equipment modules to facilitate changes required as the jobs are varied, the use of graded modes of system operation to achieve high reliability of all essential control functions, and the use of real-time programing concepts to provide rapid response to system inputs. These three basic essentials will be summarized below.

One of the fundamental characteristics of the data processing system is that the equipment designs will not limit the functional capabilities of the system. To the extent that this concept can be implemented, changes in functional requirements do not result in the need for equipment changes. Therefore, the data processing system herein disclosed makes it possible to implement many changes in process control procedures without a costly downtime period for installation of new equipment or modification of existing equipments. To implement this module approach to the overall system, a basic computer was selected for use either singly or in combination at each of the independent sites. Each of the computers in the typical data processing system configuration shown in FIG. 1 is a stored program (to be defined later) computer intended for real-time handling of large quantities of complex data, and will hereinafter be referred to as the Unit computer. In relation to other general-purpose computer systems, the Unit computer emphasizes arbitrary access storage, and rapid communication with external devices. For industry where the changes in the processes to be controlled and the business activity change radically and rapidly, it is desirable to utilize general-purpose modular construction rather than specifically designed equipment. Such utilization alleviates the necessity of shutting down operation for major control center equipment changes as the requirements of business or the processes to be controlled are varied. Further reasons for utilizing the modular approach in the development of the data processing system are as follows:

(1) The amount of computer capacity required at the various installations will vary according to the function of the installation;

(2) To facilitate the additional requirements that will almost certainly be imposed upon each installation as its operation expands; and (3) To facilitate training, of user and maintenance personnel, common spare parts procurement, and maintenance considerations it is desirable to have one standard computer.

The modular design of the data processing system allows necessary changes in the process control operation, or in the processing of business data, to be made by inserting new programs into the particular computer at the installation where change is required. By tailoring programs rather than equipment to specific operational needs the same computer may be utilized regardless of the type of installation and its particular processing responsibilities. This provides a fully adaptable system which may change as the system-oriented or installation-oriented requirements change.

In order to achieve high system reliability, it is necessary to specify the importance of each function to be performed. Importance is defined by the relative priority of each function at each level of capability desired. Therefore, if the total system capability is not available because of some equipment failure, a reduced capability must be defined including the specification of the highest priority functions. For example, if some piece of process control equipment is inoperative, some function, such as supplying information to the system concerning the process, may be dropped. Likewise, if one computer in a two-computer installation is not available, a new program can be used which permits, for example, reduced processing of inventory records. In this manner, it is possible to define series of operational modes that are graded to the capability of the overall system.

A "real-time system" is defined as a system in which the delay in responding to a stimulus is negligible in the time reference of the user equipment. The data processing system is novel as a real-time system in that it is characterized by its lack of special buffering facilities (such as drums) to isolate the system of computers from the real-time demands of equipment. The major element determining the logical sequences to be performed in the program of the entire system is the actual passage of real-time as measured by the computer clock with its one-millisecond precision. The system has many asynchronous periodic demands which are met within the time required by careful design of the Executive Routines.

Decision making ability is built into the computer program so that the program itself can decide at the last moment what to do next, based on the status of the overall system when the choice is to be made. Not only is the decision made in light of priorities of every function that should be executed, but in addition, the program decides without any calculations being performed just how long it can put off some jobs when it is very busy.

The Unit computer concept is based on the ability of the units to exchange data readily and efficiently and on the divisibility of the problem into programs that are independent enough, at any one instant in time, to permit simultaneous operation of one or more than one program at a time. The programs are not allocated to the computers at any given installation on a functional basis, but rather on a basis of programming convenience, e.g., distributed input/output loading, distributed computational loading, distributed process control, storage of data where it is most commonly used, etc.

Among the features that make possible the use of a computer in a real-time application is the real-time clock. The clock is contained in a special register within the magnetic core memory and can be referenced or set by the computer program. Time is maintained accurate to the nearest $2^{-10}$ second, the modulus of the clock being slightly greater than six days. The clock is incremented automatically by the computer upon signal of a $\frac{1}{1024}$ c.p.s. crystal-controlled oscillator. When the system is started, the clock is set to 0 and time is automatically maintained relative to the start of the problem. The real-time modulus of the system is so defined that in scheduling tasks for execution the modulus of the clock will not be exceeded.

In a multi-computer program, the real-time clocks within each computer may be initially synchronized. Synchronization may be accomplished by a computer at the centralized control location transmitting the contents of its real-time clock to other computers, which then set their clocks accordingly.

An example of a type of business operation which may have cause to utilize several of the types of computational facilities would be a highly diversified petroleum processing and distributing corporation which would deal in the sale of bulk petroleum products, the sale of packaged petroleum products, the operation of "cracking" the crude oil into the various petroleum products, the preparation of various payroll information, the maintenance of inventory lists, the maintenance of employee benefit listings, and many more varied and widespread problems. It can be seen that such operation would utilize more than one geographical site that would be remote from one another to the extent that they may exist in different cities. This being the case, it is necessary to provide the various computer installations with means for communicating with one another to thereby transmit pertinent data to sites which may later utilize it.

SECTION B. OBJECTS AND DRAWING DESCRIPTION

The data processing system consists of the automatic control of a plurality of independently operating general purpose computers, the real-time control of installation-oriented tasks, and the communication of data messages and control messages between the respective remotely located and asynchronously operating sites. Each of the sites are equipped with equipment such that they may function individually and the communications media required to participate in the system. Among the equipment required is a general purpose computer with each site expandable to accommodate a plurality of such modular computers, that is computers that can be interconnected to form a unitized data processing site. Each of the modular computers is equipped with a real-time clock to aid in the control of the system operation. Dynamic control of the operation of each modular computer is performed by an executive control program. This control consists of causing the execution of the assigned task based on a predetermined priority arrangement when such tasks are required.

It is accordingly a primary object of this invention to provide automatic control of a multi-computer data processing system comprised of a plurality of independently operating modular computers.

It is a further object of this invention to provide real-time control functions for each of the modular computers.

Consider the situation where the computational and control tasks are of such a complexity as to require more than one modular computer at one or more of the installations. Such a circumstance requires that the plurality of computers at each site must appear as a unit with respect to the remainder of the system.

Therefore, it is another object of this invention to provide control of each modular computer at the respective sites such that they co-act to appear as a unit to the remainder of the system.

Next consider the situation where each computer site is assigned tasks relative to the site, and tasks which are relative to the system, these tasks being of a complexity to require at least two modular computers. In such a case, it is necessary to allocate the tasks to the appropriate equipment and the designated modular computer, so that all of the tasks are performed within the required response times.

It is, therefore, another object of this invention to distribute the tasks assigned to each computer site according to a grouping arrangement which finds site-oriented tasks handled in the User modular computers and the system-oriented tasks handled in the System modular computer.

Having a plurality of tasks assigned to each modular computer requires that a control means be employed to perform the tasks and make the calculations as they may be required. Since the tasks assigned to each computer may be of a different nature, it is desirable to provide an adaptive control means within each modular computer.

Thus, another object of this invention is to provide a selectively alterable control means to guide the task performance of each modular computer.

Yet another object of this invention is to provide a programmed control means to maintain control of the operation of each of the modular computers.

Still a further object of this invention is to provide a programmed control means which requires a relatively small amount of execution time in relation to the time required for the tasks performed.

The predetermined nature of the tasks assigned to each modular computer may consist of real-time process control or non-real-time data processing. The task execution may be of either periodic or non-periodic nature. This requires a method of determining when the respective tasks are to be performed and that at what interval.

Another object of this invention, then, is to provide a flagging means to be used in conjunction with the control means such that the various tasks are performed as required.

Yet another object of this invention is to provide a plurality of methods of flagging the various tasks to indicate the necessity of the respective performances, where the method depends on whether the task is periodic of to be executed on demand.

A further object of this invention is to provide a time table means corresponding to the assigned tasks for each modular computer to determine the predetermined time intervals that must elapse between executions of the periodically occurring tasks.

Consider the situation when more than one of the tasks assigned to a modular computer are requested to be performed simultaneously. Since only one task may be performed at a time, it is necessary to employ a task priority means to determine which task is to take precedence in the event of simultaneous requests.

Accordingly, it is a further object of this invention to provide a priority means for each modular computer for determining the order of performance of tasks that may be demanding performance simultaneously.

Yet another object of this invention is to provide predetermined priority ratings for each assigned tasks.

Still a further object of this invention is to allow selective alteration of the priorities of the respective tasks as the task load may be varied.

Next consider the situation where the task load for any of the respective modular computers varies from time to time. This yields a situation where there are periods of high task activity and periods of low task activity. Assuming that there are tasks which have a known period of delay between the time when demand for their execution is made and the time when the response must be made, it is desirable to provide variable priorities for these tasks. Thus, when the computational load is at a state of high activity, the tasks having the known period of delay may be postponed in their execution until such time as their response is actually required. Such an assignment of variable priority would result in the tasks being performed immediately under conditions of low task activity, or after an intermediate length delay during periods of intermediate task activity, or after the maximum allowable delay in cases of high task activity. Such a system of variable priorities provides for smoothing the computational activity.

Therefore, it is a further object of this invention to provide a method of assigning variable priorities to the tasks having a time delay between when performance is demanded and when response must be made.

Yet another object of this invention is to provide for computational smoothing during periods of high task activity by providing for the delayed execution on the basis of variable priorities of demanded tasks which may be so delayed a known period and still meet the response time requirements.

Since it is assumed that the various sites comprising the data processing system will be located remotely from one another, it is necessary to provide means for communicating between the respective sites. The communication network must be operative at the demand of any of the respective sites.

Still another object of this invention, then, is to provide means for communication of data messages and control messages between the various sites.

Yet another object of this invention is to provide a system of communication whereby one of the system sites may transmit messages and the remainder of the site receive the transmitted message.

Still a further object of this invention is to provide a communication system wherein any of the respective sites may initiate the communications mode.

Having a system of asynchronously operating computer sites, it is desirable to provide a controlled method for determining periods of communication between the various sites. This is necessary from the standpoint of avoiding simultaneous attempts to transmit by more than one of the sites, whereby undue confusion would arise. For ease of surveillance it is desirable that there be some predetermined sequence of communication by the respective sites.

It is, therefore, a further object of this invention to provide a means for controlling the period of communication by each site.

Still a further object of this invention is to provide a method of controlling the communication between sites wherein a master site initiates communication, and upon completion, passes the control of communication to the next sequentially designated sites, which occur in predetermined order.

A further object of this invention is to eliminate time delay by providing means for anticipating the requirement of transmitting of a particular site by utilizing the internal real-time clock such that data may be pre-assembled prior to the request for transmission.

Yet another object of this invention is to provide a plurality of methods of controlling the communication between the respective sites to accommodate the varying conditions of the system.

Considering the nature of the processes which may be controlled, the situation will arise wherein some of the processes will be of a real-time nature and will require frequent periodic surveillance by the user computer, while others of the processes to be controlled will require surveillance only on an intermittent basis. This being the case, it is desirable that the relatively intermittent processes not tie up one of the normal input/output channels all of the time. This requires that a multiplexing means be utilized intermediate several of the periodically operating processes and the modular computer. It is then necessary for the programmed control means to interrogate the multiplexing means rather than performing the process task directly.

Thus, it is a further object of this invention to provide access to the requirements of a plurality of non-periodic tasks while only utilizing a single communications channel to the modular computer.

Consider the situation when it is determined that the task load of the selected modular computer is to be modified, or the situation where the site function must be modified due to associated equipment being in an inoperative condition. Such situations will likely require the intervention of an operator to direct the change in task assignments.

Therefore, another object of this invention is to provide manual means for directing the alteration of the task assignment of a predetermined operator selectable modular computer.

Yet another object of this invention is to provide visual indication of detected equipment or program malfunctions to prompt operator intervention to initiate corrective action.

The objects of this invention may be realized by the means and processes described in the following summary. A plurality of asynchronously operating computer sites may be tied together in an operative system by utilizing the internally operative real-time clock of each modular computer to predetermine the time of communication with respect to each site such that data to be transmitted may be predetermined. The real-time clock is further utilized to time the period of transmission, thereby rendering the intervals between the periods of communication by each site subject to predetermination. An executive control means is employed which utilizes the real-time clock to execute designated tasks as determined by the flagging means to require performance. The combination of the real-time clock control means, the executive control means, and the predetermined priorities of the respective tasks associated with each modular computer, allows the orderly execution of tasks as they are determined by examination of the flagging means.

The above and other more detailed and specific objects will be disclosed in the course of the following specification, reference being had to the accompanying drawings, in which.

Figure 4A:
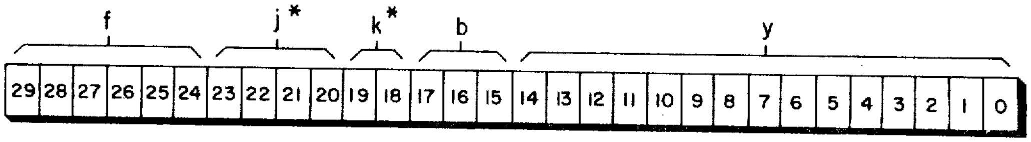

FIG. 4*a* is an illustration of the instruction word format utilized in conjunction with Input/Output instructions.

Figure 4B:
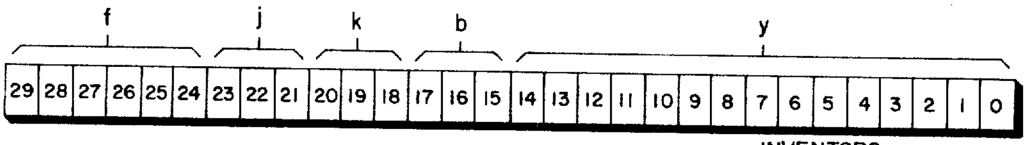

FIG. 4*b* is an illustration of the instruction word format utilized with all other instructions for the Unit computer.

FIGS. 5*a* and 5*b* are a listing of the repertoire of instructions available for use with the Unit computer with a description of their functions.

FIG. 6 is a schematic diagram of the NOR building block circuit utilized in the Unit computer.

FIG. 7 shows the block diagram symbol utilized to represent a NOR circuit.

FIG. 8 is the logical truth-table for the basic NOR circuit where two inputs are illustrated.

FIG. 9 is a block diagram of a flip-flop circuit comprised of cross-coupled NOR circuits.

FIG. 10 is the simplified block diagram symbolic representation of a flip-flop.

FIGS. 11*a* through 11*f* illustrate the flow-diagram symbols used to disclose program solutions.

Figure 12:
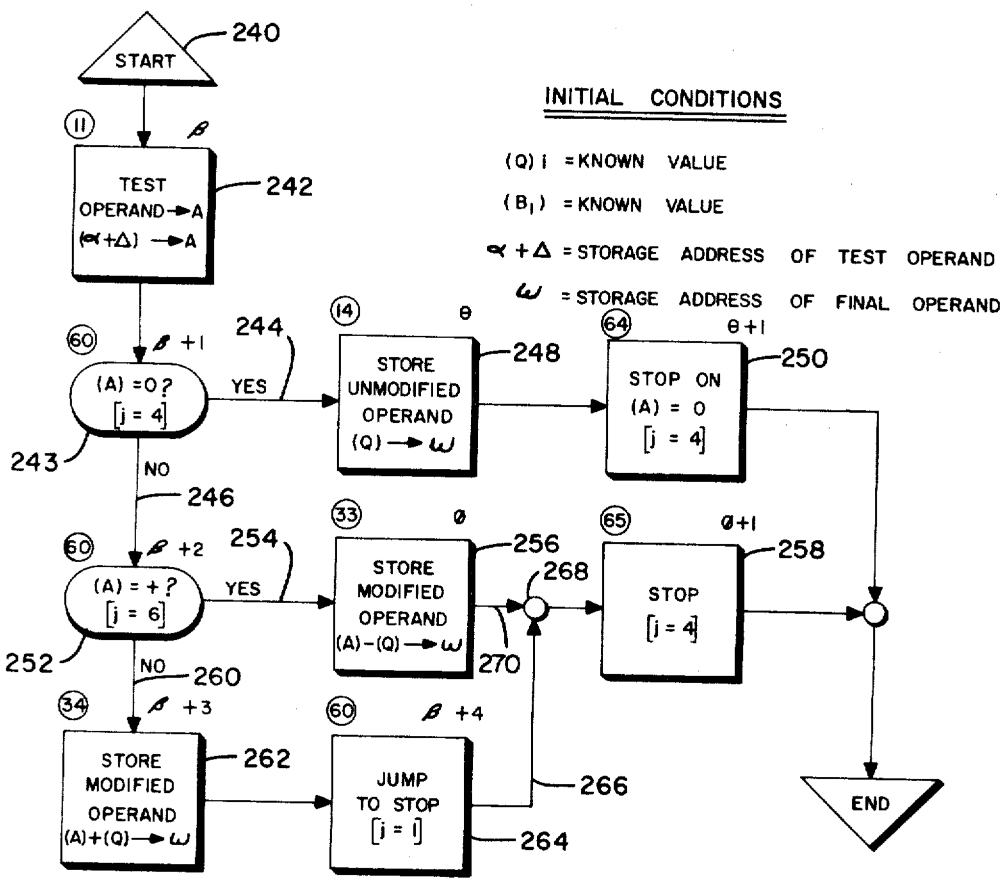

FIG. 12 is the flow-diagram solution of an example problem.

Figure 13:
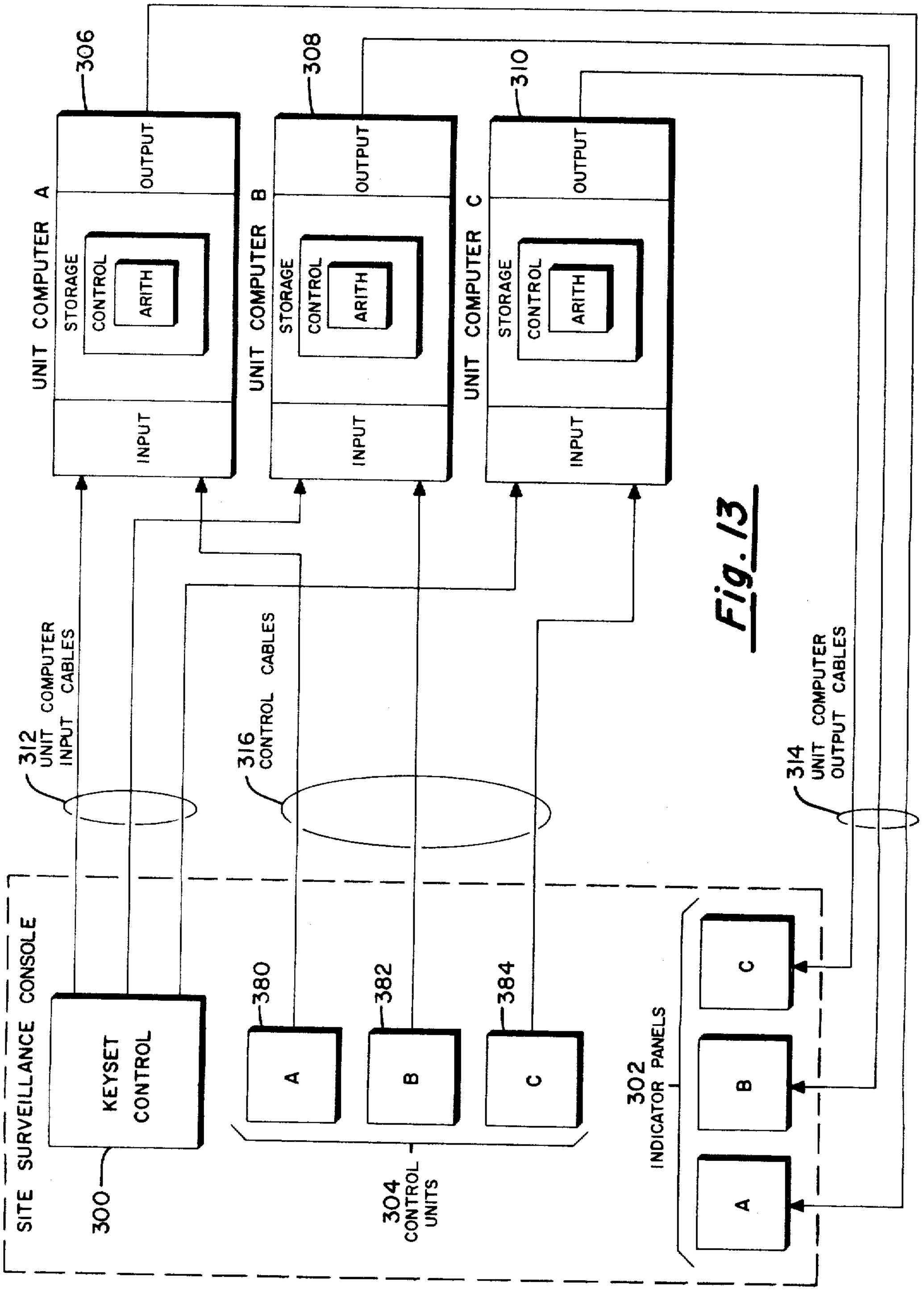

FIG. 13 is a block diagram illustrating the relationship of the Site Surveillance Console with its associated Unit computers.

Figure 14:
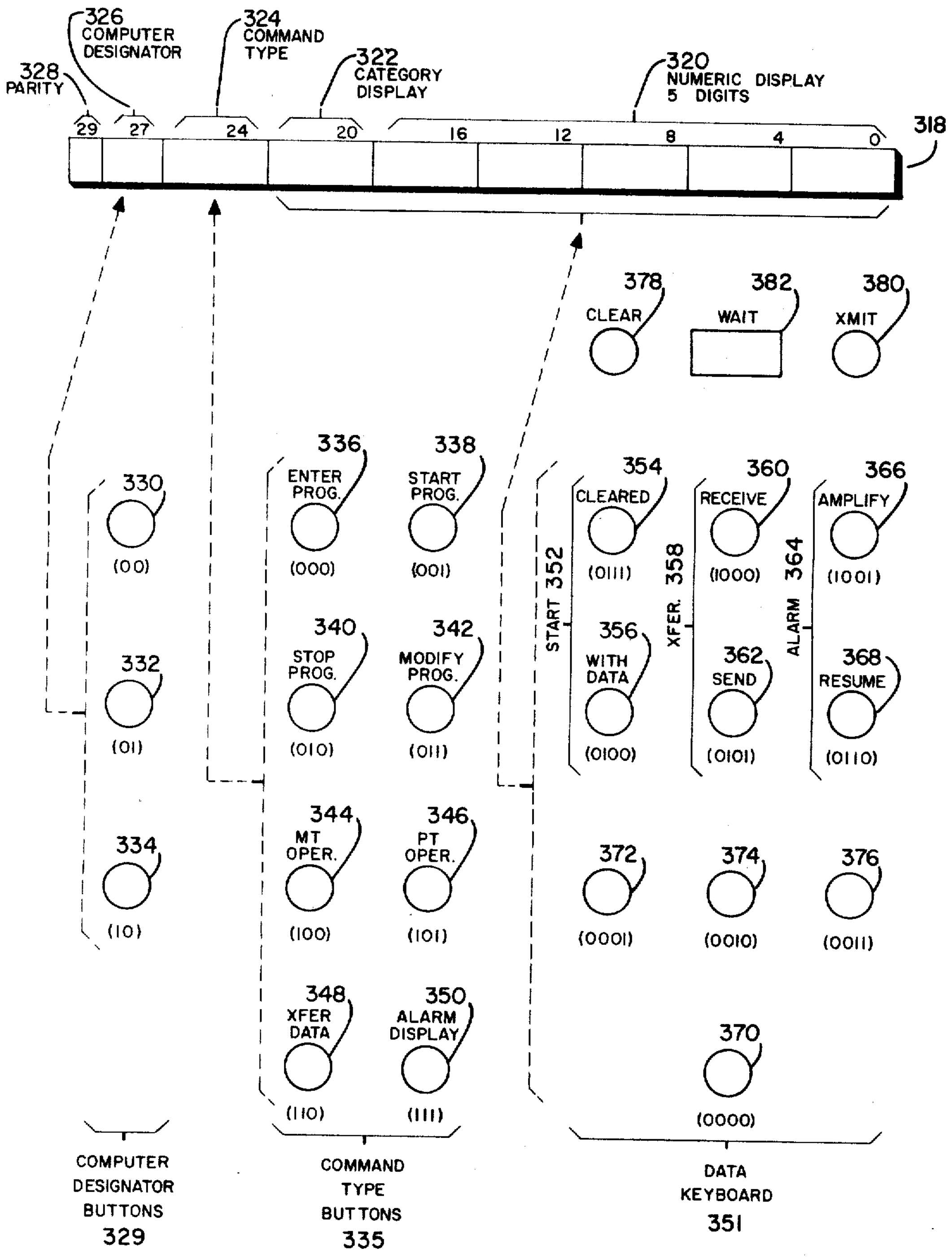

FIG. 14 is a functional diagram of the keyboard of the Site Surveillance Console.

Figure 15:
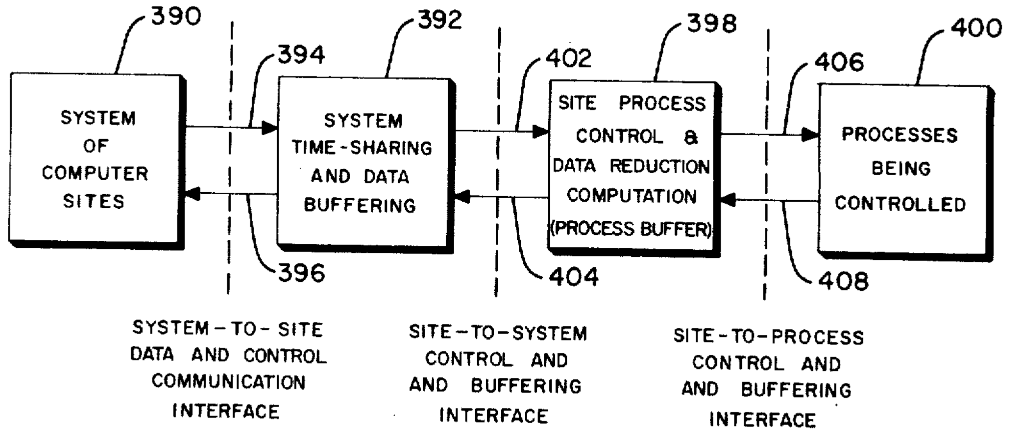

FIG. 15 is a functional task diagram illustrating the relationship of a site to the remainder of the multicomputer system.

Figure 16:
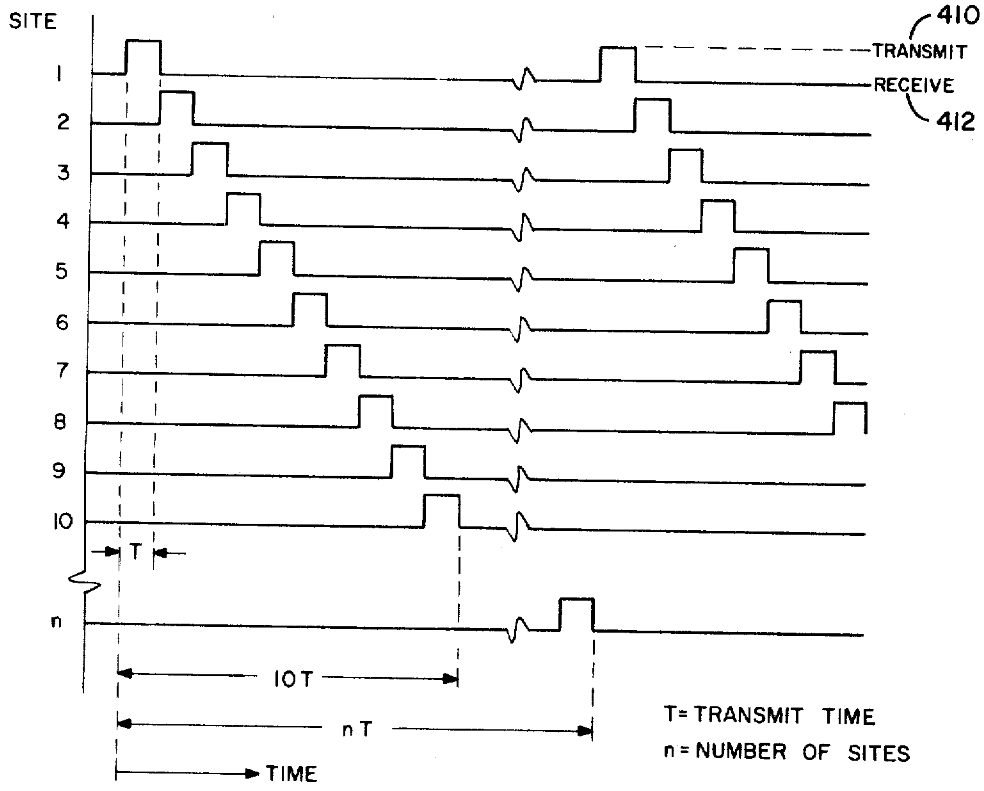

FIG. 16 is a timing diagram for system communications.

Figure 17:
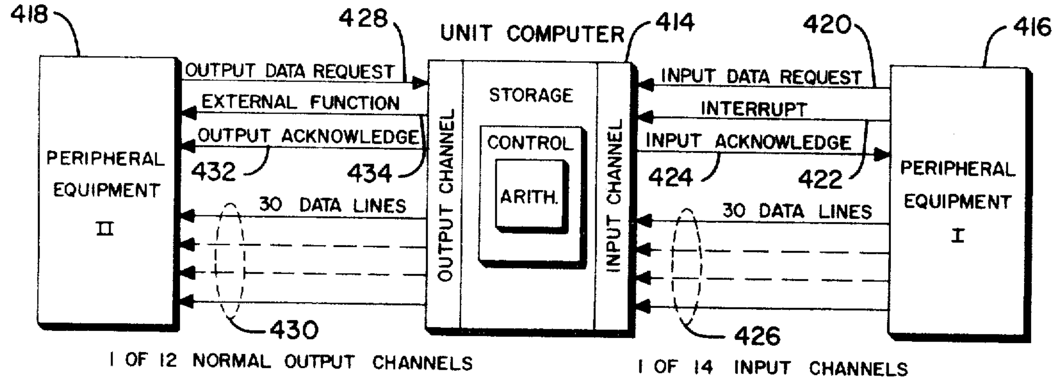

FIG. 17 illustrates the cable connections required in a computer-to-peripheral equipment data transfer arrangement.

Figure 18:
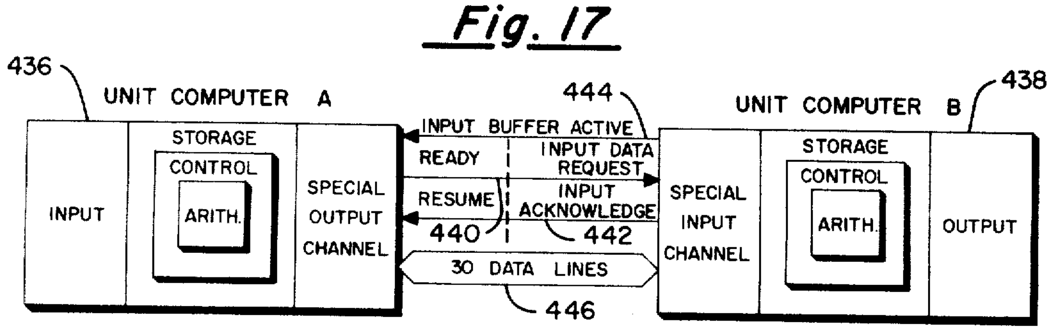

FIG. 18 is a block diagram illustrating the cable connections required in a computer-to-computer data transfer.

Figure 19:
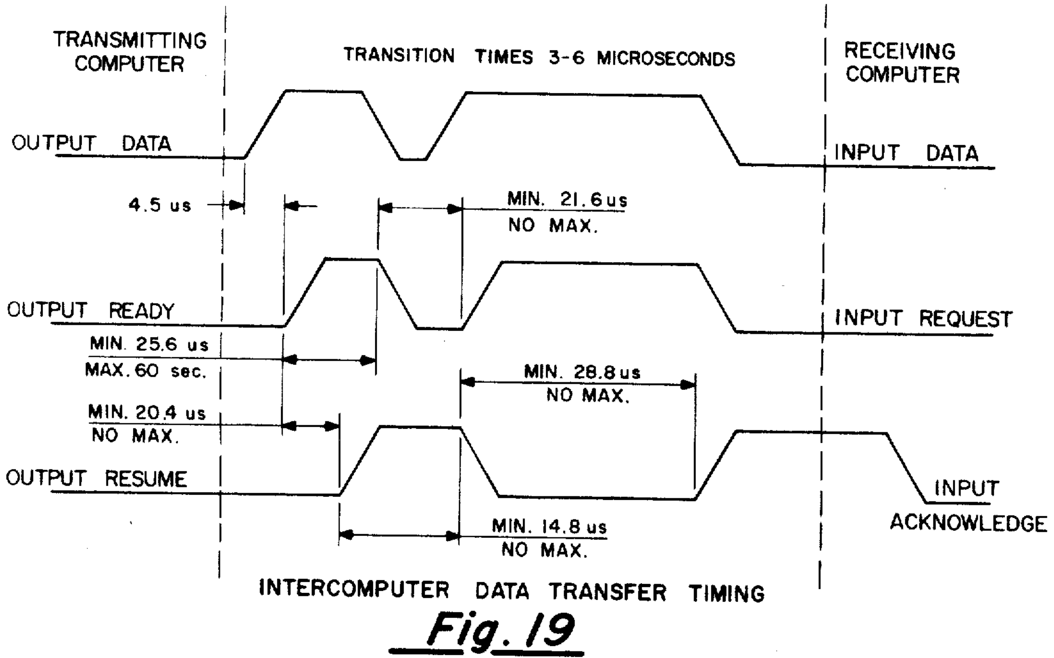

FIG. 19 is a signal timing diagram for inter-computer data transfers.

Figure 20:
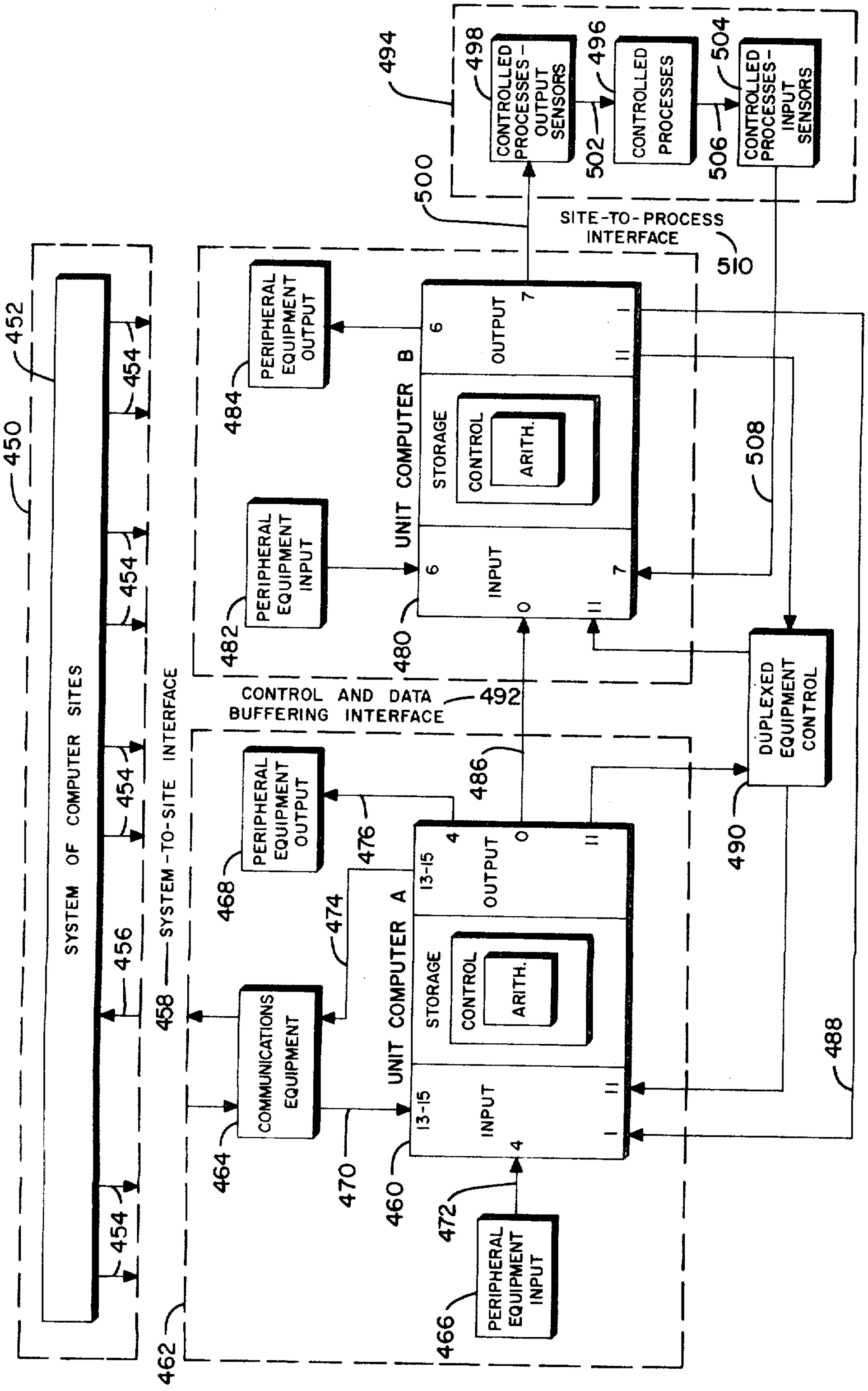

FIG. 20 is a block diagram of a two-computer site illustrating the equipment interface timing relationships.

Figure 21:
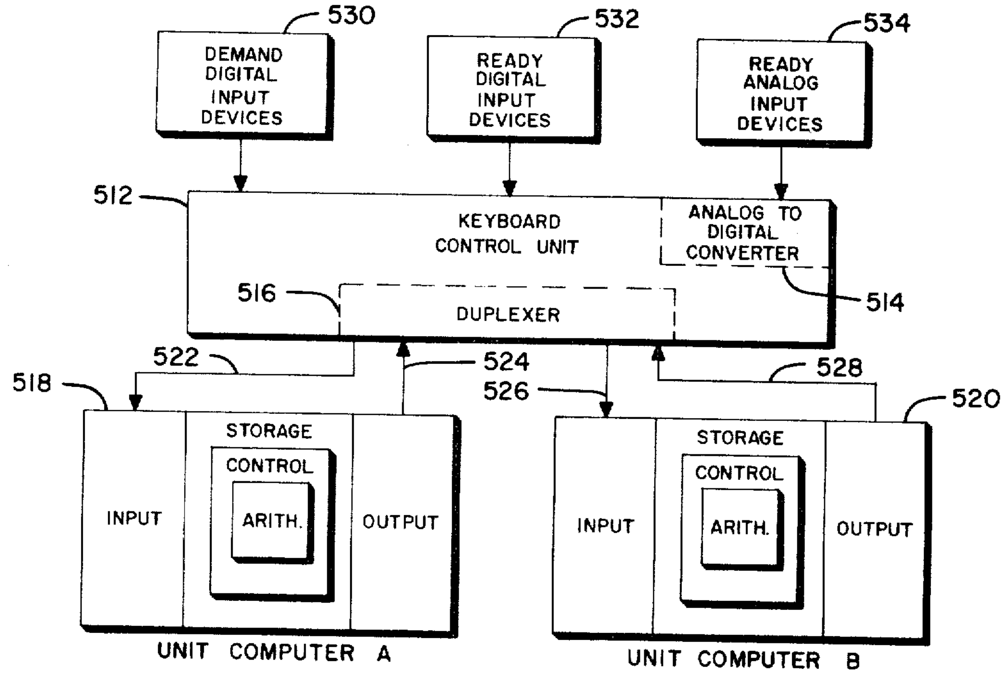

FIG. 21 is a block diagram illustrating the relationship of the Keyboard Control Unit to a two-computer site.

Figure 22:
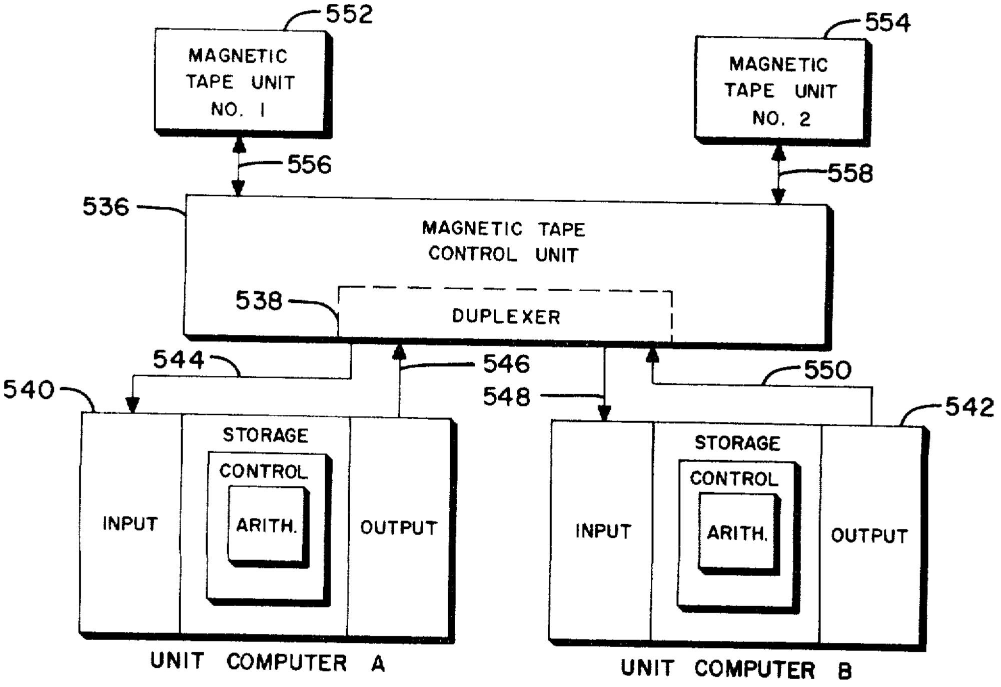

FIG. 22 is a block diagram showing the relationship of the Magnetic Tape Control Unit to a two-computer site.

Figure 23:
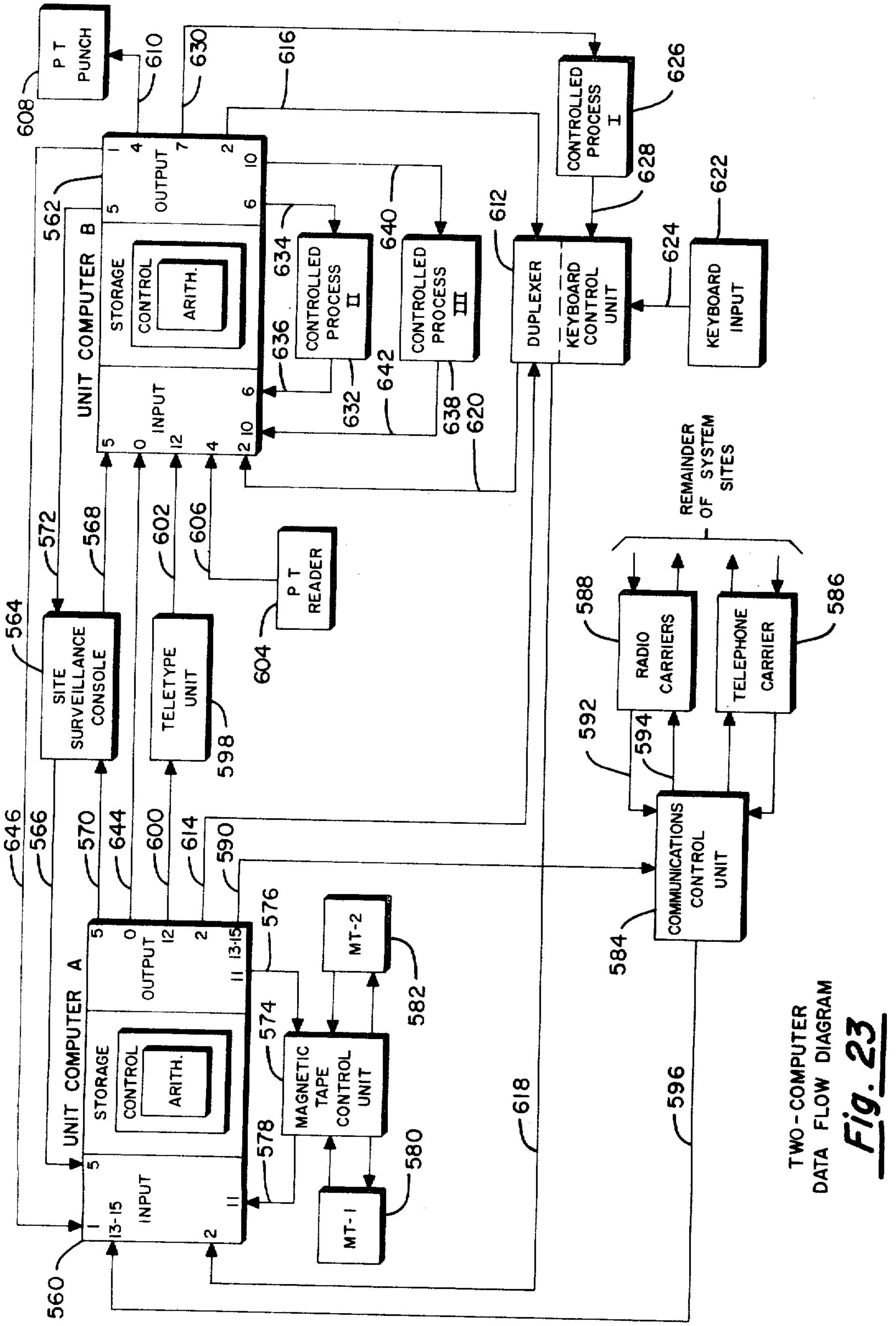

FIG. 23 is a block diagram of a two-computer site which illustrates the paths of data flow.

Figure 24:
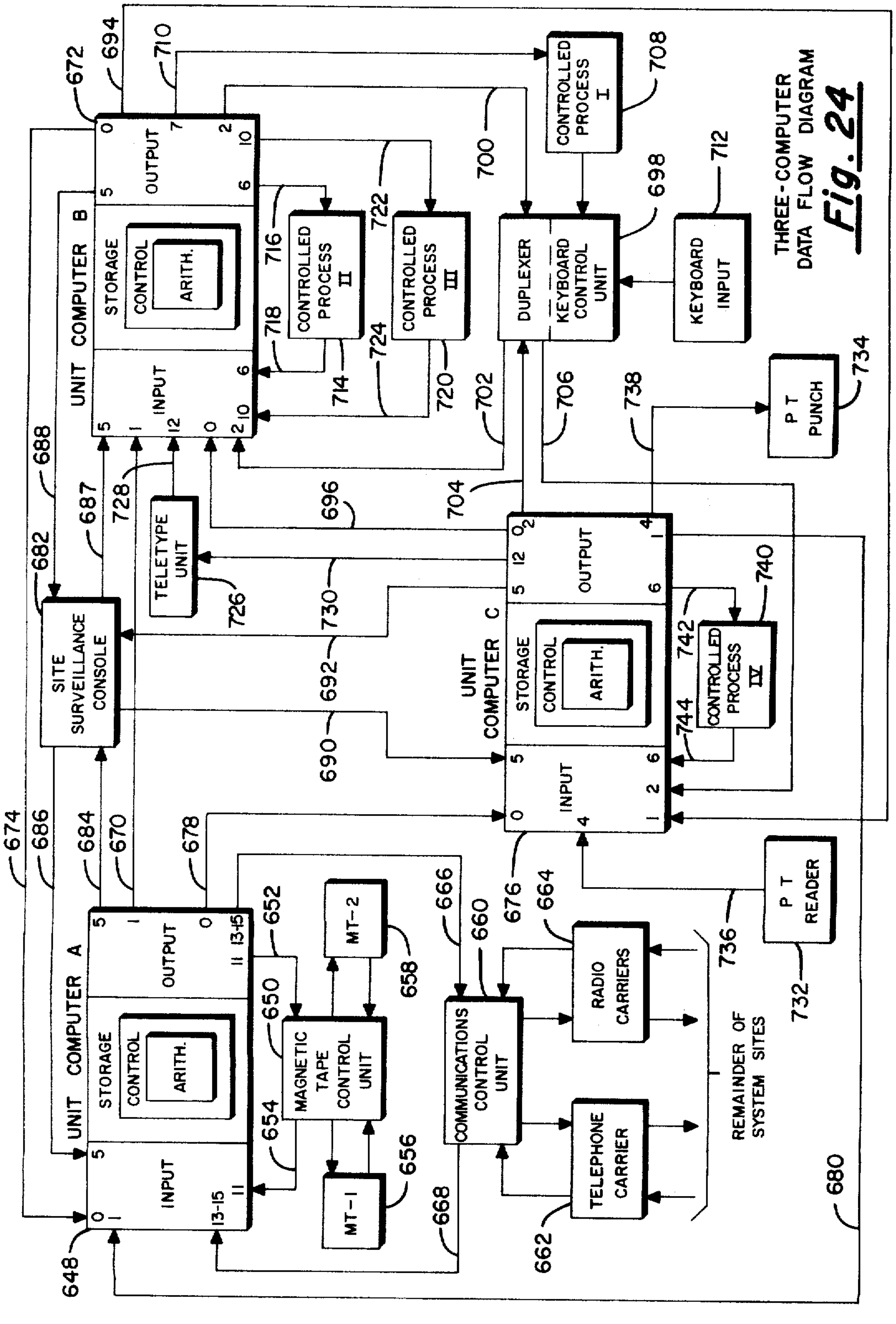

FIG. 24 is a block diagram of a three-computer site which illustrates the paths of data flow.

FIG. 25*a* is an example of the Subprogram Entrance Address Table.

FIG. 25*b* is an example of the Priority Time Table.

FIG. 25*c* is an example of the Subprogram Flag Table.

Figure 26:
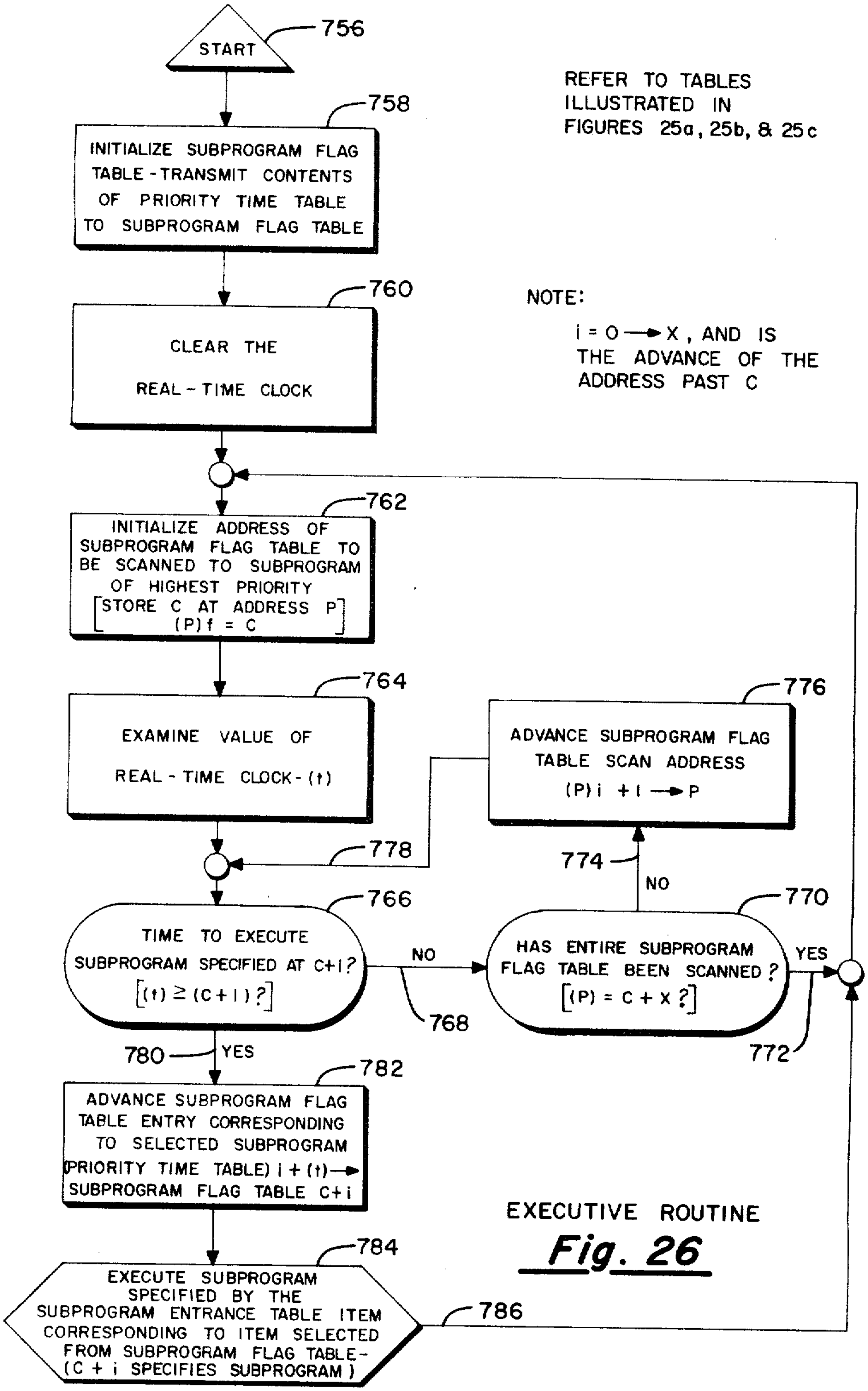

FIG. 26 is a flow-diagram of an Executive Routine control program.

Figure 27:
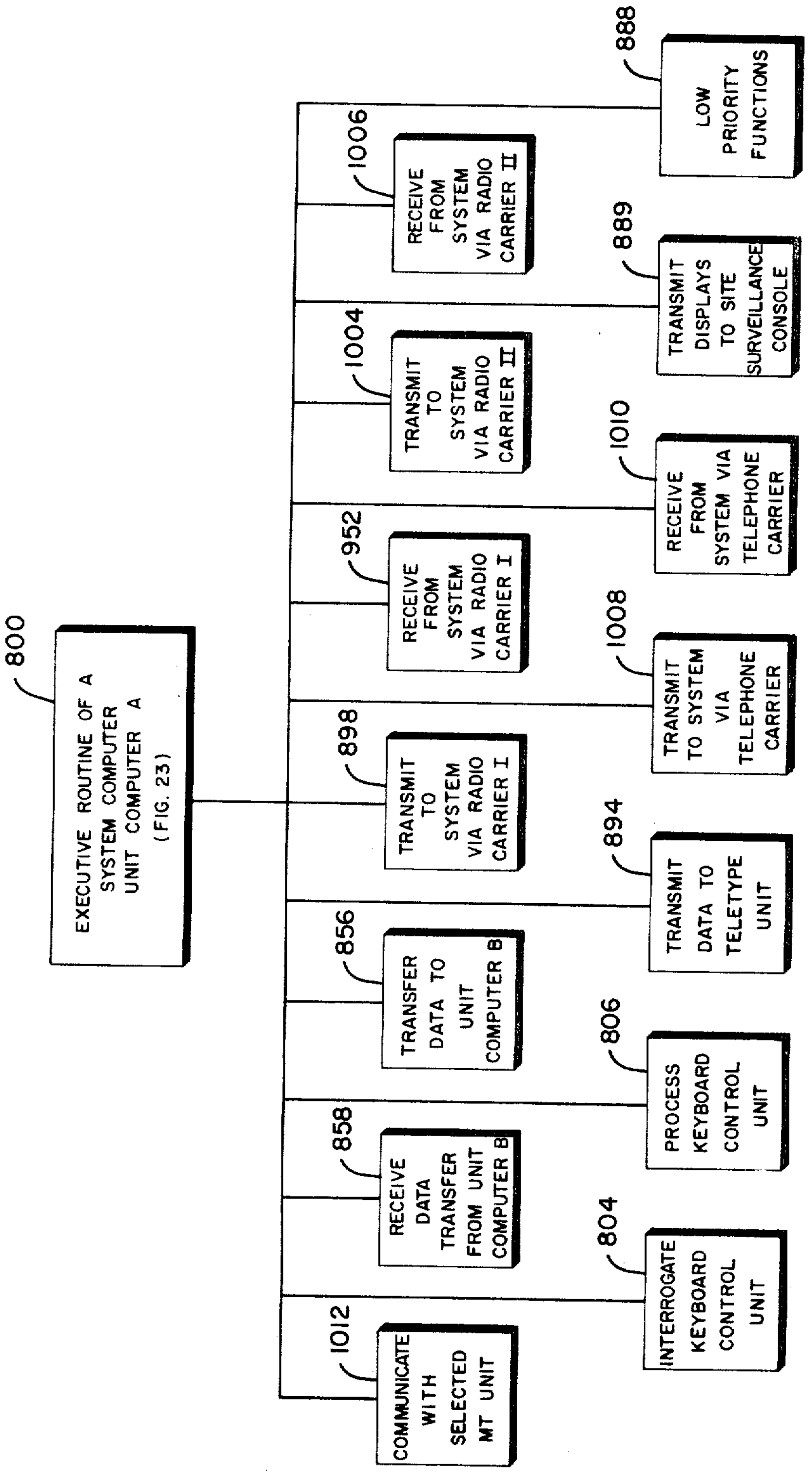

FIG. 27 is a block diagram of the subprograms to be utilized by the Executive Routine of a System computer.

Figure 28:
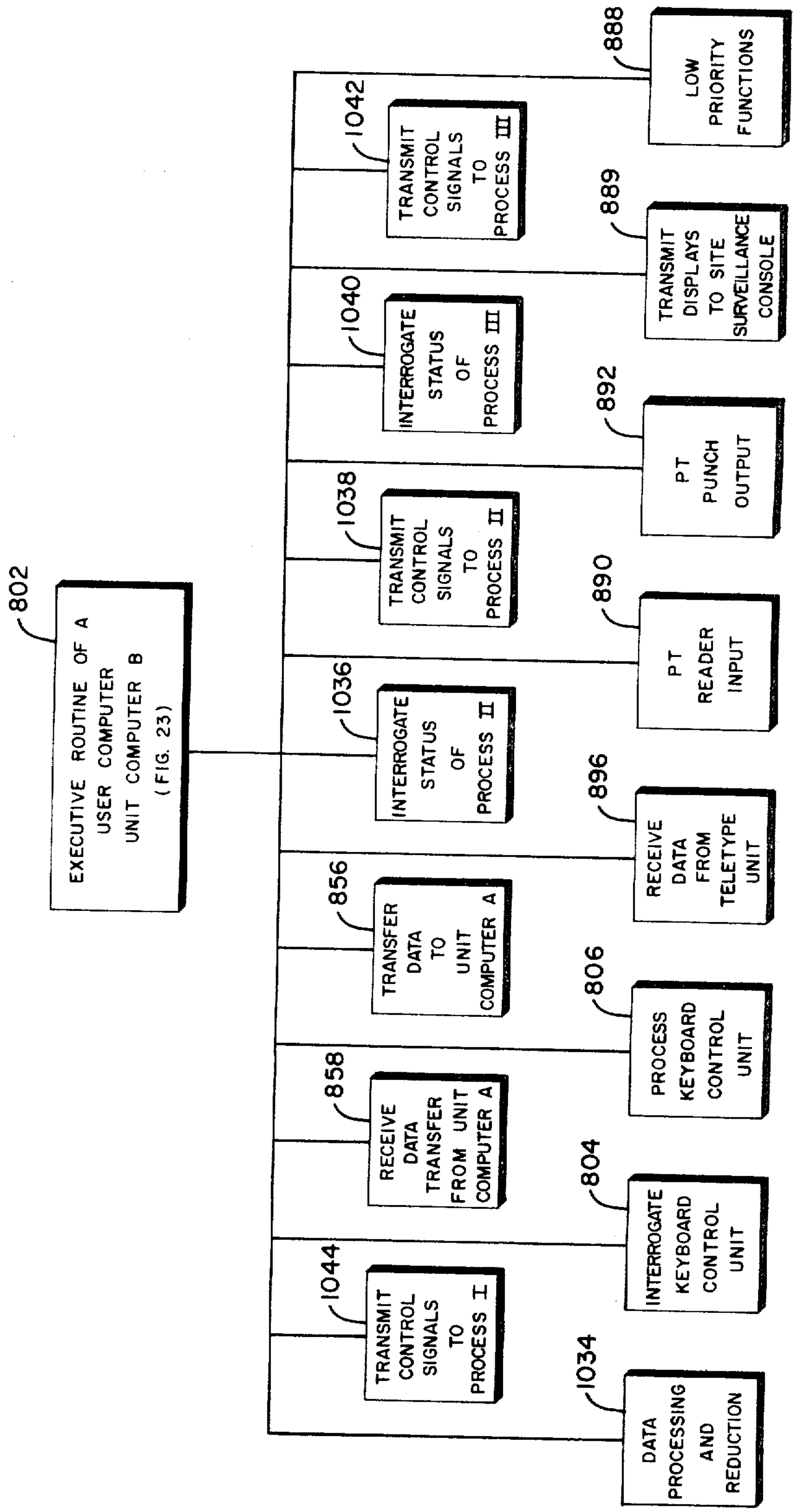

FIG. 28 is a block diagram of subprograms to be utilized by the Executive Routine of a User computer.

Figure 29:
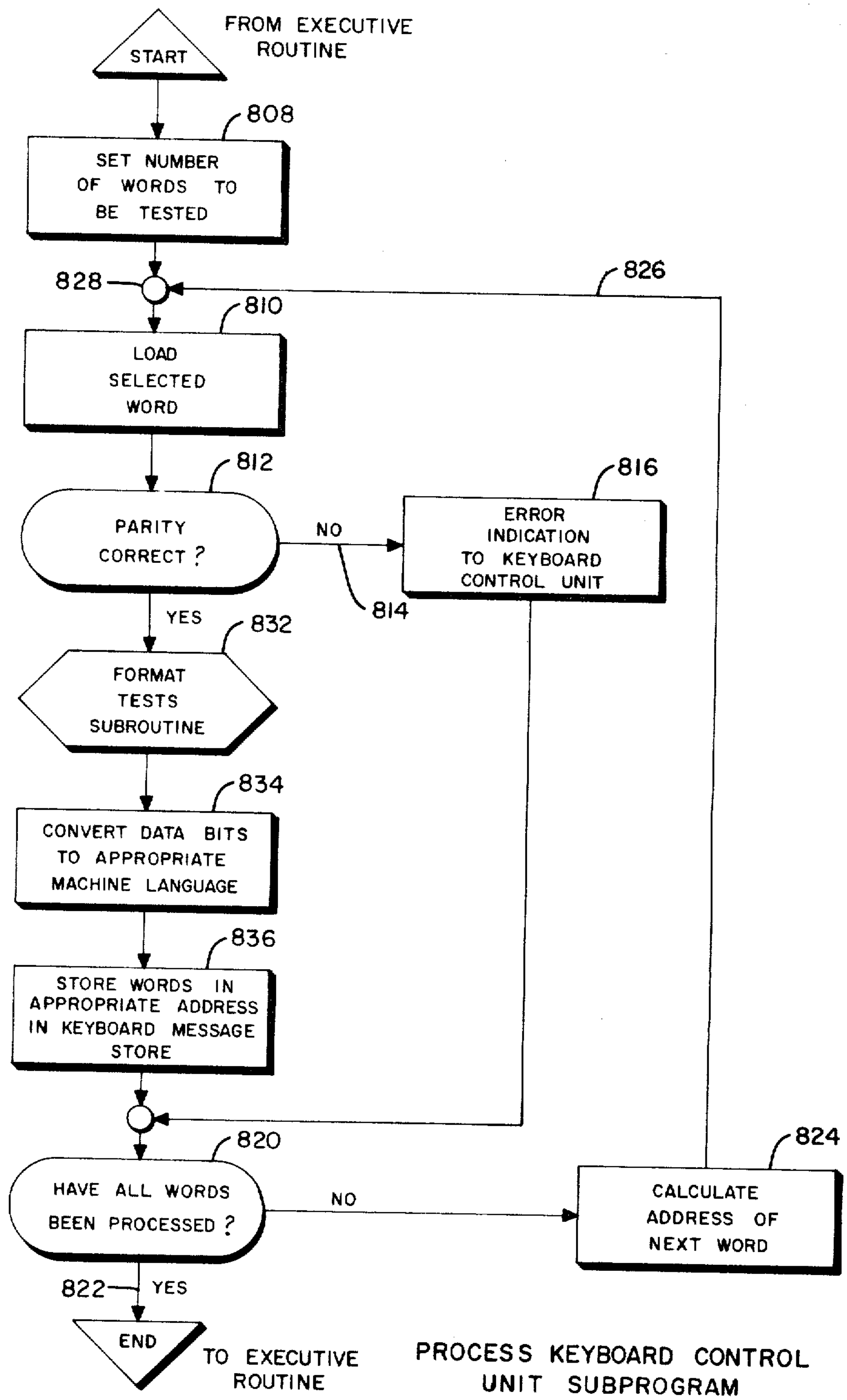

FIG. 29 is a flow-diagram of the Process Keyboard Control Unit subprogram.

Figure 30:
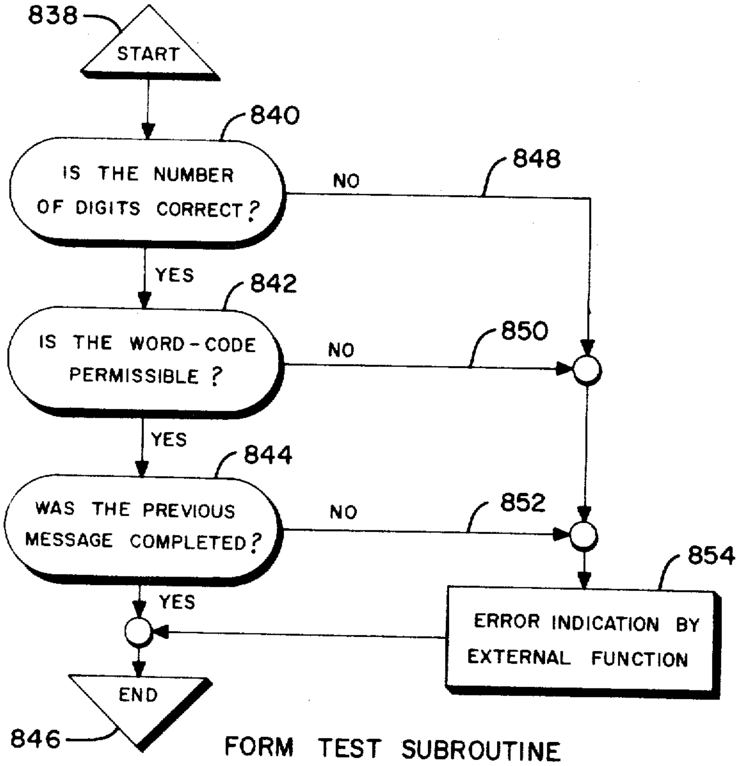

FIG. 30 is a flow-diagram of the Format Test subroutine utilized by the Process Keyboard Control Unit subprogram.

Figure 31:
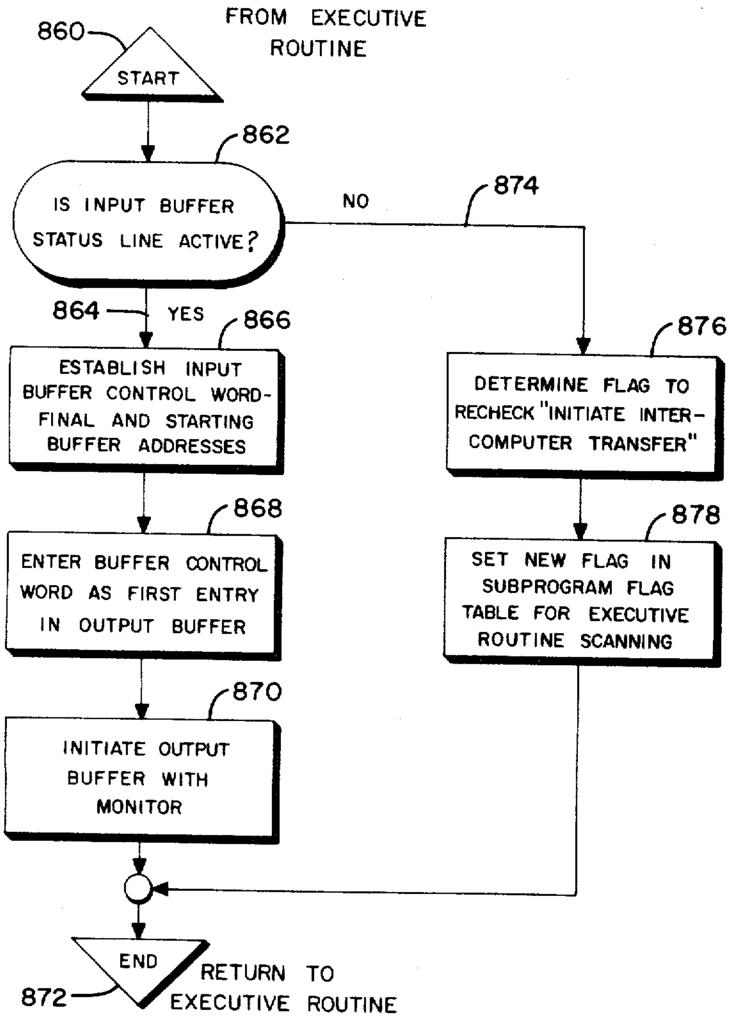

FIG. 31 is a flow-diagram of the Initiate Inter-Computer Transfer subprogram.

Figure 32:
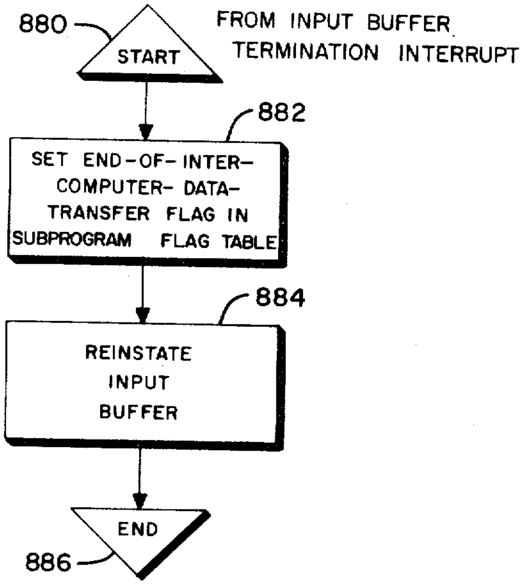

FIG. 32 is a flow-diagram of the Inter-Computer Termination On Interrupt subprogram.

Figure 33:
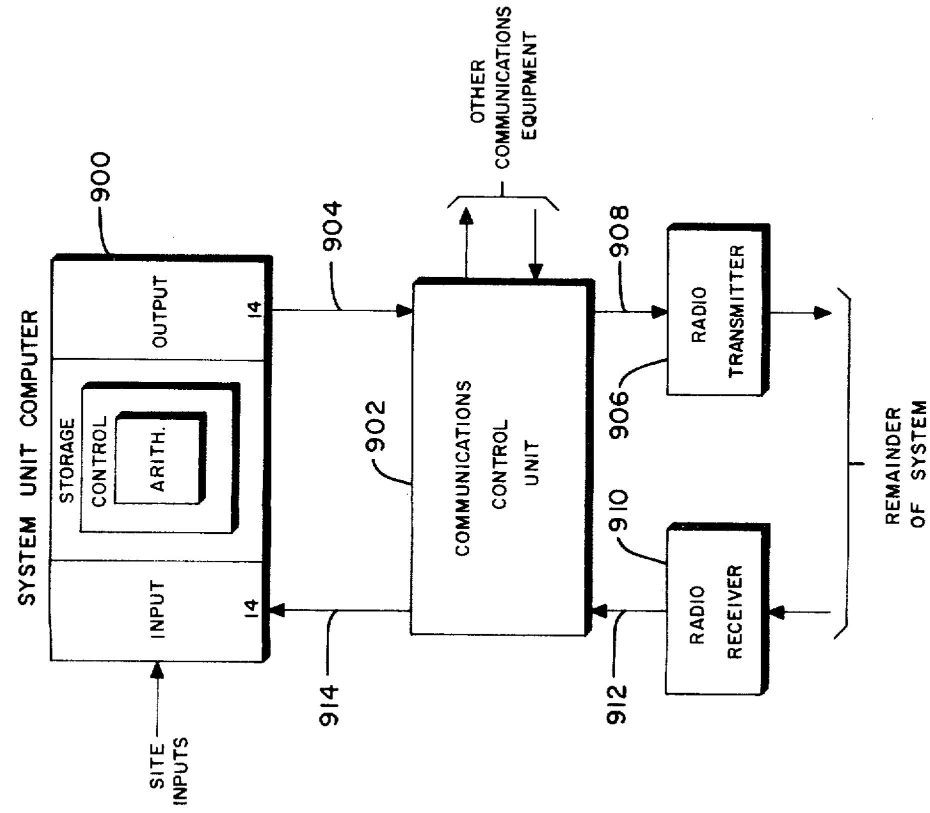

FIG. 33 is a block diagram of the Radio Carrier I equipment connections.

Figure 34:
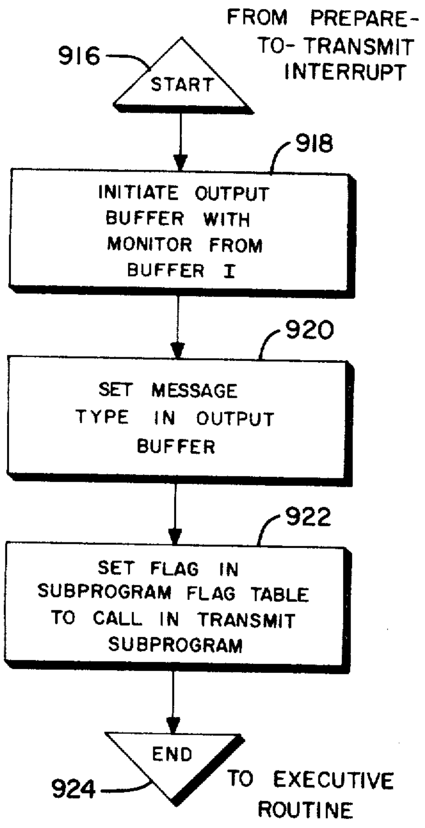

FIG. 34 is a flow-diagram of the Prepare-To-Transmit subroutine.

Figure 35:
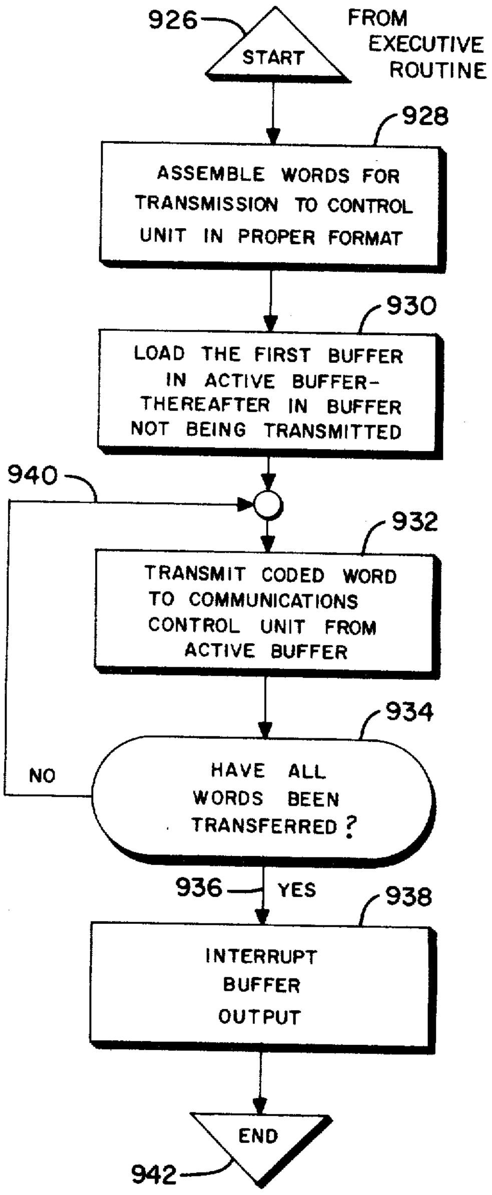

FIG. 35 is a flow-diagram of the Transmit-To-System Via Radio Carrier I subprogram.

Figure 36:
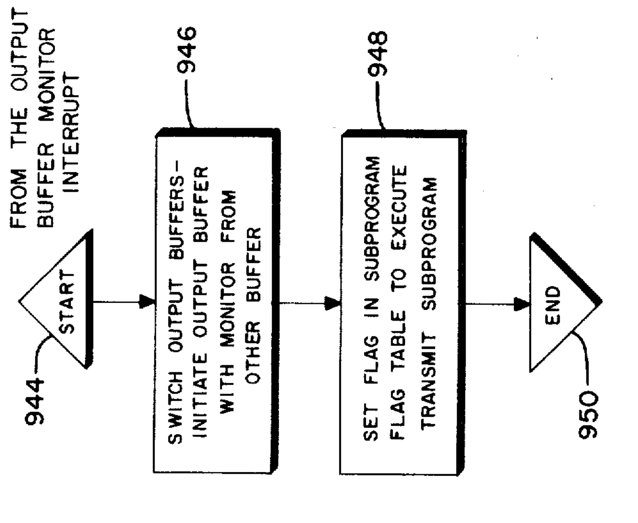

FIG. 36 is a flow-diagram of the Output Monitor subroutine.

Figure 37:
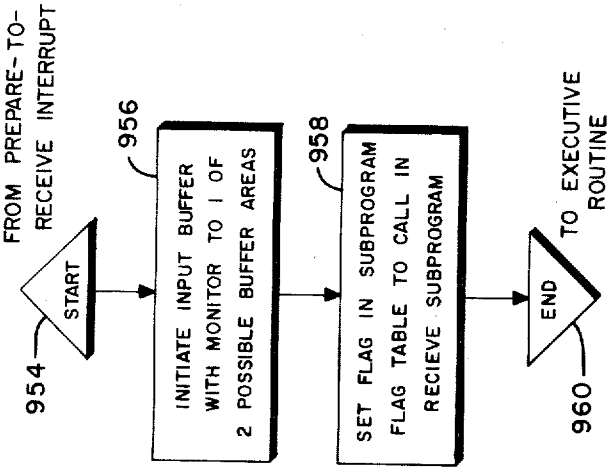

FIG. 37 is a flow-diagram of the Prepare-To-Receive subroutine.

Figure 38:
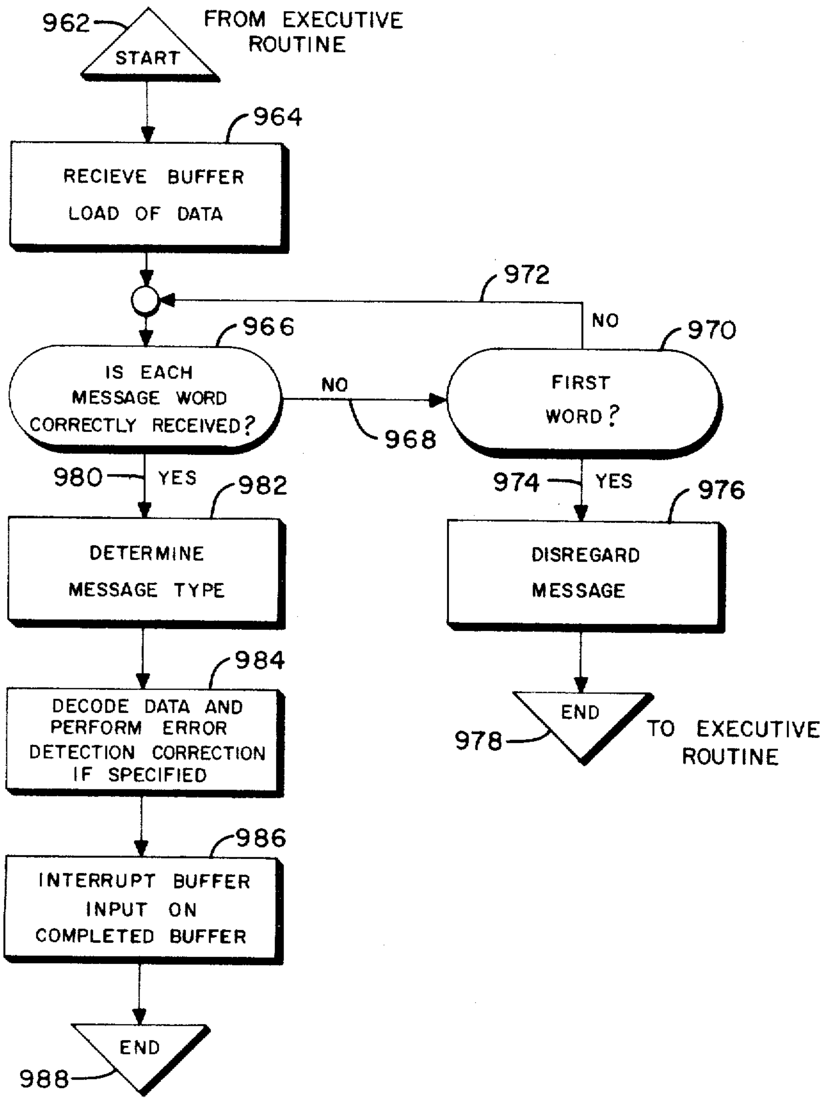

FIG. 38 is a flow-diagram of Receive-From-System Via Radio Carrier I subprogram.

Figure 39:
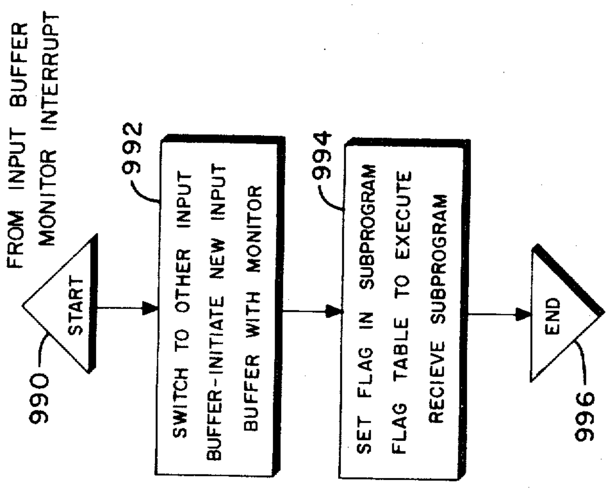

FIG. 39 is a flow-diagram of the Input Buffer Monitor subroutine.

Figure 40:
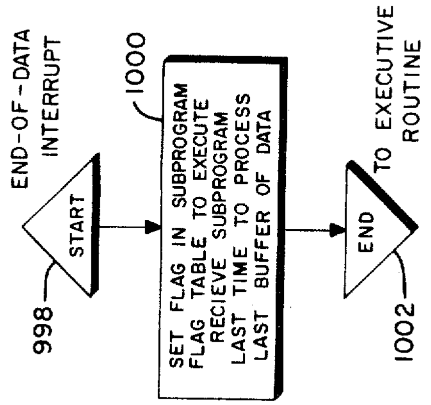

FIG. 40 is a flow-diagram of the End-Of-Data Interrupt subroutine.

Figure 41:
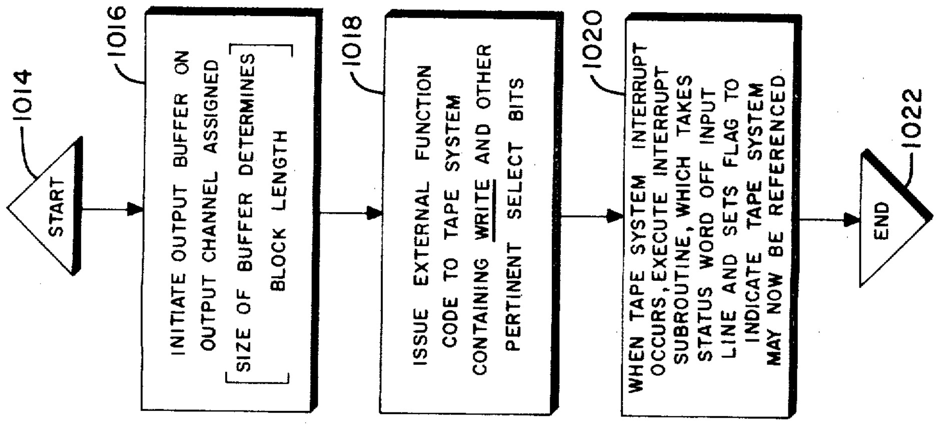

FIG. 41 is a flow-diagram of the Write on Magnetic Tape subprogram.

Figure 42:
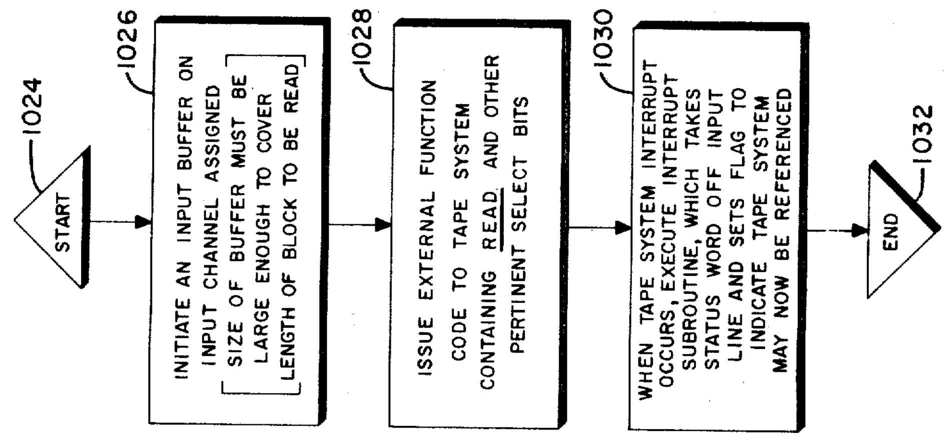

FIG. 42 is a flow-diagram of the Read From Magnetic Tape subprogram.

Figure 43:
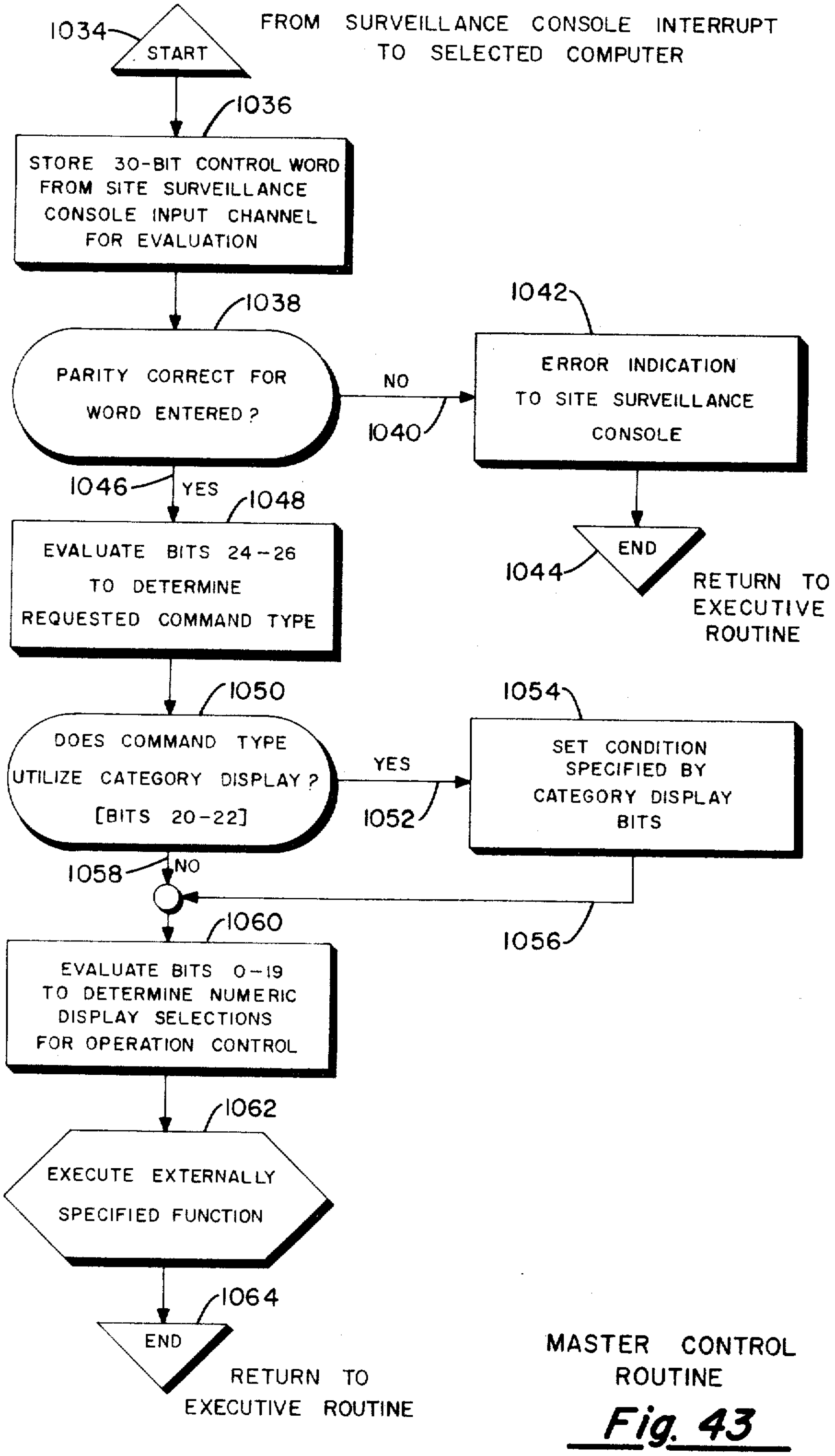

FIG. 43 is a flow-diagram of the Master Control Routine.

The invention will appear more clearly from the following detailed description when taken in connection with the accompanying drawings of the preferred embodiment of the inventive idea.

SECTION C. EXAMPLE SYSTEM ENVIRONMENT

Figure 1:
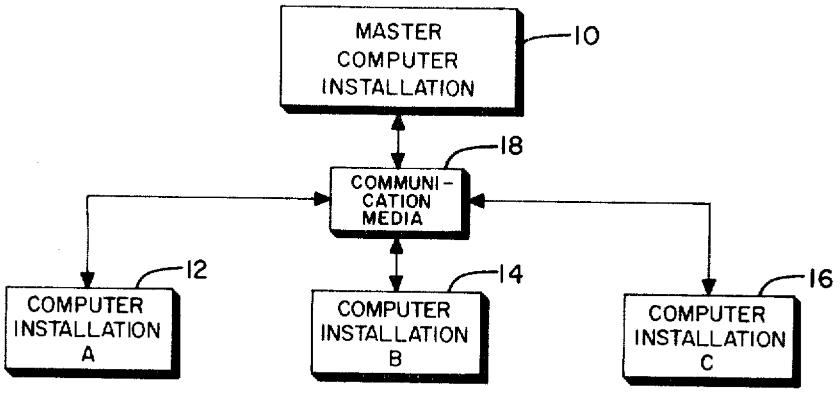
FIG. 1 is a block diagram of a system incorporating the multi-computer concepts of this invention.

FIG. 1 illustrates in block diagram form a four-installation computer network. The master computer installation 10 would normally be located in the area of the main business office of a commercial firm. Such an installation would normally be utilized to monitor all of the outlying installations, while performing the required administrative, bookkeeping, and computational functions necessary at the site of the master installation 10. FIG. 1 also illustrates the system which utilizes three outlying computer installations such as installation A labeled 12, installation B labeled 14, and installation C labeled 16. These particular installations may be located at remote sites such as in different cities, in different buildings in the same city, or in different rooms within the same building. Likewise, they may be located in the same city as the master computer installation 10, or they may be located in cities remote from the master installation. It should be noted at this point that the concept of this invention is not limited to the four installations illustrated, but may consist of a greater number or a lesser number of such installations. It is necessary that each of the installations have some function, either by way of contribution to the system of information, or use of system-supplied information. Some examples of such a situation will be summarized now. The situation can be considered where computer installation A is a site which is utilized primarily to regulate and guide the "cracking" process (extraction of various products from "crude oil") of petroleum. This necessarily will result in the production of various types of petroleum products in varying amounts which must be inventoried. Also in the process of processing the petroleum products it is necessary to utilize machinery which is subject to wear and depletion, thereby requiring repair by way of replacing worn out parts. The same computer complex is utilized to provide the automatic control of the manufacturing machines such as turret lathes, punch presses, etc., which would be utilized to generate repair parts as they are needed. Assuming that installation A is at a city remote from the main administrative office of the operating corporation, it is desirable for the same computer complex to operate to perform the bookkeeping tasks and prepare the payroll for the particular site. It can be seen that these functions are all of interest to the computer complex at the installation A, but that they are also of interest to the master computer installation 10, and the other computer installations B and C. This follows from the fact that the amount of petroleum product generated will bear directly on the operation of a similar processing plant which is controlled by computer installation B. Also the payroll data generated for the employees located at computer installation A is of interest to the master computer installation 10 where the data is entered such that the master books for the operating company can be kept current. The master computer installation can utilize information transmitted from computer installation A concerning the amount of petroleum products processed to regulate the output of the plant located at another city which is designated as computer installation B, and thereby maintain the most efficient usage of the plant facilities that are available to produce a specified amount of each specific product. Carrying the example farther the computer installation C is a distribution point for the petroleum products generated by installation A and installation B. This means that the bulk products are piped or transported to various localities, the various packaging processes required to distribute such products as motor oil, grease, heavy duty oil, and the like, would be carried on in addition to the other distribution processes. Installation C also has the problem of generating a payroll and maintaining up-to-date inventories of the products distributed. This information, too, is of interest at the master computer installation 10 so that as inventories are depleted, instructions can go out to installation A and installation B to increase the output of the bulk petroleum products. Further, as in the other cases, the payroll information, as well as the total inventory information, should be available at the master computer installation for immediate viewing by the management of the corporation.

From this example it can be seen that the diverse types of problems to be handled are present at all of the installations, and are of interest to other installations in the system. Since this information is of interest to the overall computer system complex, it is necessary that some form of communication medium 18 be set up for the transmittal of data from one site to another. Communication can be carried on from one computer to another specific computer installation such as from installation A to installation B by way of telephone lines, Teletype, radio, etc. Likewise communication can be carried on from one installation such as master computer installation 10 to the rest of the entire computer system complex by way of radio links.

This is only one example of a far flung system which can advantageously utilize the concept of this invention. Other such applications come readily to mind such as the large insurance companies which process a multitude of policy holders with respect to new policies, terminated policies, claims, records of premiums, etc., and the ever-present payroll and bookkeeping problems at each of the installations. Another example is the massive distributing companies which supply various localized outlets with the particular product, which, in turn, distributes the goods on out to the retailer. Problems arise here in the maintenance of inventories of the various sites, the preparation of payroll information, the preparation and maintenance of accounts and books with respect to the customers, the calculations required to determine the most efficient use of available facilities, etc.

Each of the installations illustrated in FIG. 1 has at least one computer located at the site, and may have more than one at each site. For this embodiment of the invention it is assumed that there are at least two Unit computers at each of the installations. This is illustrative and not intended to be a limitation on the inventive concept. The nature of the Unit computer, and the interrelationship between the two or three computers which form the installation will be described below.

SECTION D. UNIT COMPUTER CHARACTERISTICS

This embodiment of the invention utilizes identical computers in all of the locations shown. This need not be the case, however, since it is possible to utilize a more or less versatile computer at any installation so long as the computational speed requirements are met, and the system and functional operation interfaces are compatible with the overall system. This embodiment of the invention utilizes a large-scale general-purpose high-speed digital computer which will be termed a "Unit computer" in this discussion. This computer emphasizes rapid communication with external devices and implies a large arbitrarily accessible internal storage. The Unit computer is of the stored program type. That is, once the program of instructions is written and coded in a form acceptable to the computer, it is entered into the storage section of the computer via one of the pieces of the peripheral equipment. From this point on, the computer, upon proper initiation, will execute the series of instructions which make up the program, and thereby perform its intended function. Single-address instructions are employed and have an average execution time of 13 microseconds. These instruction words are the same number of bits (binary digits) as are utilized in the memory registers of the computer. Each memory section register is selectively addressable either as a single 30-bit word, or as two independent 15-bit words.

The Unit computer utilizes the parallel binary mode in the performance of arithmetic and logical operations. A one's complement subtractive arithmetic system of modulus $2^{30}-1$ is used.

Communication between the Unit computer and its associated external equipment is normally handled by a block transfer of data, with timing under control of the external device. Such transfers of data have independent access to storage to thereby allow asynchronous operation with the main computer program. A communication path is established by a sequence of request and response signals between the selected external equipment and the computer. Such signals may originate in either the computer or the external device. The main computer program is interrupted by external request signals and a communication channel is established. Once the link has been created, the computer returns to the main program sequence and the block transfer of input or output data proceeds without program reference until completed. The Unit computer employs 14 input and 14 output channels each comprised of 30 parallel lines. Two input and two output channels are reserved for communication with other computers. Output channels can carry external function words as well as data words, and can thereby specify the function desired of the selected external equipment.

Figure 3:
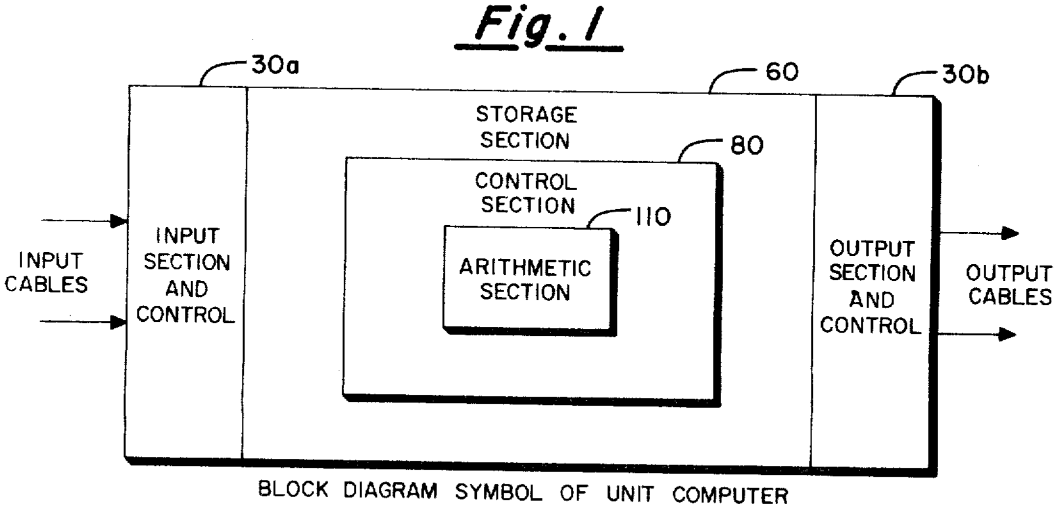
FIG. 3 is the symbolic block diagram symbol utilized to represent the Unit computer.
Figure 2:
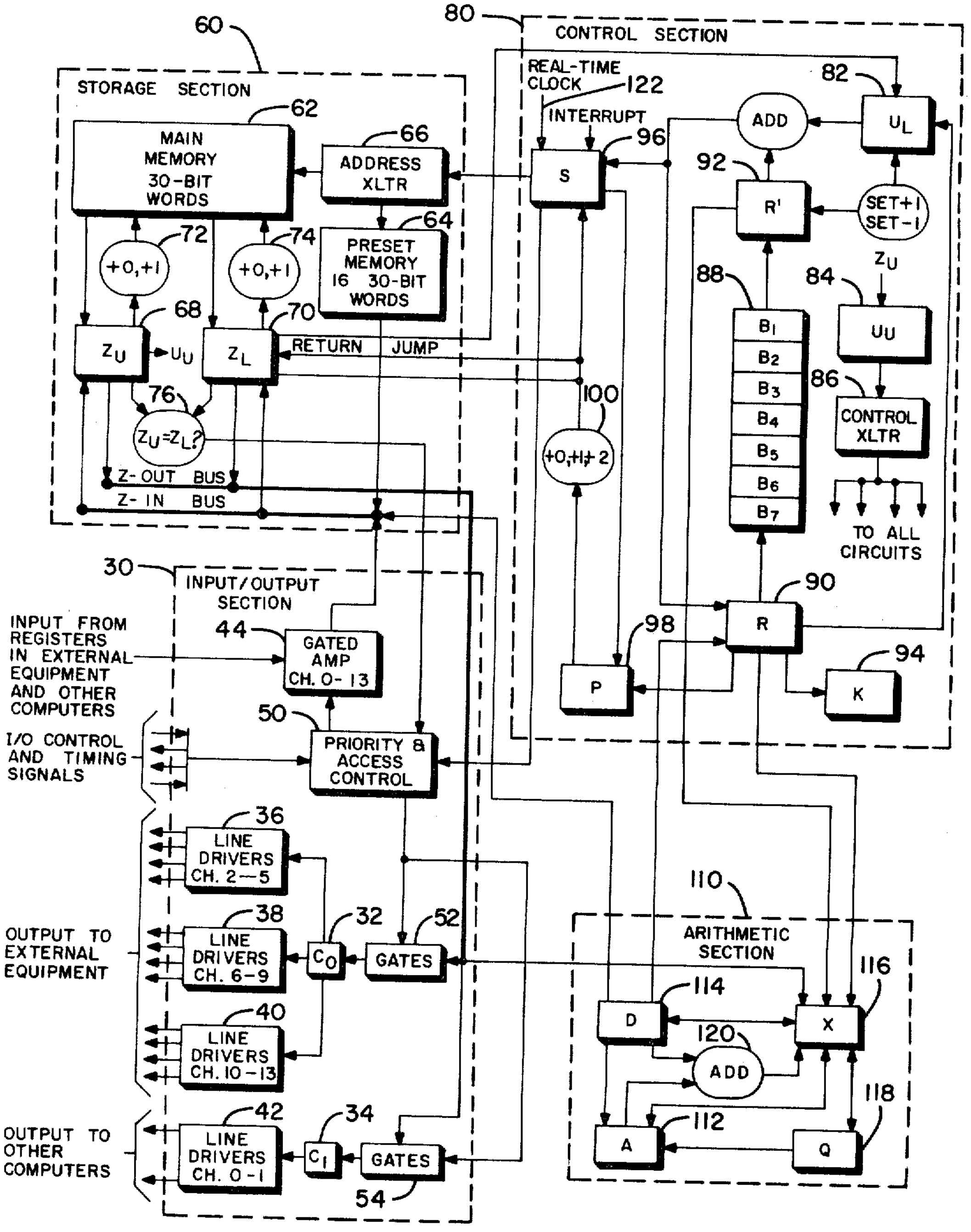
FIG. 2 is a simplified functional block diagram of the Unit computer showing the relationship of the major sections.

A simplified block diagram of a Unit computer appears in FIG. 2, and for explanatory purposes may be described in four major sections: Input/Output, Storage, Control, and Arithmetic. FIG. 3 shows in block form the operational relationship of parts of the computer and will be used in system diagrams. The reference numbering corresponds to that used for the respective sections in FIG. 2. Abbreviations on the diagram are explained as the various sections are discussed.

(D–*a*) *Input/Output*

The Input/Output section includes those data paths and control circuits used by the computer for communicating with external equipment, as is shown enclosed in block 30 in FIG. 2. The detailed operation of the Input/Output section of the Unit computer is described in copending application entitled, Computer Input-Output System, Ser. No. 156,375, filed Dec. 1, 1961, and is assigned to the assignee of this invention. In FIG. 3 the functional operation is shown separately such that the Input section is represented by block **30*a* and the Output section is represented by block 30*b*. The main parts of the Input/Output section are: (1) Two output registers consisting of the $C_0$-register 32, and the $C_1$-register 34 with their associated line drivers 36–40, and 42 respectively; (2) 14 sets of gated input amplifiers 44, and (3) priority and access control circuits 50**.

The $C_0$-register 32 is used for transmission to all external devices except other computers. As illustrated in FIG. 2, the $C_0$-register 32 receives inputs directly from Storage section via gates 52 which are controlled by the priority and access circuits 50. Three sets of line drivers 36, 38 and 40 branch from the output $C_0$-register 32; each set being utilized to drive four output channels with gated registers located in the external device.

The $C_1$-register 34 handles the transmission of data between computers over two special output channels. Operation of this register is similar to that of the $C_0$-register 32 in that data words enter the $C_1$-register from Storage via gates 54 which are controlled by the priority and access circuitry 50 and are transmitted over the active channel by a set of 30 line drivers.

The output channels of this embodiment are numbered from 0 to 13, and if two or more transmissions are simultaneously requested, the channel with the highest number is granted priority with the others following in order. A set of 30 gated amplifiers 44 is provided for each of the 14 input channels. These gates are controlled by the priority and access circuits 50, with the channel having the highest number being given priority for the instance when two or more channels are simultaneously requested. As in the case of output channels, channels 0 and 1 are used for inter-computer communication, and therefore receive the lowest priority. It should be noted that this method of treating input data eliminates the need for input buffer registers and gives the external equipment direct access to the computer's internal memory.

Some functions of the priority and access circuits 50, such as gating input and output transmissions and assigning priorities to the channels, have previously been described. Additionally, these circuits operate to accept and transmit the control and timing signals which must be exchanged between computer and equipment with which it communicates. A further function includes a means of testing the various channels to determine whether they are currently being utilized to thereby prevent the computer from attempting to communicate over a channel already in use.

The main memory addresses referenced during the particular input or output transfer are determined by a special I/O control word. One such word is assigned to each channel. It is sufficient for this summary to note that a signal generated by the I/O control word is used by the priority and access circuits 50 to de-activate the channel after the proper number of words has been transferred.

(D–*b*) *Storage*

The Storage section of the Unit computer is enclosed in dashed line 60 in FIG. 2, and consists of the main memory 62, wired auxiliary memory 64, and the associated address transfer circuits 66, and control circuits. The main memory 62 is constructed of a modular array of ferrite cores for this embodiment. It is coincident-current-driven, and is addressed via the address translator 66. The contents of the referenced address is read into the 30-bit Z-register which is comprised of two 15-bit sections termed Z upper ($Z_U$) 68, and Z lower ($Z_L$) 70 to provide for the optional use of 15-bit half words as described above. The main memory operates in the destructive read-out mode, with the time required for the read-restore cycle is approximately 8 microseconds. During the restore portion of the cycle, the contents of the 15-bit $Z_U$-register 68, or the 15-bit $Z_L$-register 70 may be increased by one as indicated by the $+0$, $+1$ modifier boxes 72, 74. This facility is utilized in conjunction with the Input/Output section 30 for automatically increasing the I/O control words, with the result that addresses referenced during a block transfer of data are automatically advanced. In conjunction with these modifier boxes 72, 74, the comparator, $Z_U=Z_L$?, labeled 76, is used to detect coincidence between the two halves of the I/O control word. When such coincidence occurs, a signal is generated to terminate the I/O transfer.

(D–*c*) *Control*

The control section of the Unit computer illustrated in FIG. 2 is enclosed by dashed line 80 and consists of those registers and circuits necessary to procure, modify, and execute instructions of the stored program. Control is synchronized by means of a clock (not shown) which operates to produce pulses at a predetermined frequency. Each instruction word to be executed is transmitted to the program-control register, designated the U-register, which is divided into two 15-bit registers, the $U_L$-register 82 and the $U_U$-register 84. The function code and the various execution modifiers are translated by the Control Translator 86 from the appropriate section of this register. The $U_L$-register has addition properties, modulus $2^{15}-1$, and is utilized when address modification is required before execution of the instruction by the contents of one of the appropriate B-registers 88.

The 15-bit R-register 90 and the 15-bit R'-register 92 operate as communication registers for the B-registers 88 such that all internal transmission to or from the B-registers pass through them. The 6-bit K-register 94 operates as a shift counter for all arithmetic operations that involve shifts. The 15-bit S-register 96 holds the storage address during a memory reference and is utilized in conjunction with the Storage section 60 to gain access to the main memory 62. Instruction words are obtained from the Storage section of the computer under control of the storage address register 96 and are loaded into the instruction register where they are retained during the execution of the instruction. As was stated above, the Unit computer is concerned and operates as a stored program device, hence, once the program is written and stored in the computer in the appropriate form in the Storage section 60, it is free to operate automatically. Upon proper initiation, the Unit computer will execute the series of instructions making up the program. Normally, the instructions of the program are stored in the main memory 62 of the Unit computer in a sequential manner, such that the computer will first execute the instruction whose address has initially been set in the program address counter, or P-register 98. It then proceeds in an instruction-by-instruction manner to the highest address. The modifier box 100 is included to indicate that as each instruction is executed, the address of the current instruction is incremented by $+0$ in a case of a repeat, by $+1$ in cases where the execution of instructions has to take place in sequential order, and by $+2$ in a case where a SKIP condition is satisfied.

(D–*d*) *Arithmetic*

The Arithmetic section of the Unit computer is shown enclosed by dashed line 110 and is that part of the computer puter which performs the numeric and logical calculation. Though greatly simplified, FIG. 2 shows the important components of the Arithmetic sections which are the A-register 112, the D-register 114, the X-register 116, the Q-register 118, and the ADD circuitry 120. The 30-bit A-register 112 may be thought of for programming purposes as a conventional accumulator register, but because of the logic employed, the A-register is actually only the primary rank of the accumulator. In addition to the A-register, the accumulator utilizes the D-register 114 as a second rank. This yields a configuration which is different from former and the so-called "usual" arrangements, but permits the use of a more reliable logical building-block circuit. To illustrate the interrelationship of these registers consider the ADD operation, wherein the augend is placed in the A-register 112, and the addend is placed initially in the D-register 114. As the addition is performed by the ADD tree 120 the sum is formed in parallel and placed in the X-register 116, and at completion is transmitted back to the A-register. The utilization of the 30-bit Q-register 118 is primarily during the Multiply and Divide operations to yield a double-length register in conjunction with the A-register 112. The Q-register is also used extensively in the many logical instructions available in the Unit computer.

(D–*e*) *Real-time clock*

In addition to the four main sections of the computer just described, the Unit computer has a real-time clock 122 which is incremented automatically by the computer upon signal of a 1/1024 c.p.s. crystal-controlled oscillator to be maintained accurate to the nearest $2^{-10}$ second, and is utilized to maintain an accurate record of time. This clock may be used to log the receipt times of a periodic real-time input. Each message and its receipt time may be recorded together. Another use of the clock is to initiate periodic programmed operations without requiring more than occasional attention of the main program. Since the clock re-cycles only once in approximately a week, it is suitable for use where the computer is used on an around-the-clock basis. This provides a function which is readily adaptable to the use in process control and many other real-time operational functions.

(D–*f*) *Instruction word format*

In FIG. 4*a* is shown a format of the instruction word employed in association with the Input/Output section of the Unit computer. In FIG. 4*b* is shown the format of the instruction word used with all other instructions for the Unit computer. The term "instruction" as used herein signifies a predetermined timed sequence of events to be performed within the computer. Each instruction is represented initially by what is commonly termed an "instruction word," which is represented by a predetermined set of electrical signals included to represent either variable or invariable instructions, and appears as a configuration in the binary number system. An instruction word is 30-bits in length, and is made to be able to be stored in one memory section register. An instruction word is the primary indication to the computer of a sequence of events which it is to perform. When the instruction word is translated by the control translator 86 the electronic and electrical hardware in the computer causes a succession of signals termed "commands" or "command enables" to be developed to cause the execution of sequences which will result in the performance of the functions designated by the instruction. The terms "program" or "routine" refer to a predetermined set of instructions arranged in a particular manner to effect the solution of a desired problem or to execute a given action.

As can be seen from FIG. 4*b*, the instruction word is comprised of five sections termed "designators," which are the *f, j, k, b* and *y* designators. It will be noted that the same designators appear in FIG. 4*a* with the variation being that the *j* designator shown in FIG. 4*b* appears as the *j** designator in 4*a*, and the *k* designator in FIG. 4*b* appears as the *k** designator in FIG. 4*a*. The reason for this variation will be discussed later. The *f* designator is normally 6-bits in length and indicates the particular instruction to be executed, such as ADD, SUBTRACT, etc., and is commonly termed the "operation" code, which is abbreviated to "OP" code. The *j, k, b,* and *y* designators allow modifications of the basic computer sequence specified by the *f* designator. For all instructions except the Input/Output instructions, the length of the *j* designator is 3 bits, and is used in the majority of instructions for jump and skip determination, for instruction operand modification selection, and for repeat status interpretation. When the Unit computer is executing an Input/Output type instruction, the configuration illustrated in FIG. 4*a* prevails and the *j* designator is denoted by *j** and is increased in size to 4-bits to thereby allow the designation of the 0–13 Input/Output channels. The *k* (or *k** in the case of I/O instructions) designator controls the interpretation of the operand. The *b* designator appears in bit position 17, 16, and 15 of the instruction word, and specifies which one of the B-registers 88, which are labeled $B_1$ through $B_7$, will be used to modify the operand designator *y*. The operand designator termed the *y* designator is utilized either to indicate the address in the memory section 62 where the operand is stored, or may itself be a 15-bit operand, as designated by the particular *k* designator.

Associating FIGS. 4*a* and 4*b* to FIG. 2, it can be seen that the upper half of the instruction will be stored in the $U_U$-register 84, and will thereby contain the *f, j,* or *j**, *k* or *k**, and *b* designators. The lower half of the instruction will be stored in the $U_L$-register 82, which will thereby contain the operand designator *y*. The control translator 86 is connected to the output of the $U_U$-register 84, and is utilized to interpret the function code to determine the computational operation designated by the *f* designator, with the various execution modifiers to produce the proper command enable signals to execute the total instruction as specified. If address modification is required prior to the execution of the instruction, the contents of a predetermined one of the B-registers 88, as specified by the *b* designator, is added to the contents of the lower order 15-bits of the instruction word, which is stored in the $U_L$-register 82, before execution. Not shown in the block diagram of FIG. 2 in the control section 80 are the circuits required for the timing and execution of the instructions.

(D–*g*) *Instruction sequences*

The executions of the instruction in the Unit computer are carried on in response to clocked major "sequences." The timing is such that the utilization of these sequences may in effect cause instructions to slightly overlap thereby optimizing the speed of calculation of the Unit computer. The major sequences are termed A, B, C, and D, each of which performs a logical portion of an instruction. The A sequence controls the timing necessary to obtain an instruction from the memory which is to be executed, and places it in the 30-bit U-register (see FIG. 2). Following the completion of this sequence, the B sequence timing will select the operand, as controlled by the *k* designator, and place it in the D-register 114 (assuming an operand is required). The arithmetic computations are initiated under the control of the C sequence. In the event that the instruction to be executed is of the "store" class, the D sequence will be initiated thereby controlling the storage of the resulting operand in the main memory.

The major sequences, A, B, C, and D are performed successively to execute an instruction. While the execution of every instruction is accomplished by means of A, B, and C, many instructions do not utilize the D sequence. As was mentioned above, only those instructions which store an operand use the D sequence.

In addition to the major sequences, there are minor sequences which generally perform specific and more simple operations. All subsequences are initiated by a major sequence. For example, during the B sequence the operand referenced for arithmetic operation is read to the D-register. This transmission of data is accomplished by initiation of the "read as modified by *k*" subsequence.

In general it can be said that the major sequences accomplish the following:

(1) A sequence—read the next instruction as designated by the P-register from memory, and modify $U_L$ as directed by the index modifier *b* (*xx xxb xxxxx*).

(2) B sequence—read a specified operand as controlled by the *k* designator to the D-register (*xx xkx xxxxx*).

(3) C sequence—accomplish the arithmetic computation and sense for the *j* designator conditions (*xx jxx xxxxx*).

(4) D sequence—store operand (if applicable) as controlled by the *k* designator, providing the OP code portion designates a store instruction.

With respect to the overlapping capability available in the execution of instruction, it can readily be seen that once an instruction has proceeded to the point that the operand is being stored by the D sequence that the next instruction can be partially selected via the A sequence. It should be noted further that optimum usage of time exists in that the D sequence does not occur in the event that an operand is not referenced to be stored by the particular instructions.

SECTION E. REPERTOIRE OF INSTRUCTIONS

This portion of the specifications presents the instruction repertoire for the Unit computer. Details presented herein are limited to the needs of the programmer and list only symbols, registers, terms, and instruction characteristics pertinent to programming the computer.

As mentioned previously, the Unit computer is a self-modifying, single-address computer. Although this means that one reference or address is provided for the execution of an instruction, this reference can be modified automatically during a programmed sequence. The references are modified by using the B (index) registers 88 one through seven, which contain any previously stored constants. To modify the address, the content of a selected B-register is added to the Operand Designator *y*.

A programmed address is coded using octal notation with each octal digit denoting three binary digits. The instructions are read sequentially from Magnetic Core Storage 62 except after Jump or Skip instructions.

FIG. 5 is a listing of all of the instructions available in the Unit computer, and provides the discrete steps which must be used in combination in the solution of a specified problem. The OP Code column gives the numerical reference that must be present in bits 29–24 of the instruction word to perform the desired computational function. The bold face letters in the Mnemonic Instruction column are the symbolic representation of the respective instructions which are utilized in conjunction wtih automated-programming routines to specify the computer operation to be performed. This system is utilized as a memory aid in the preparation of computer programs, rather than having to recall the numerical reference designation of each instruction utilized by the computer. The instruction Function column provides in a short-hand summary from the function that each instruction is to perform. It should be noted that A, Q, and B refer to registers in the Unit computer, as they are explained above, and that (A) is read as the "contents of A," thereby designating the numerical value stored in the A-register.

(E–*a*) *Symbol conventions*

The following symbols are used throughout the descriptive material on instructions:

$\alpha$=$\alpha$ register (A, Q, $B^n$), a memory location Y, or a constant.

($\alpha$)=content of $\alpha$.

$(\alpha)_i$=initial content of $\alpha$.

$(\alpha)_f$=final content of $\alpha$.

$\alpha_n$=the *n*th bit of $\alpha$.

$(\alpha)_n$=the *n*th bit of the content of $\alpha$.

*i* is the *n*th bit position in an instruction:

*f*=Function Code Designator ($i_{29}, \ldots, i_{24}$).

*j*=Branch Condition Designator ($i_{23}, \ldots, i_{21}$).

*j**=Input/Output Channel Designator ($i_{23}, \ldots, i_{20}$).

*k*=Operand Interpretation Designator ($i_{20}, \ldots, i_{18}$).

*k**=Operand Interpretation Designator ($i_{19}, \ldots, i_{18}$).

*b*=Index Designator ($i_{17}, i_{16}, i_{15}$).

*y*=Operand Designator ($i_{14}, \ldots, i_0$).

$\underline{Y}$=The Operand (regardless of source).

$\overline{Y}=y+(B^b)$ (1. The operand or address of the operand for the Read portion of an instruction, or (2) The destination address for the Store portion of an instruction.

(*Y*)=Content of memory address Y.

$L(Y)(Q)$=Bit-by-bit multiplication, logical multiply of $Y_n$, and $(Q)_n$.

*NI*=Next Instruction.

*A*=A-register or accumulator (30-bit arithmetic register).

*B*=Seven B-registers (15 bits each). By-registers are address-modifying registers generally used for indexing loops in a program; in addition $B_7$ serves as a repeat counter. (The address modification does not alter the instructions as stored in memory.) A *b* or *j* designator specifies the B-register used.

*Q*=Q-register (30-bit arithmetic register).

*U*=U-register (30 bits). The U-register holds the instruction word during execution of an operation. If address modification is required before execution, the appropriate B-register content is added to the lower-order 15 bits of the U-register before execution.

*P*=P-register (15 bits). The P-register is the Program Address Register. This register holds the address of the current instruction through-out the program except for Jump instructions where the P-register is cleared and the new program address is entered.

*C*=The 14 Decimal input/output channels (30 lines each). Channels consist of transmission lines, therefore they cannot be considered registers. The designator *j** specifies (in octal) the channel used.

FIGS. 4*a* and 4*b* illustrates bit configuration of instruction designators in two forms.

(E–*b*) *Function code designator f*

The *f* designator (6 bits) appears in bit-positions 29 through 24 of the U-register, or an instruction, designating the function to be performed by that instrutcion. All values of "*f*" other than 00 and 77 are defined in the instruction list. The two codes 00 and 77 are *fault conditions* which, if executed, will cause a fault interrupt. This results in a jump to address 00014, the Fault Entrance Register or address 00014 of wired memory depending on the Automatic Recover Switch setting.

(E–*c*) *Branch condition designator j*

The *j* designator (3 bits) appears in bit-positions 23, 22, and 21 of the U-register, or an instruction; it is used in a majority of the instructions (see FIG. 4*b*). There are three primary categories of use; (1) for Jump and Skip determination, (2) for B-register specification, and (3) for repeat status interpretation. Appropriate interpretations of the *j* designator are listed either below or under the descriptions of the individual instructions.

For those instructions in which the *j* designator has no special interpretation, it specifies the condition under which the next sequential instruction in the program will be skipped. This provides for branching from a sequence without executing a Jump instruction, as would normally occur if a Skip condition were not satisfied.

Skip of the next sequential instruction is determined by the following rules in all instructions except 04, 12, 13, 16, 17, 26, 27, 60 through 67, and 70 through 76.

*j*=0: Do not skip the next instruction.
*j*=1: Skip the next instruction.
*j*=2: Skip the next instruction if (Q) is positive.
*j*=3: Skip the next instruction if (Q) is negative.
*j*=4: Skip the next instruction if (A) is zero (positive zero).
*j*=5: Skip the next instruction if (A) is nonzero.
*j*=6: Skip the next instruction if (A) is positive.
*j*=7: Skip the next instruction if (A) is negative.

When the branch (Skip or Jump) condition involves the sign of the quantity in A or Q, the evaluation examines the sign bit of these quantities; hence, a positive zero (all zeros) is considered a positive quantity, and a negative zero (all ones) is considered a negative quantity.

(E–*d*) *Input/Output channel designator j**

The *j** designator (4 bits) appears in bit-positions 23, 22, 21, and 20 of the U-register, or an Input/Output instruction, specifying the C-channel for the instruction (see FIG. 4*a*). Bit 23 assumes a value of eight, bit 22 a value of four, bit 21 a value of two, and bit 20 a value of one; thus the *j** designator provides accessibility to the 14 (decimal) Input/Output channels numbered $0–15_8$.

Instructions 13, 17, 62, 63, 66, 67, 73, 74, 75 and 76 use the *j** designator configuration.

(E–*e*) *Operand interpretation designator k or k**

The *k* designator (3 bits) [or *k** designator (2 bits)] appears in bit-positions 20, 19, and 18 of the U-register, or an instruction; a *k** designator appears only in bit-positions 19 and 18, since bit 20 is a portion of the *j** designator (see FIG. 4*a*). Instructions 13, 17, 62, and 73 through 76 use the *k** designator configuration since they perform Input/Output activities and require a *j** designator for channel specification.

The *k* and *k** designators control operand interpretation. Those instructions which read an operand but do not replace it after the arithmetic is performed are designated Read instructions. Those instructions which do not read an operand but store one are designated Store instructions. Instructions which both read and store operands are classified as Replace instructions.

The various values of *k* or *k** affect the operand in the following list except where otherwise noted under individual instruction descriptions.

(1) Read instructions (01 through 13, 20 through 23, 26, 27, 30, 31, 40 through 43, 50 through 53, and 60 through 76):

*k* or *k**=0: $\underline{Y}_U$=0's; $\underline{Y}_L=Y$
*k* or *k**=1: $\underline{Y}_U$=0's; $\underline{Y}_L=(Y)_L$
*k* or *k**=2: $\underline{Y}_U$=0's; $\underline{Y}_L=(Y)_U$
*k* or *k**=3: $\underline{Y}=Y$
*k*=4: $\underline{Y}_U$=same bits as $\underline{Y}_{14}$; $Y_L=Y$
*k*=5: $\underline{Y}_U$=same bits as $\underline{Y}_{14}$; $Y_L=(Y)_L$
*k*=6: $\underline{Y}_U$=same bits as $\underline{Y}_{29}$; $Y_L=(Y)_U$
*k*=7: $\underline{Y}=(A)$ For instructions 23, 52, and 53, *k*=7 is not used.
For instruction 13, only *k**=3 is permitted.
For instructions 73 through 76, *k**=2 is not used.

(2) Store instructions (14 through 16, 17, 32, 33, and 47):

*k*=0: Store (A or $B^j$) in Q. [Addr. 14 000 00000 complements (Q)]
*k*=1: Store ($A_L$, $Q_L$, or $B^j$) in $Y_L$, leaving $(Y)_U$ undisturbed.
*k*=2: Store ($A_L$, $Q_L$ or $B^j$) in $Y_U$, leaving $(Y)_L$ undisturbed.
*k* or *k**=3: Store (A, Q, $C^j$, or $B^j$) in Y.
*k*=4: Store (Q or $B^j$) in A. [Addr. 15 040 00000 complements (A)]
*k*=5: Store complement of ($A_L$, $Q_L$, or $B^j$) in $Y_L$, leaving $(Y)_U$ undisturbed.
*k*=6: Store complement of ($A_L$, $Q_L$, or $B^j$) in $Y_U$, leaving $(Y)_L$ undisturbed.
*k*=7: Store complement of (A, Q, or $B^j$) in Y. (Storing the complement of $B^j$ is the same complement as for a 30-bit register).

For instruction 17, only *k**=3 is permitted.

(3) Replace instructions (24, 25, 34 through 37, 44 through 46, and 54 through 57):

*k*=0: Not used.
*k*=1: Read portion—$\underline{Y}_U$=0's; $\underline{Y}_L=(Y)_L$. Store portion—stores ($A_L$, $Q_L$, or $B^j$) in $Y_L$, leaving $(Y)_U$ undisturbed.
*k*=2: Read portion—$\underline{Y}_U$=0's; $\underline{Y}_L=(Y)_U$. Store portion—stores ($A_L$, $Q_L$, or $B^j$) in $Y_U$, leaving $(Y)_U$ undisturbed.
*k*=3: Read portion—$\underline{Y}=Y$. Store portion—stores (A, Q, or $B^j$) in Y.
*k*=4: Not used.
*k*=5: Read portion—$\underline{Y}_U$=same bits as $Y_{14}$; $Y_L=(Y)_L$. Store portion—stores ($A_L$, $Q_L$, or $B^j$) in $Y_L$, leaving $(Y)_U$ undisturbed.
*k*=6: Read portion—$\underline{Y}_U$=same bits as $Y_{29}$; $Y_L=Y_U$. Store portion—stores ($A_L$, $Q_L$, or $B^j$) in $Y_L$, leaving $(Y)_U$ undisturbed.
*k*=7: Not used.

The Repeat instruction requires special interpretation when followed by a Replace instruction. See details under Instruction No. 70, Repeat.

(E–*f*) *Index Designator b*

The *b* designator (3 bits) appears in bit-positions 17, 16, and 15 of the U-register, or an instruction (see FIG. 4), specifying which of the B-registers, if any, will be used to modify the Operand Designator, *y*, to form $Y=y+(B^b)$. This operation employs an additive accumulator; hence, a quantity consisting of all zeros cannot result unless the bits of both the Operand Designator, *y*, and $(B^b)$ are all zeros.

Effect of the various values of *b*, the Index Designator, is summarized:

*b*=0: Do not modify *y*.
*b*=1: Add $(B_1)$ to *y* (modulo $2^{15}-1$).
*b*=2: Add $(B_2)$ to *y* (modulo $2^{15}-1$).
*b*=3: Add $(B_3)$ to *y* (modulo $2^{15}-1$).
*b*=4: Add $(B_4)$ to *y* (modulo $2^{15}-1$).
*b*=5: Add $(B_5)$ to *y* (modulo $2^{15}-1$).
*b*=6: Add $(B_6)$ to *y* (modulo $2^{15}-1$).
*b*=7: Add $(B_7)$ to *y* (modulo $2^{15}-1$).

(E–*g*) *Operand Designator y*

The *y* designator (15 bits) appears in bit-positions 14 through 0 of an instruction (see FIG. 4). The operand ($\underline{Y}$) or address of the operand (Y) is relative to *y* since $Y=y+(B^b)$.

(E–*h*) *Magnetic Core memory assignment*

The main Magnetic Core memory consists of 32,768 addressable storage locations. Seventy-three of these locations are special-purpose and provide eight distinct functions:

(1) The starting address from MASTER CLEAR—Address 00000
(2) The Fault Entrance Register—Address 00000
(3) The Real-Time Clock Register—Address 00036
(4) External Interrupt Entrance Register for each channel
Overtime Interrupt Entrance Register for Channel 0—Address 00020
Overtime Interrupt Entrance Register for Channel 1—Address 00021

External Interrupt Entrance Register for Channel 2—Address 00022

External Interrupt Entrance Register for Channel 3—Address 00023

External Interrupt Entrance Register for Channel 4—Address 00024

External Interrupt Entrance Register for Channel 5—Address 00025

External Interrupt Entrance Register for Channel 6—Address 00026

External Interrupt Entrance Register for Channel 7—Address 00027

External Interrupt Entrance Register for Channel 10—Address 00030

External Interrupt Entrance Register for Channel 11—Address 00031

External Interrupt Entrance Register for Channel 12—Address 00032

External Interrupt Entrance Register for Channel 13—Address 00033

External Interrupt Entrance Register for Channel 14—Address 00034

External Interrupt Entrance Register for Channel 15—Address 00035

(5) Internal Interrupt Entrance Register for each Input Channel

Internal Interrupt Entrance Register for Input Channel 0—Address 00040

Internal Interrupt Entrance Register for Input Channel 1—Address 00041

Internal Interrupt Entrance Register for Input Channel 2—Address 00042

Internal Interrupt Entrance Register for Input Channel 3—Address 00043

Internal Interrupt Entrance Register for Input Channel 4—Address 00044

Internal Interrupt Entrance Register for Input Channel 5—Address 00045

Internal Interrupt Entrance Register for Input Channel 6—Address 00046

Internal Interrupt Entrance Register for Input Channel 7—Address 00047

Internal Interrupt Entrance Register for Input Channel 10—Address 00050

Internal Interrupt Entrance Register for Input Channel 11—Address 00051

Internal Interrupt Entrance Register for Input Channel 12—Address 00052

Internal Interrupt Entrance Register for Input Channel 13—Address 00053

Internal Interrupt Entrance Register for Input Channel 14—Address 00054

Internal Interrupt Entrance Register for Input Channel 15—Address 00055

(6) Internal Interrupt Entrance Register for each Output Channel

Internal Interrupt Entrance Register for Output Channel 0—Address 00060

Internal Interrupt Entrance Register for Output Channel 1—Address 00061

Internal Interrupt Entrance Register for Output Channel 2—Address 00062

Internal Interrupt Entrance Register for Output Channel 3—Address 00063

Internal Interrupt Entrance Register for Output Channel 4—Address 00064

Internal Interrupt Entrance Register for Output Channel 5—Address 00065

Internal Interrupt Entrance Register for Output Channel 6—Address 00066

Internal Interrupt Entrance Register for Output Channel 7—Address 00067

Internal Interrupt Entrance Register for Output Channel 10—Address 00070

Internal Interrupt Entrance Register for Output Channel 11—Address 00071

Internal Interrupt Entrance Register for Output Channel 12—Address 00072

Internal Interrupt Entrance Register for Output Channel 13—Address 00073

Internal Interrupt Entrance Register for Output Channel 14—Address 00074

Internal Interrupt Entrance Register for Output Channel 15—Address 00075

(7) Input Buffer Control Register for each Input Channel

Input Buffer Control Register for Input Channel 0—Address 00100

Input Buffer Control Register for Input Channel 1—Address 00101

Input Buffer Control Register for Input Channel 2—Address 00102

Input Buffer Control Register for Input Channel 3—Address 00103

Input Buffer Control Register for Input Channel 4—Address 00104

Input Buffer Control Register for Input Channel 5—Address 00105

Input Buffer Control Register for Input Channel 6—Address 00106

Input Buffer Control Register for Input Channel 7—Address 00107

Input Buffer Control Register for Input Channel 10—Address 00110

Input Buffer Control Register for Input Channel 11—Address 00111

Input Buffer Control Register for Input Channel 12—Address 00112

Input Buffer Control Register for Input Channel 13—Address 00113

Input Buffer Control Register for Input Channel 14—Address 00114

Input Buffer Control Register for Input Channel 15—Address 00115

(8) Output Buffer Control Register for each Output Channel

Output Buffer Control Register for Output Channel 0—Address 00120

Output Buffer Control Register for Output Channel 1—Address 00121

Output Buffer Control Register for Output Channel 2—Address 00122

Output Buffer Control Register for Output Channel 3—Address 00123

Output Buffer Control Register for Output Channel 4—Address 00124

Output Buffer Control Register for Output Channel 5—Address 00125

Output Buffer Control Register for Output Channel 6—Address 00126

Output Buffer Control Register for Output Channel 7—Address 00127

Output Buffer Control Register for Output Channel 10—Address 00130

Output Buffer Control Register for Output Channel 11—Address 00131

Output Buffer Control Register for Output Channel 12—Address 00132

Output Buffer Control Register for Output Channel 13—Address 00133

Output Buffer Control Register for Output Channel 14—Address 00134

Output Buffer Control Register for Output Channel 15—Address 00135

Each of the other memory locations is used for:

(1) Instruction word storage (2) Data storage.

(E–*i*) *Wired memory*

The Unit computer contains 16 decimal words of semipermanent wired storage 64. Programming this memory area requires a process of wiring-in the desired instructions. The semipermanent feature of these storage locations prevents accidental destruction of program instructions contained therein since entries cannot be made via main memory.

An Input Bootstrap routine occupies this memory, and its execution is controlled by the Automatic Recovery Switch.

(E–*j*) *Automatic recovery*

In the event of a fault condition (encountering either a 00 or 77 function code), the Automatic Recovery Switch directs computer activity. This switch has three positions: (1) DOWN, (2) NEUTRAL, and (3) UP. Action resulting from these positions is:

(1) DOWN position—This causes manual execution of the Bootstrap routine. Computer action begins at address 0 of Wired Memory and executes the Bootstrap routine when this switch is depressed. (A MASTER CLEAR should precede this operation).

(2) NEUTRAL position—This causes an Interrupt to address 00014 of Main Memory on a fault condition. Action continues as programmed.

(3) UP position—This causes an Interrupt to address 14 of Wired Memory on a fault condition. This results in automatic execution of the Bootstrap routine.

(E–*k*) *Buffer modes*

The Unit computer provides two modes of buffering: (1) with monitor and (2) without monitor.

Buffering with monitor transfer words sequentially, starting at a given initial address through a given terminal address, on the specified input or output channel. The computer continues execution of program instructions during the buffer process. Completion of the buffering process causes an Internal Monitor Interrupt to the Internal Interrupt Entrance Register assigned to the input or output channel (see Section E–*h*, Magnetic Core Memory Assignment). This register should contain a RETURN-JUMP instruction. Suggested instruction for the Internal Interrupt Register is:

65 0*nn nnnnn*—Exit to an Interrupt subroutine for remedial action. This subroutine ends with a 601*nn* instruction which clears the Interrupt mode, then returns control to the main routine. (See Instructions 75 and 76).

Buffering without the monitor transfer words sequentially, starting at a given initial address through a given terminal address, on a specified input or output channel. The computer continues execution of program instructions during the buffer process. No monitor interrupt will occur (see Instructions 73 and 74).

(E–*l*) *List of instructions*

This section lists the repertoire of instruction used with the Unit computer. Common usage of these instructions is also included; no attempt is made to indicate more sophisticated use. Note that symbology previously described is used.

01 RIGHT SHIFT Q

This instruction shifts (Q) to the right Y bit positions. The higher-order bits are replaced with the original sign bit as the word is shifted. Only the lower-order six bits of Y are recognized for this instruction. The higher-order 24 bits are ignored.

Example of right shift in Q: Y=2

| Content of Q | | Content of Q | |
|---|---|---|---|
| $(Q)_i$ (positive) = | 0 1 0 1 | $(Q)_i$ (negative) = | 1 0 1 0 |
| First shift | 0 0 1 0 | First shift | 1 1 0 1 |
| Second shift | 0 0 0 1 | Second shift | 1 1 1 0 |

02 RIGHT SHIFT A

This instruction shifts (A) to the right Y bit positions. The higher-order bits are replaced with the original sign bit as the word is shifted. Only the lower-order six bits of Y are recognized for this instruction. The higher-order 24 bits are ignored. The overall operation is analogous to the example given in the foregoing instruction.

03 RIGHT SHIFT AQ

This instruction shifts (A) and (Q) as one 60-bit register. The shift is to the right Y bit positions with the lower-order bits of A shifting into the higher-order bit positions of Q. The higher-order bits of A are replaced with the original sign bit as the word is shifted. Only the lower-order six bits of Y are recognized for this instruction. This higher-order 24 bits are ignored.

Example of right shift in AQ: Y=2

| Content of AQ | | Content of AQ | |
|---|---|---|---|
| $(AQ)_i$ (positive) = | 0 1 0 1 0 0 1 1 | $(AQ)_i$ (negative) = | 1 0 0 0 1 0 1 0 |
| First shift | 0 0 1 0 1 0 0 1 | First shift | 1 1 0 0 0 1 0 1 |
| Second shift | 0 0 0 1 0 1 0 0 | Second shift | 1 1 1 0 0 0 1 0 |

04 COMPARE

This instruction compares the signed value of Y with the signed value of (A) and/or (Q). It does not alter either (A) or (Q). The Branch Condition Designator, *j*, is interpreted in a special way for this instruction as listed below:

*j*=0: Do not skip the next instruction.
*j*=1: Skip the next instruction.
*j*=2: Skip the next instruction if Y is less than, or equal to (Q).
*j*=3: Skip the next instruction if Y is greater than (Q).
*j*=4: Skip the next instruction if (Q) is greater than, or equal to Y, and Y is greater than (A).
*j*=5: Skip the next instruction if Y is greater than (Q) or if Y is less than, or equal to (A).
*j*=6: Skip the next instruction if Y is less than, or equal to (A).
*j*=7: Skip the next instruction if Y is greater than (A).

05 LEFT SHIFT Q

This instruction shifts (Q) circularly to the left Y bit positions (maximum shift count permitted is 59 decimal places). The lower-order bits are replaced with the higher-order bits as the word is shifted. Only the lower-order six bits of Y are recognized for this instruction. The higher-order 24 bits are ignored.

Example of left circular shift in Q: (*Y*)=2

| Content of Q | | Content of Q | |
|---|---|---|---|
| $(Q)_i$ (positive) = | 0 0 1 1 | $(Q)_i$ (negative) = | 1 1 0 0 |
| First shift | 0 1 1 0 | First shift | 1 0 0 1 |
| Second shift | 1 1 0 0 | Second shift | 0 0 1 1 |

06 LEFT SHIFT A

This instruction shifts (A) circularly to the left Y bit positions (maximum shift count permitted is 59 decimal places). The lower-order bits are replaced with the higher-order bits as the word is shifted. Only the lower-order six bits of Y are recognized for this instruction. The higher-order 24 bits are ignored. The over-all operation is analogous to the example given in the foregoing instruction.

07 LEFT SHIFT AQ

This instruction shifts (A) and (Q) as one 60-bit register. The shift is circular to the left Y bit positions (maximum shift count permitted is 59 decimal places). The lower-order bits of A are replaced with the higher-order bits of Q and the lower-order bits of Q are replaced with the higher-order bits of A. Only the lower-order six bits of $\underline{Y}$ are recognized by this instruction. The higher-order 24 bits are ignored.

Example of left circular shift in AQ: $\underline{Y}=2$

| Content of AQ | | Content of AQ | |
|---|---|---|---|
| $(AQ)_i$ (positive) = | 0 1 0 1 0 0 1 1 | $(AQ)_i$ (negative) = | 1 0 0 0 1 0 1 1 |
| First shift | 1 0 1 0 0 1 1 0 | First shift | 0 0 0 1 0 1 1 1 |
| Second shift | 0 1 0 0 1 1 0 1 | Second shift | 0 0 1 0 1 1 1 0 |

10 ENTER Q

Clear the Q-register. Then transmit $\underline{Y}$ to Q.

11 ENTER A

Clear A. Then transmit $\underline{Y}$ to A.

12 ENTER $B^n$

Clear B-register $j$. Then transmit the lower-order 15 bits of $\underline{Y}$ to B-register $j$. The higher-order 15 bits of $\underline{Y}$ are ignored in this instruction. The Branch Condition Designator, $j$, is used to specify the selected B-register for this instruction and is not available for its normal function.

13 EXTERNAL FUNCTION ON $C^n$ $j^*=0$ or 1. Interrogate the two bits connected to the input-active designator (flip-flops) on an interconnected computer. If the interconnected computer's input buffer is active, skip the next instruction. If the interconnected computer's input buffer is not active, execute the next instruction. There are no External Function lines on $C^0$ or $C^1$. $k^*=3$ is required for timing. When $j^*=0$ or 1, transmit $\underline{Y}$, the External Function, over the channel specified by $j^*$. Only $k^*=3$ is permitted.

14 STORE Q

Store (Q) at storage address Y as directed by the Operand Interpretation Designator $k$. If $k=0$, complement (Q). If $k=4$, store in A.

15 STORE A

Store (A) at storage address Y as directed by the Operand Interpretation Designator $k$. If $k=0$, complement (A). If $k=0$, store in Q.

16 STORE $B^n$

Store a 30-bit quantity whose lower-order 15 bits correspond to the content of B-register $j$ and whose higher-order 15 bits are zero at storage address Y as directed by the Operand Interpretation Designator $k$. The Branch Condition Designator $j$ is used to specify the selected B-register for this instruction and is not available for its normal function.

17 STORE $C^n$

Store the content of the C-channel specified by $j^*$ at storage address Y. An Input Acknowledge signal is then sent on the C-channel. Only $k^*=3$ is permitted.

20 ADD A

Add $\underline{Y}$ to the previous content of the Accumulator.

21 SUBTRACT A

Subtract $\underline{Y}$ from the previous content of the Accumulator.

22 MULTIPLY

Multiply (Q) times $\underline{Y}$ leaving the double-length product in AQ. If the factors are considered as integers, the product is an integer in AQ.

The Branch Condition Designator $j$ is interpreted prior to end correction permitting sensing of a product with $(A)_f=0$. If $j$ equal 4, a skip of the next instruction is made when $(A)_f=0$. When $(A)_f=+0$, a double-length product has been formed with significant bit(s) in the Accumulator; however, if a skip does occur for $j=4$, the Multiply instruction can be re-executed with the same operand and with $j=2$ or 3 to determine if $Q_{29}$ contains a significant bit (a one) of the product.

In this instruction, $k=7$ should not be used.

23 DIVIDE

Divide (AQ) by $\underline{Y}$ leaving the quotient in the Q-register and the remainder in the A-register. The remainder bears the same sign as the quotient. In this instruction, $k=7$ should not be used.

Note: If a DIVIDE FAULT condition exists, no Maintenance Console indication is given; however, by coding each DIVIDE instruction with $j=3$, a program test for the DIVIDE FAULT is automatic. With this selection of $j$, a Skip of the next instruction occurs if a DIVIDE FAULT exists. The Skip should be made to a Jump instruction which provides a remedial means of noting or correcting the error. Therefore, the instruction which follows the Divide instruction should have its $j=1$ in order to preclude the Jump instruction whenever the "Divide Sequence" culminates in a correct answer. A DIVIDE FAULT can also be detected if the Divide instruction is executed with $j=2$. In this case, a correct answer is indicated when a Skip occurs.

24 REPLACE $A+Y$

Add (Y) to the previous content of A. Store (A) at storage address Y.

25 REPLACE $A-Y$

Subtract (Y) from the previous content of A. Then store (A) at storage address Y.

26 ADD Q

Interchange (A) and (Q). Then add $\underline{Y}$ to (A). Interchange (A) and (Q). The content of A is undisturbed by this instruction. The Branch Condition Designator $j$ has special meaning in this instruction as in instruction 27.

27 SUBTRACT Q

Interchange (A) and (Q). Then subtract $\underline{Y}$ from (A). Interchange (A) and (Q). The content of A is undisturbed by this instruction. The Branch Condition Designator $j$ has special meaning in this instruction as listed below.

Note: In instructions 26 and 27 the Branch Condition Designator $j$ has the following meaning:

$j=0$: Do not skip the next instruction.
$j=1$: Skip the next instruction.
$j=2$: Skip the next instruction if (A) is positive.
$j=3$: Skip the next instruction if (A) is negative.
$j=4$: Skip the next instruction if (Q) is zero.
$j=5$: Skip the next instruction if (Q) is nonzero.
$j=6$: Skip the next instruction if (Q) is positive.
$j=7$: Skip the next instruction if (Q) is negative.

30 ENTER $Y+Q$

Clear A. Then transmit (Q) to A. Then add $\underline{Y}$ to (A).

31 ENTER $Y-Q$

Clear A. Then transmit (Q) to A. Then subtract $\underline{Y}$ from (A). Finally, complement (A).

32 STORE $A+Q$

Add (Q) to the previous content of A. Then store (A) at storage adress Y as directed by the Operand Interpretation Designator $k$.

33 STORE $A-Q$

Subtract (Q) from the previous content of A. Then store (A) at storage address Y as directed by the Operand Interpretation Designator $k$.

34 REPLACE $Y+Q$

Clear A. Then transmit (Q) to A. Then add (Y) to (A). Then store (A) at storage address Y.

35 REPLACE $Y-Q$

Clear A. Then transmit (Q) to A. Then subtract (Y) from (A). Then complement (A) and store at storage address Y.

36 REPLACE $Y+1$

Clear A. Then set $(A)=1$. Then add (Y) to (A). Then store (A) at storage address Y.

37 REPLACE $Y-1$

Clear A. Then set $(A)=1$. Then subtract (Y) from (A). Then complement (A) and store at storage address Y.

40 ENTER LOGICAL PRODUCT

Enter in A the bit-by-bit product of $\underline{Y}$ and (Q).

The $j$ designator is interpreted in a special way for this instruction for the value $j=2$ or 3. If $j=2$, Skip if the parity of $(A)_f$ is even. If $j=3$, Skip if the parity of $(A)_f$ is odd.

Note: Even parity=an even number of "ones" in the A-register. Odd parity=an odd number of "ones" in the A-register.

41 ADD LOGICAL PRODUCT

Add to (A) the bit-by-bit product of $\underline{Y}$ and (Q).

42 SUBTRACT LOGICAL PRODUCT

Subtract from (A) the bit-by-bit product of $\underline{Y}$ and (Q).

43 COMPARE MASKED

Subtract from (A) the bit-by-bit product of $\underline{Y}$ and (Q), and perform the branch point evaluation for Skip of next sequential instruction as directed by the Branch Condition Designator $j$.

This instruction results in no net change in the content of any operational register. It provides, through the Branch Condition Designator $j$, a comparison of a portion of $\underline{Y}$ with (A).

44 REPLACE LOGICAL PRODUCT

Enter in A the bit-by-bit product of (Y) and (Q). Then store (A) at storage address Y. The $j$ designator is interpreted in a special way for this instruction for the values $j=2$ or 3. If $j=2$, Skip if the parity of $(A)_f$ is even. If $j=3$, Skip if the parity of $(A)_f$ is odd.

Note: Even parity=an even number of "ones" in the A-register. Odd parity=an odd number of "ones" in the A-register.

45 REPLACE $A+$LOGICAL PRODUCT

Add to (A) the bit-by-bit product of (Y) and (Q). Then store (A) at storage address Y.

46 REPLACE $A-$LOGICAL PRODUCT

Subtract from (A) the bit-by-bit product of (Y) and (Q). Then store (A) at storage address Y.

47 STORE LOGICAL PRODUCT

Store in address Y the bit-by-bit product of (A) and $k$.

(Q) as directed by the Operand Interpretation Designator $k$.

50 SELECTIVE SET

Set the individual bits of A to one corresponding to ones in $\underline{Y}$ leaving the remaining bits of A unaltered.

51 SELECTIVE COMPLEMENT

Complement the individual bits of A corresponding to ones in $\underline{Y}$ leaving the remaining bits of A unaltered.

52 SELECTIVE CLEAR

Clear the individual bits of A corresponding to ones in $\underline{Y}$ leaving the remaining bits of A unaltered.

In this instruction, $k=7$ should not be used.

53 SELECTIVE SUBSTITUTE

Set the individual bits of A with bits of $\underline{Y}$ corresponding to ones in Q leaving the remaining bits of A unaltered.

In this instruction, $k=7$ should not be used.

54 REPLACE SELECTIVE SET

Set the individual bits of A to one corresponding to ones in (Y) leaving the remaining bits of (A) unaltered. Then store (A) at storage address Y.

55 REPLACE SELECTIVE COMPLEMENT

Complement the individual bits of A corresponding to ones in (Y) leaving the remaining bits of A unaltered. Then store (A) at storage address Y.

56 REPLACE SELECTIVE CLEAR

Clear individual bits of A corresponding to ones in (Y) leaving the remaining bits of A unaltered. Then store (A) at storage address Y.

57 REPLACE SELECTIVE SUBSTITUTE

Clear individual bits of A corresponding to ones in Q leaving the remaininig bits of A unaltered. Then form the bit-by-bit product of (Y) and (Q), and set ones of this product in corresponding bits of A leaving the remaining bits of A unaltered. Then store (A) at storage address Y.

60 JUMP (Arithmetic)

This instruction clears the Program Address Register, P, and enters a new program address in P for certain conditions of either the A- or Q-register content. The Branch Condition Designator $j$ is interpreted in a special way for this instruction and thus determines the conditions under which a Jump in program address occurs. If the Jump condition is not satisfied, the next sequential instruction in the current sequence is executed in a normal manner. If the Jump condition is satisfied, as listed below, the $\underline{Y}$ becomes the address of the next instruction and the beginning of a new program sequence.

$j=0$: No jump. Set Interrupt Enable to remove interupt lockout, thus clearing Bootstrap and Interrupt modes. Continue with current program sequence.

$j=1$: Execute jump. Set Interrupt Enable to remove interrupt lockout, thus clearing Bootstrap and Interrupt modes.

$j=2$: Execute jump if (Q) is positive.

$j=3$: Execute jump if (Q) is negative.

$j=4$: Execute jump if (A) is zero.

$j=5$: Execute jump if (A) is nonzero.

$j=6$: Execute jump if (A) is positive.

$j=7$: Execute jump if (A) is negative.

61 JUMP (Manual)

This instruction clears the Program Address Register, P, and enters a new program address in P for certain conditions of manual JUMP key selections. The Branch Condition Designator $j$ is interpreted in a special way for this instruction and thus determines the conditions under which a jump in program address occurs. If the Jump condition is not satisfied, the next sequential instruction in the current sequence is executed in a normal manner. If the Jump condition is satisfied, as listed below, the $\underline{Y}$ becomes the address of the next instruction and the beginning of a new program sequence.

Program execution may be stopped by certain STOP selections on execution of this instruction. The Branch Condition Designator $j$ specifies which key selections are effective.

$j=0$: Execute jump regardless of key selections.
$j=1$: Execute jump if JUMP 1 is selected.
$j=2$: Execute jump if JUMP 2 is selected.
$j=3$: Execute jump if JUMP 3 is selected.
$j=4$: Execute jump. Stop computation.
$j=5$: Execute jump. Stop computation if STOP 5 is selected.
$j=6$: Execute jump. Stop computation if STOP 6 is selected.
$j=7$: Execute jump. Stop computation if STOP 7 is selected.

62 JUMP ON $C^n$ ACTIVE INPUT BUFFER

This instruction clears the Program Address Register P and enters a new program address in P for certain input buffer conditions on the channel designated by $j^*$. If the buffer is active, the Jump condition is satisfied; then $\underline{Y}$ becomes the address of the next instruction. If the buffer is inactive, the Jump condition is not satisfied. The next sequential instruction in the current sequence is executed in the normal manner. $k^*=0$, 1, 2, or 3 is permitted.

63 JUMP ON $C^n$ ACTIVE OUTPUT BUFFER

This instruction clears the Program Address Register P and enters a new address in P for certain output buffer conditions on the channel designated by $j^*$. If the buffer is active, the Jump condition is satisfied; then $\underline{Y}$ becomes the address of the next instruction. If the buffer is inactive, the Jump condition is not satisfied. The next sequential instruction in the current sequence is executed in the normal manner. $k^*=0$, 1, 2, or 3 is permitted.

64 RETURN JUMP (Arithmetic)

This instruction executes a Return-Jump sequence for certain conditions of either the A- or Q-register content. The Branch Condition Designator $j$ is interpreted in a special way for this intsruction and determines the conditions under which the Return-Jump sequence is executed. If the Return-Jump condition is not satisfied, the next sequential instruction in the current sequence is executed in a normal manner. If the Return-Jump condition is satisfied, as listed below, the following sequence is performed.

Store $(P)+1$ in the lower half of memory address $\underline{Y}$. Then jump to $\underline{Y}+1$.

$j=0$: No action; continue with the current program sequence.
$j=1$: Execute return jump.
$j=2$: Execute return jump if (Q) is positive.
$j=3$: Execute return jump if (Q) is negative.
$j=4$: Execute return jump if (A) is zero.
$j=5$: Execute return jump if (A) is nonzero.
$j=6$: Execute return jump if (A) is positive.
$j=7$: Execute return jump if (A) is negative.

65 RETURN JUMP (Manual)

This instruction executes a Return-Jump sequence for certain conditions of manual key selections. The Branch Condition Designator $j$ is interpreted in a special way for this instruction and determines the conditions under which the Return-Jump sequence is executed. If the Return-Jump condition is not satisfied, the next sequential instruction in the current sequence is executed in a normal manner. If the Return-Jump condition is satisfied, as listed below, the following sequence is performed.

Store $(P)+1$ in the lower half of memory address $\underline{Y}$. Then jump to $\underline{Y}+1$.

$j=0$: Execute return jump regardless of key selections.
$j=1$: Execute return jump if JUMP 1 is selected.
$j=2$: Execute return jump if JUMP 2 is selected.
$j=3$: Execute return jump if JUMP 3 is selected.
$j=4$: Execute return jump. Then stop computation.
$j=5$: Execute return jump. Stop computation if STOP 5 is selected.
$j=6$. Execute return jump. Stop computation if STOP 6 is selected.
$j=7$: Execute return jump. Stop computation if STOP 7 is selected.

66 TERMINATE $C^n$ INPUT BUFFER

This instruction terminates the input buffer on channel $j^*$. No Input Buffer Monitor Interrupt will occur.

The Operand Interpretation Designator $k^*$, the Index Designator $b$, and the Operand Designator $y$ bits are not translated for this instruction.

67 TERMINATE $C^n$ OUTPUT BUFFER

This instruction terminates the output buffer on channel $j^*$. No Output Buffer Monitor Interrupt will occur.

The Operand Interpretation Designator $k^*$, the Index Designator $b$, and the Operand Designator $y$ bits are not translated for this instruction.

70 REPEAT

Clear $B^7$ and transmit the lower 15 bits of $\underline{Y}$ to $B^7$. If $\underline{Y}$ is nonzero, transmit $(j)$ to $r$ (designator register), thereby initiating the repeat mode. If $\underline{Y}$ is zero, skip the next instruction.

REPEAT MODE—The repeat mode executes the instruction immediately following the Repeat instruction $\underline{Y}$ times; $B^7$ contains the number of executions remaining throughout the repeat mode.

If no Skip condition is met for the repeated instruction, the repeat mode terminates. The instruction following the repeated instruction is then executed. If the Skip condition for the repeated instruction is met, the repeat mode terminates, and the instruction following the repeated instruction is skipped.

Following the repeat mode termination, the count remains in $B^7$. In no way does the repeat mode alter a repeated instruction as stored in memory.

The three lower-order bits of the $r$ designator (from $j$ of instruction 70) affect operand indexing as follows:

$r=0$: Do not modify the operand address of the repeated instruction after each individual execution.
$r=1$: Increase the operand address of the repeated instruction by one after each execution of the repeated instruction.
$r=2$: Decrease the operand address of the repeated instruction by one after each execution of the repeated instruction.
$r=3$: Repeat the initial B-register modification of the repeated instruction before each execution.
$r=4$: Do not modify the operand address of the repeated instruction after each individual execution. If the repeated instruction is a Replace instruction, the operand address is incremented by $(B^6)$ for the store portion of the Replace Instruction.
$r=5$: Increase the operand address of repeated instruction by one after each execution of the repeated instruction. If the repeated instruction is a Replace instruction, the operand address is incremented by $(B^6)$ for the store portion of the Replace instruction.
$r=6$: Decrease the operand address of the repeated instruction by one after each execution of the repeated instruction. If the repeated instruction is a Replace instruction, the operand address is incremented by $(B^6)$ for the store portion of the Replace instruction.
$r=7$: Repeat the initial B-register modification of the repeated instruction before each execution. If the repeated instruction is a Replace instruction, the operand address is incremented by $(B^6)$ for the store portion of the Replace instruction.

Note: Instruction 70 $j$ designator establishes the repeat mode $r$ designator since $j$ is transmitted to $r$.

71 B SKIP ON $B^n$

If the content of B-register $j$ is equal to $\underline{Y}$, skip the next instruction in the current sequence and proceed to the instruction following. Clear B-register $j$.

If the content of B-register $j$ is not equal to $\underline{Y}$, proceed to the next instruction in the sequence in a normal manner. Increase the content of B-register $j$ by one.

The Branch Condition Designator $j$ is used to designate the selected B-register in this instruction and is not available for its normal function. Only the lower-order 15 bits of $\underline{Y}$ are used in the comparison described in the preceding paragraph.

72 B JUMP ON $B^n$

If the content of B-register $j$ is nonzero execute a jump in program address to address $\underline{Y}$. Reduce the content of B-register $j$ by one.

If the content of B-register $j$ is zero, proceed to the next instruction in a normal manner. Do not alter the content of B-register $j$.

The Branch Condition Designator $j$ is used to designate the selected B-register in this instruction and is not available for its normal function. If the Jump condition is satisfied, then the lower-order 15 bits of $\underline{Y}$ become the address of the next instruction and the beginning of the new program sequence. The higher-order 15 bits of (Y) cannot be used in this instruction.

73 INPUT BUFFER ON $C^n$ (without MONITOR Mode)

This instruction establishes an input buffer via input buffer channel $j^*$ to Magnetic Core Storage with an initial storage address Y. Subsequent to this instruction, individual transfers will be executed at a rate determined by an external device. The storage address initially established by this instruction will be advanced by one preceding each individual transfer. The next current address will be mantained throughout the buffer process in the lower-order 15 bits of Magnetic Core Storage address 00100 plus $j^*$. This mode will continue until it is superseded by a subsequent initiation or termination of an input buffer via the same input channel or until the higher-order half and the lower-order half of storage address 00100 plus $j^*$ contain equal quantities, whichever occurs first.

This instruction is implemented as follows: If $k^*=3$, store (Y) in storage location 00100 plus $j^*$. If $k^*=1$, store the lower-order 15 bits of (Y) in the lower-order half of storage location 00100 plus $j^*$ leaving the higher-order half undisturbed. If $k^*=0$, store $\underline{Y}$ in the lower-order half of storage location 00100 plus $j^*$ leaving the higher-order half undisturbed. Proceed to the next instruction. $k^*=2$ is not permitted.

74 OUTPUT BUFFER ON $C^n$ (without MONITOR Mode)

This instruction establishes an output buffer via output buffer channel $j^*$ from initial storage address Y in Magnetic Core Storage. Subsequent to this instruction, the individual transfers will be executed at a rate determined by an external device. The storage address initially established by this instruction will be advanced by one preceding each individual transfer. The next current address will be maintained throughout the buffer process in the lower-order 15 bits of Magnetic Core Storage address 00120 plus $j^*$. This mode will continue until it is superseded by a subsequent initiation or termination of an output buffer via the same output channel or until the higher-order half and the lower-order half of storage address 00120 plus $j^*$ contain equal quantities, whichever occurs first.

This instruction is implemented as follows: If $k=3$, store (Y) in storage location 00120 plus $j^*$. If $k^*=1$, store the lower-order bits of (Y) in the lower-order half of storage location 00120 plus $j^*$ leaving the higher-order half undisturbed. If $k^*=0$, store $\underline{Y}$ in the lower-order half of storage location 00120 plus $j^*$ leaving the higher-order half undisturbed. Proceed to the next instruction. $k^*=2$ is not permitted.

75 INPUT BUFFER ON $C^n$ (with MONITOR mode)

This instruction establishes an input buffer via input input buffer channel $j^*$ to Magnetic Core Storage with an initial storage address Y. Subsequent to this instruction, the individual transfers will be executed at a rate determined by an external device. The storage address initially established by this instruction will be advanced by one preceding each individual transfer. The next current address will be maintained throughout the buffer process in the lower-order 15 bits of Magnetic Core Storage address 00100 plus $j^*$. This mode will continue until it is superseded by a subsequent initiation or termination of an input buffer via the same input channel or until the higher-order half and the lower-order half of storage address 00100 plus $j^*$ contain equal quantities, whichever occurs first. Initiation of this input buffer selects the input channel $j^*$ and establishes a buffer monitor on input channel $j^*$. A Monitor Interrupt follows completion of the buffering operation: $(00100+j)_U=(00100+j)_L$.

This instruction is implemented as follows: If $k^*=3$, store (Y) in storage location 00100 plus $j^*$. If $k^*=1$, store the lower-order 15 bits of (Y) in the lower-order half of storage location 00100 plus $j^*$ leaving the higher-order half undisturbed. If $k^*=0$, store $\underline{Y}$ in the lower-order half of storage location 00100 plus $j^*$. Proceed to the next instruction. $k^*=2$ is not permitted.

76 OUTPUT BUFFER ON $C^n$ (with MONITOR Mode)

This instruction establishes an output buffer via output buffer channel $j^*$ from initial storage address Y in Magnetic Core Storage. Subsequent to this instruction, the individual transfers will be executed at a rate determined by an external device. The storage initially established by this instruction will be advanced by one preceding each individual transfer. The next current address will be maintained throughout the buffer process in the lower-order 15 bits of Magnetic Core Storage address 00120 plus $j^*$. This mode will continue until it is superseded by a subsequent initiation or termination of an output buffer via the same output channel or until the higher-order half and the lower-order half of storage address 00120 plus $j^*$ contain equal quantities, whichever occurs first. Initiation of this output buffer selects the output channel $j^*$ and establishes a buffer monitor on output channel $j^*$. A Monitor Interrupt follows the completion of the buffering operation:

$$(00120+j)_U=(00120+j)_L$$

This instruction is implemented as follows: If $k^*=3$, store (Y) in storage location 00120 plus $j^*$. If $k^*=1$, store the lower-order 15 bits of (Y) in the lower-order half of storage location 00120 plus $j^*$ leaving the higher-order half undisturbed. If $k^*=0$, store $\underline{Y}$ in the lower-order half of storage location 00120 plus $j^*$ leaving the higher-order half undisturbed. Proceed to the next instruction. $k^*=2$ is not permitted.

SECTION F. LOGICAL BUILDING-BLOCK CHARACTERISTICS

To implement the overall logic of the Unit computer described in block-diagram form in FIG. 2, it is felt that a description of the basic logical building-block circuit employed should be presented. In FIG. 6 there is shown a schematic circuit diagram for implementing the OR-INVERTER or NOR logic. This is also referred to by logicians as the Pierce Function. Since other circuits can be devised for performing this type of logic, the circuit illustrated schematically is only typical, and limitation thereto is not intended. The Unit computer utilizes the binary number system for its internal calculation and represents a logical "1" signal by a potential of approximately −3 volts while a logical "0" is represented by a potential of approximately 0 volt. When a zero potential (logical "0") is present on all of the input terminals 130, 132, and 134 the junction 136 in the circuit diagram is maintained slightly positive by means of the voltage source $+V_1$, and the voltage divider comprises of resistors 138, 140, and 142. Since the base 144 of the transistor 146 is positive with respect to its emitter electrode 148 (maintained at ground potential), the emitter-to-base junction 152 is biased in the reverse direction, and, therefore, the impedance between its emitter 148 and collector 150 is relatively high. The base-to-collector junction 154 is always reverse biased by means of the voltage source $-V_1$, thereby causing the current to flow across the collector junction 154 only when the bias is reversed on the base-to-emitter junction 152. For purposes of this explanation, leakage currents are ignored. The output line 156 is clamped at approximately −3 volts ($-V_2$), representing a logical "1," by the clamping diode 158 connected to the $-V_2$ supply. Resistor 160 connected between the collector 150 and $-V_1$ supply is provided as a load.

In the instance when a negative potential (logical "1") signal is applied to any one of the input terminals 130, 132, or 134, the base 144 of the transistor 146 becomes negative with respect to its emitter 148. This presents the proper bias condition such that a relatively large current can flow between the emitter 148 and the collector 150, such that the output voltage rises to almost ground, and thereby represents a logical "0." While only three input terminals are illustrated in the schematic diagram of FIG. 6, it should be understood that a greater or fewer number may be employed. The output 156 may be utilized in a manner such that it will drive several other similar NOR circuits.

FIG. 7 illustrates the block diagram symbol 162 that is utilized to represent the basic building-block circuit illustrated in FIG. 6. This block 162 is utilized to represent the NOR circuit, which may have a plurality of input terminals, such as A and B, with a single output terminal, such as C. The truth-table of FIG. 8, with the Boolean equations that accompany it, indicate that if a logical "1" signal is applied to one or more of the input terminals, the output appearing at the output terminal is a logical "0." Only for the situation where all of the inputs are logical "0's" will a logical "1" appear at the output terminal.

FIG. 9 indicates the manner in which two NOR circuits 164 and 166 of the type described above may be interconnected to obtain a bistable multivibrator or flip-flop. NOR circuit 166 is labeled 00V63, and NOR circuit 164 is labeled 01V63. In order to set information into the flip-flop a logical "1" is placed on the Set line 168, and to clear the flip-flop it is necessary to place a logical "1" on the Clear input line 170. Referring to the truth-table of FIG. 8, it can be seen that a "1" input on the Clear line 170 will result in a "0" output on output line 172. This output is also applied as an input on wire 178 to NOR circuit 164. Since a Set and Clear pulse may not appear simultaneously, the input on line 168 will be held to a logical "0" so that when it is coupled with the "0" output of NOR circuit 166 the output from NOR circuit 164 will be a logical "1" on wire 174. To set the flip-flop it is necessary to apply a logical "1" signal on wire 168 while applying a "0" signal on line 170, which will result in a "0" on output line 174. This output is applied as an input on wire 176 to NOR circuit 166, thereby causing a "1" on output line 172.

The flip-flop illustrated in FIG. 9 may be simplified as illustrated in FIG. 10 into a single block to be utilized on the logic diagrams.

The number-letter-number notation illustrated within the NOR circuit blocks indicate the point of reference of the particular circuit with which it is associated. The capital letter specifies an overall category of logic or a particular register in the Unit computer, for example, "Z" in FIG. 7 could refer to the Z-register. The "*ab*" refers to two numerical characters located at the left of the capital letter. These characters describe, in most cases, the function of the inverter circuit. If the circuit is part of a particular register the following combination is used:

00="0" or Clear side of a bit-register
01="1" or Set side of a bit-register
02, 04, 06, 08=slaves off "1" side of a bit-register
03, 05, 07, 09=slaves off "0" side of a bit-register The remaining values of the "*ab*" are employed for gates and other logic circuits associated with the particular register designated by the capital letter.

The indicators "*cd*" are also two numeric characters located to the right of the capital letter, and generally indicate the particular stage of the register in which they are employed. For example, an inverter 03Z05 would be connected to the zero side of the fifth stage of the Z-register.

Registers within the Unit computer consist of cross-coupled NOR circuits to form a flip-flop as illustrated in FIG. 9. This provides both the normal and complement values of each bit. The registers in the memory section referred to above, consist of an array of ferrite cores, 30 bits in length.

SECTION G. LOGIC DIAGRAM SYMBOL DESCRIPTION

As was mentioned above, the Unit computer is a stored program device. A program may be defined generally as the plans for the solution of a specified problem. A complete program includes plans for the transcription of data, coding of instructions for the computer, and plans for the utilization of the results by the system. The listing of coded instructions utilized to solve the problem as specified by the programmed approach is called a "program" or a "routine." In other words, it can be said that programming consists of the planning and design for the solution of a problem which includes ultimately the coding of individual computer instructions in a predetermined order such that the solution of the problem as planned can be implemented. The overall planning may include numerical analysis, systems analysis, specification of various output formats, the relationship of the computer to the connected external equipment, and many other functions necessary for the integration of the individual computer into the system.

In programming, as in other forms of designs, it is desirable to have a distinct symbology whereby the steps in the solution of a problem may be shown pictorially. The flow diagram symbols utilized in the specification are illustrated in FIGS. 11*a* through 11*f*, and will be described individually below.

Figure 11A:
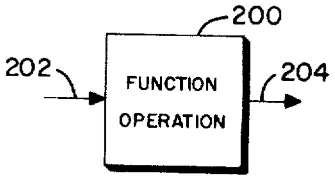

The flow diagram symbol illustrated in FIG. 11*a* is utilized to describe one step in the solution of the problem. Box 200 normally will contain a brief statement of the function to be accomplished. Each of these function operation boxes will normally contain one input 202 and one output 204. The amount of detail of the descriptive matter contained in the function operation box 200 will depend on the level of the solution of the problem. By this it is meant that the block may contain the statement of a single computer instruction at the lowest level, or it may state a general proposition at a higher system level. Examples of both of these levels will be described in later sections.

Figure 11B:
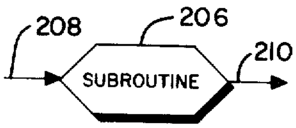

The flow diagram symbol illustrated in FIG. 11*b* labeled 206 is utilized to designate a subroutine in the process of solution of the problem. A subroutine normally exists when the situation arises where the same sequence of instruction may be utilized several times at various points within a routine. A situation such as this makes it an inefficient use of the computer memory to re-list the entire set of instructions each time it occurs. The solution to the problem is to list the set of instructions once and provide various points of entrance to this subroutine from the points in the routine where it is necessary. The subroutine flow diagram symbol will normally have one illustrated line of input 208 and one illustrated line of output 210. This indicates a common entrance and common exit for all portions of the routine that utilize the subroutine.

Figure 11C:
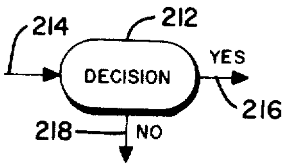

The flow diagram symbol illustrated in FIG. 11*c* is utilized to indicate when a decision must be made. The decision symbol 212 will normally have one line of input 214, but will have two lines of output 216 and 218, to represent the alternatives in the decision. Within the symbol will be stated the question to be answered, this question normally being of a nature such that it can receive a yes or no answer. These alternative paths correspond to the two possible output lines 216 or 218. The statement of the question to be answered can be of a type illustrating a single computer operation, or it may be a higher level system decision. Examples of these will be illustrated in later sections.

Figure 11D:
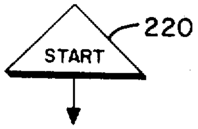

The flow diagram symbol illustrated in FIG. 11*d* is utilized to indicate the starting point of a particular sequence of instructions. The symbol is herein designated 220.

Figure 11E:
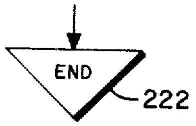

The flow diagram symbol illustrated in FIG. 11*e* is utilized to designate the end of a particular sequence of flow diagram operations, and is designated by label 222.

Figure 11F:
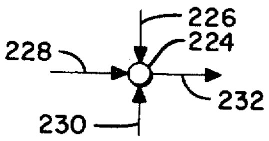

The flow diagram symbol illustrated in FIG. 11*f* consists of the method of illustrating the junction of several input lines 224 which consist of such inputs as 226, 228, and 230. A single resultant line 232 is utilized as an input to the various flow diagram symbols that were described above. This method alleviates the problem of having several input lines coming together at the symbol boundary. It should be noted that though three inputs are shown, this is not limitive but intended only to be illustrative. Any number of inputs that may be desired may be brought together at a common junction point such as 224.

SECTION H. SAMPLE OF PROGRAMMING

(*H–a*) *Statement of problem*

To more fully understand the utilization of the instructions available for the solution of problems in the Unit computer, it is believed advantageous to consider the solution of a sample problem.

Starting with the assumption that the Q-register (Q) initially contains a known valued operand; that B-register 1 ($B_1$) stores a known value designated $\Delta$; that an operand to be tested is stored at an address $\alpha+\Delta$; and that the final operand is to be stored at address $\omega$. With these initial conditions it is desired that the test operand be compared for a zero value, a positive value, or a negative value with specified modifications to be made depending upon the results of these tests. Further assume that in the event the test operand is equal to zero that the operand stored initially in the Q-register is to be transmitted to the storage address designated by $\omega$. In the event that the test operand is determined to be of a positive value, it is desired that the difference between the test operand and the known operand initially stored in the Q-register be transmitted to the storage address $\omega$. Finally, if it is determined that the test operand is of a negative value, it is desired that the sum of the test operand and the operand originally stored in the Q-register be transmitted to the storage address $\omega$. When these conditions have been tested and complied with it is then desired that computation should cease.

(*H–b*) *Flow diagram of problem solution*

With the foregoing assumptions and problems in mind, reference to FIG. 12 will show at least one way of solving the specified problem. As in other areas of design such as logic or circuit design, the programmed design may evolve which solves the problem, but which is not the only solution to the problem. In other words, it can be said that given any problem, individual program designers will probably arrive at different solutions in the coding sequences which will yield the desired results.

In the diagram illustrated in FIG. 12 the numbers shown within the small circle at the upper left of each of the flow diagram blocks represents the absolute numerical representation of the particular instruction illustrated by the block. For full description of each of these instructions, reference may be had to Section E, REPERTOIRE OF INSTRUCTIONS. The designation appearing at the upper right of each of the flow diagram blocks is utilized to represent a memory address wherein the instruction would be stored. Absolute instruction addresses could be substituted for these designations such that the routine could be placed anywhere within the allowable addresses of the main memory 62.

Following the logic of the solution of the problem through from beginning to end it can be seen that at the start 240 the computer executes an instruction which loads the test operand into the A-register, as illustrated by flow diagram block 242. When the test operand has been loaded in the A-register, an instruction 243 is executed which tests for equality to zero. The results of this test yields either a "Yes" 244 or a "No" 246 answer to the question asked. Considering first the "Yes" alternative, it will be recalled that when the test operand equals zero it is desired to store the unmodified known value of the operand stored initially in the Q-register. This is the operation specified in block 248. All of the conditions having been considered it is then time to stop the computer as shown in block 250. It will be noted that since block 242 tested for zero and found the answer to be "Yes," that it is permissible to utilize the stop condition on $A=0$ as designated in block 250. For the sake of program reliability many program solutions will follow such a step as this with a fault designation instruction, to prevent erroneous results in the event the computer should malfunction during the execution of such a stop instruction. This is merely a matter of "closing the loop," and is arbitrary with the particular designer.

Considering now the situation where the result of the test of block 243 results in a "No" answer, it is then necessary to determine whether the operand is positive or negative. This can be done as indicated in block 252 by testing the operand stored in A for a positive value. In the event that the answer to this question is "Yes" 254, the path is taken wherein the difference between the test operand the operand initially stored in the Q-register are stored at an address designated $\omega$. This is illustrated by block 256. Again, once the condition has been tested for and met it is desirable to stop computation, as is illustrated by block 258. It will be noted in this instance that it is an unconditional stop rather than a stop testing for a zero condition. If the "No" 260 alternative arises, it is known that the test operand must be a negative value. This follows from the fact that it must take a value of either a zero, plus or minus. Having determined that the operand is of a negative value, the condition can be satisfied wherein the test operand is added to the operand initially stored in Q, and the resultant stored at memory address $\omega$, as specified by block 262. Having completed the test conditions, it is necessary to stop computation. Block 264 automatically jumps to the arbitrary stop as illustrated by line 266 meeting at junction 268 with output line 270 from block 256. This, then, is the logical solution to the problem as set forth above.

(*H–c*) *Coding of problem solution*

The coding set out in the table below entitled SAMPLE ROUTINE corresponds item by item to the blocks illustrated in FIG. 12, and indicates the coding which would yield a solution to the specified problem.

SAMPLE ROUTINE

| Address | OP Code | $j$ | $k$ | $b$ | $y$ | Remarks |
|---|---|---|---|---|---|---|
| $\beta$ | 11 | 0 | 3 | 1 | $\alpha$ | $(\alpha+\Delta)\rightarrow A$ |
| $\beta+1$ | 60 | 4 | 0 | 0 | $\theta$ | (A)=0? yes→$\theta$; no→NI |
| $\beta+2$ | 60 | 6 | 0 | 0 | $\phi$ | (A)=+? yes→$\phi$; no→NI |
| $\beta+4$ | 34 | 0 | 3 | 0 | $\omega$ | (A)+(Q)→$\omega$ & A |
| $\beta+4$ | 60 | 1 | 0 | 0 | $\phi+1$ | Unconditional Jump |
| . . . | | | | | | |
| $\theta$ | 14 | 0 | 3 | 0 | $\omega$ | (Q)→$\omega$ |
| $\phi+1$ | 64 | 4 | 0 | 0 | 00000 | Stop on (A)=0 |
| . . . | | | | | | |
| $\phi$ | 33 | 0 | 3 | 0 | $\omega$ | (A)−(Q)→$\omega$ & A |
| $\phi+1$ | 65 | 4 | 0 | 0 | 00000 | Automatic stop |
| P-register | $U_U$-register | | | | $U_L$-register | |

Having considered operation on a step-by-step basis of the solution of the problem, as illustrated in FIG. 12, it is of interest to trace the operation of the Sample Routine through the block diagram of the Unit computer as shown in FIG. 2. It will be assumed that Sample Routine is prestored in the main memory 62 and that the machine is stopped with the address $\beta$ stored in the P-register 98.

At the start of the machine the address $\beta$ will be transmitted in an unmodified manner to the S-register 96. From that point it is transmitted to the address translator 66 which references the $\beta$ address in the main memory 62. This reference causes the contents of address $\beta$ to be transmitted to the $Z_U$ 68 and $Z_L$ 70 registers. The portion of the instruction transmitted to $Z_L$ is then transmitted to the portion of the U-register designated $U_L$ 82, and consists of the address portion ($y$ designator) of the instruction. At the same time the operation code and the designators which are stored in $Z_U$ are transmitted to the $U_U$ 84 portion of the U-register. The designators are translated by control translator 86 in such a manner that the B-register modification is first examined. It will be noted with reference to this instruction that B-register 1 is referenced. This means that the control translator 86 will enable the transmission of the contents of the $B_1$-register to the R′ circuitry 92 where it is added to the address that is stored in $U_L$. Since the address $\alpha$ was originally stored in $U_L$ (see table) and the increment $\Delta$ is stored in the $B_1$-register, the quantity transmitted to the S-register 96 now consists of the sum $\alpha+\Delta$, and is the address at which the test operand was assumed to be stored. This address is now transmitted to the address translator 66 which references main memory in such a way that the test operand is transmitted to the Z-register. At this time the control translator translates the $k$ designator, and finds it to be the value 3, thereby indicating that the entire word read from memory is to be handled. The control translator then translates the $j$ designator and finds it to be 0, thereby indicating that no skip condition exists. Finally, the OP code is translated by the control translator and is found to be an 11 indicating that the transmission from memory is to be directly to the A-register 112. It can now be seen that having traced this operation through, that the test operand is located in the A-register, and that the portion of the solution of the example routine designated in block 242 of FIG. 12 has been accomplished.

Following the original transmission of the address $\beta$ from the P-register 98 through the S-register 96, the P-register was automatically advanced by one to thereby put it in the condition to reference the next instruction. Referring to the Table Sample Routine, it will be found that this instruction consists of an arithmetic jump. Its sequence of operation consists of transmitting the address $\beta+1$ to the S-register, and from there to the address translator 66 where the main memory is referenced to transmit the instruction stored to the Z-register. As was described above, the $Z_U$ 68 portion of the instruction is transmitted to the $U_U$ portion of the U-register, and the $Z_L$ (address) portion of the Z-register is transmitted to the $U_L$ portion of the U-register. The $b$ and $k$ designators having been translated by the control translator, and found to be zero, have no effect in this instruction. In this instruction the $j$ designator is found to be of the value 4, thereby indicating that a jump will be executed if the contents of A is found to be a zero (reference JUMP-Arithmetic in Section E, REPERTOIRE OF INSTRUCTIONS for a description of other $j$ designators). The control translator 86 then continues on to translate the OP code portion of the instruction and finds it to be an Arithmetic Jump. This set of circumstances, in conjunction with the $j$ designator being equal to 4, determines that the A-register 112 must be tested for equality to zero. In the event that the contents of the A-register is found to be other than zero, the sequence of instructions being executed will not be interrupted. When equality to zero is found, the P-register 98 is cleared and the address $\theta$ is transmitted to the P-register to form the starting address for the sequence to which the jump instruction makes reference. Referring again to FIG. 12, it can now be seen that the decision indicated by block 243 has now been made.

First assuming that the test operand was equal to zero (contents of A-register), the address $\theta$ would be transmitted as above described to the P-register. From this point the address would be transmitted in turn to the S-register, and from there to the address translator where the main memory 62 is referenced. This causes the instruction stored at $\theta$ to be transmitted to the Z-register, and from there to the U-register. As assumed at the outset, when the test operand is equal to zero the known operand stored in the Q-register should be transmitted to a predetermined address $\omega$. It will be seen that the jump instruction stored at address $\beta+1$, will reference the instruction stored at address $\theta$ wherein a Store Q instruction resides. When the control translator translates a portion of the instruction stored at $U_U$ it will determine first that the $b$ designator is 0, thereby indicating that no B-register modification exists; secondly, that the $k$ designator is equal to 3, thereby indicating that the entire word to be referenced will be handled; thirdly, that the $j$ designator is 0 thereby indicating that no skip condition exists; and finally, that the OP code is 14 thereby indicating that the contents of Q is to be stored. At this time the address $\omega$, which is stored in $U_L$, will be transmitted unmodified to the S-register 96, and from there it will go to the address translator 66 where the condition will be set up such that the contents of the Q-register may be transmitted into the main memory to the address $\omega$. With reference to FIG. 12 it will now be seen that the operation specified in block 248 has been completed.

Following the transmittal of address $\theta$ from the P-register 98, the contents of the P-register is incremented by one, so that after the completion of the $\theta$ instruction, it is in a condition such that the $\theta+1$ instruction can be executed. This is done by transmitting $\theta+1$ to the S-register and then to the address translator, where main memory is read out to the Z-register. The instruction is then transmitted from the Z-register to the U-register. The translation of $U_U$ will yield a *b* designator of 0 indicating that no B-register modification is to be utilized, and a *k* designator of 0 indicating that the word length is of no importance for this instruction. The *j* designator being translated as 4 and the OP code being translated as 64 indicates that computation will stop on the event that the A-register 112 stores a positive zero. (Reference return JUMP-Arithmetic in Section E, REPERTOIRE OF INSTRUCTIONS, for details of other *j* designator operations). The A-register 112 is probed for equality to zero, and upon finding this condition to prevail, the return jump conditions are met. This situation causes the computer to stop. It should be noted that in the event that the return jump condition would not have been met, for instance, if a spurious bit had appeared in the A-register, that the sequence of instructions would have continued on to address $\theta+2$ for the next instruction. This condition would yield an erroneous operation of the routine, hence, normally, this loop would be closed by an error-indicating instruction sequence. It is not felt necessary to describe this situation more fully for this illustrative example. Referring now to FIG. 12, it can be seen that one of the possible combinations of events in the sample program have been completely traced through from beginning to end, since block 250 has just been described and computation has stopped.

Returning now to instruction $\beta+1$ and the situation where the test operand was found not to be equal to zero, it would be determined that the P-register 98 would now contain the address $\beta+2$. This address would then be transferred from the P-register through the S-register to the address translator 66 wherein main memory address $\beta+2$ would be read out to the Z-register. Having the instruction in the Z-register, it would then be transmitted to the U-register for translation and operation. The portion of the instruction stored in the $U_U$ register 84 is translated in order starting with the *b* designator which is found to be 0 in this instance, thereby indicating that no B-register modification is to be made. The translation of control translator 86 continues on to translate the *k* designator, which is also found to be 0, thereby indicating that the length of the word is not significant for this instruction. Finally, the *j* designator is translated as being the value 6, and the OP code is translated as being an Arithmetic Jump (60). By referencing Section E, REPERTOIRE OF INSTRUCTIONS, under the description of the Arithmetic Jump it will be found that this instruction with the *j* designator equal to 6 will yield the jump condition when the contents of the A-register are found to be of a positive value. This being the case, the test operand which was previously loaded in the A-register 112 is now probed to determine whether or not its value is positive. In the event a positive value is found, the instruction will cause a branch in the sequence of instructions such that the next instruction to be executed will be located at address $\phi$, whereas in the event the operand is found to be not of a positive value, the instruction sequence will not be interrupted and the next instruction to be executed will be located at address $\beta+3$. Again, referring to FIG. 12 it can be seen at this point that the final decision in this sample routine has been made as indicated by block 252. This follows from the fact that the numerical value of the test operand can have only one of three possible combinations of values; that is, it can be either zero, plus, or minus.

First, considering the situation where the test operand (contents of A) is found to be of a positive value, it will be noted that the jump conditions are met. This situation results in the contents of $U_L$ (the address $\phi$) being transmitted to the cleared P-register 98. This address $\phi$ then forms the start of the new instruction sequence which is referenced by the branching jump instruction stored at address $\beta+2$. The address $\phi$, having been transmitted to the P-register, is then transmitted through the S-register 96 and through the address translator 66 where the instruction in main memory 62 is referenced and read out to the Z-register. The instruction is then transmitted to the U-register, where translation again takes effect. As assumed at the outset, when the test operand is of a positive value, it is necessary to subtract the known value of the operand stored in Q from the unknown positive operand stored in the A-register and transmit the difference to the specified address $\omega$. It will be seen by referencing the instruction illustrated in the Table of Sample Routine that the instruction stored at $\phi$ consists of an instruction which will do just that. The control translator first translates the *b* designator and finds it to be 0, thereby indicating that no B-register modification is to take effect for this instruction. The *k* designator is then translated and found to be equal to 3, thereby indicating that the entire word referenced is to be operated on. The *j* designator is translated and found to be 0 indicating that no skip situation exists of this instruction. Finally, the OP code is translated and found to be equal to (33), thereby indicating that an arithmetic operation is to take place. It consists of the process of subtracting the contents of Q-register 118 from the contents of the A-register 112. The process of subtraction consists of transmitting the known operand from the Q-register to the D-register 114. The known operand now stored in the D-register is combined subtractively with the test operand stored in the A-register by the add circuitry 120, with the difference being transmitted to the X-register 116. Following the completion of the subtraction the difference is transmitted from the X-register back to the A-register. It should be noted at this point that the name "adder" is somewhat of a misnomer in that the circuitry actually operates on a subtractive basis. In actuality, to determine the sum of $A+D$ the circuitry performs the difference $A-(-D)$. The $-D$ value consists of the 1's complement value of the original operand. The difference of $A-D$ can be obtained by finding the difference directly. Thus, either subtraction or addition can be accomplished with the same circuitry by controlling the utilization of the D-register, such that a selection is made as to the use of either the normal value of the operand or the complemented value of the operand. Recalling, as was described above, that the registers are comprised of flip-flop circuits for each stage, it can be seen that both the normal and complemented values of each bit are available simultaneously from each of the registers. While the difference was being formed and stored in the A-register, the contents of $U_L$ 82 was transmitted unmodified to the S-register. The address $\omega$ was then transmitted from the S-register to the address translator 66 wherein the selection in the main memory 62 is made such that the final operand now residing in the A-register can be stored in the address specified by $\omega$. Having completed this operation, it can be seen by reference to FIG. 12 that the logical function in the solution of the problem designated by block 256 has been carried out and it is now necessary to stop the computer.

Since no branching occurred during the prior instruction, the P-register 98 now contains the address $\phi+1$ which is utilized to obtain the next instruction from main memory in a manner similar to that previously described. Having read the instructions stored at address $\phi+1$ to the Z-register, it is then transmitted to the U-register for execution. The designators stored in $U_U$ 84 are translated and the *b* designator is found equal to 0, thereby indicating that no B-register modification is to be made during the execution of this instruction. Likewise, the *k* designator is translated as being 0, thereby indicating that the word length is unimportant for consideration for the execution of this instruction. The translation of the *j* designator determines that it is equal to 4, and the translation of the OP code portion of the instruction indicates that a return Jump-Manual is to be executed. Referring to Section E, REPERTOIRE OF INSTRUCTIONS, it can be seen that a *j* equal to 4 causes the computer to execute the Return Jump and then stop computation without any manual external selection. The *y* portion of the instruction is transmitted to the cleared P-register 98 such that if the computer were again started without alteration to the currently set contents of the registers, computation would start at address zero and proceed. Again, referring to FIG. 12 it can be seen that with the execution of the instruction stored at address $\phi+1$, that this branch of the solution of the test problem has been completed.

Going now to the only condition remaining, that is, where the test operand is of a negative value, it can be seen that the branching decision instruction stored at address $\beta+2$ would not be satisfied, thereby causing the next instruction (NI) to be executed. In this case the P-register contains the address $\beta+3$ which would be transmitted to the S-register, and from there to the address translator. The instruction in main memory would be referenced and read out to the Z-register, and then transmitted to the U-register for execution. The portion of the instruction stored in $U_U$ is translated as above described. The $b$ designator is translated as being equal to 0 indicating that no B-register modification of the instruction address is to be made, and the translation of the $k$ designator as being equal to 3 indicates that the entire word length is to be operated on. The translation of the $j$ designator as being equal to 0 indicates that no skip condition exists for the execution of this instruction. The translation of the OP code portion of the instruction which yields the code (34) indicates that the known operand stored in the Q-register is to be added to the test operand stored in the A-register, and the resultant sum stored in the memory address designated by the $y$ portion of the instruction. As was indicated above when the process of subtraction was discussed, the process of addition utilizes exactly the same circuitry in the Arithmetic section 110. It consists of the process of transmitting the contents of Q-register 118 to the D-register 114, where it is combined with the contents of the A-register 112 in the add circuitry 120 in such a manner that the final sum is transmitted to the X-register 116. Having completed the arithmetic process, the sum is transmitted from the X-register back to the A-register where it is left. During this process of performing the addition the address $\omega$, which was stored in $U_L$ 82 at the initiation of this instruction is transmitted unmodified to the S-register. It is then transmitted to the address translator which selects address $\omega$ in main memory 62, such that the final sum may be transmitted from the A-register to the main memory. Referring to FIG. 12 it can be seen that at the completion of this instruction the logical step indicated by block 262 has been completed. It is now necessary only to issue the command to stop computation.

Since no branch designation existed in the previous instruction ($\beta+3$), the P-register at this time stores the value $\beta+4$ which indicates the next instruction to be performed. At this point it could be noted that a stop instruction similar to that defined above at address $\phi+1$ could be inserted here, but it is felt to be of sufficient interest to warrant description of the utilization of an unconditional jump for changing the normal sequence of instructions. The instruction stored at $\beta+4$ is nothing more than an unconditional jump instruction which will take calculation to the point where a stop will be executed. Having reference the address $\beta+4$ in memory in a manner similar to that described above, and having read the instruction to the $Z_U$ register, it is then transmitted to the U-register for translation. The $b$ designator having been translated as 0 indicates that no B-register modification is to take place with respect to the address portion ($y$ designator) of the instruction. The $k$ designator having been translated as 0 indicates that the word length is not involved in this instruction. The $j$ designator having been translated as 1, and the OP code portion having been translated as that indicating an Arithmetic Jump yield the combination that an unconditional jump must be executed. This means that no choice or decision need be made concerning the existing data, but instead that the sequence of instructions is arbitrarily broken. This being the case the P-register 98 is cleared, and the contents of $U_L$ are transferred in an unmodified manner to the P-register. This process transfers the address $\phi+1$ to the P-register, thereby indicating the next instruction to be executed. Since the instruction at $\phi+1$ has already been described as being an automatic stop, it is not necessary to go on further and describe how computation is stopped.

It can be seen from this very simple example the care that must be taken in coding the instructions necessary to solve the problem as indicated by a flow chart of the solution of the problem as indicated in FIG. 12. It should also be evident at this time that one skilled in the art could utilize these instructions or other instruction available in the Unit computer to arrive at various sequences of instructions which would perform the solution of the problem as set forth in the assumptions above. The degree of sophistication, the computer operational time, the utilization of the registers, and the utilization of the memory might vary from one program design to another, however, it should be noted that this does not forestalll arriving at a solution to the problem which yields the desired result. In the light of this situation, the remainder of the programming discussed in the specification will deal primarily with flow charts rather than the detailed instruction coding, since it is the solution illustrated in the flow chart as it is found to control described hardware which comprises the main source of inventive interest rather than the detail coding which implements these flow charts.

SECTION I. SITE SURVEILLANCE CONSOLE

The Site Surveillance Console will direct and monitor performance of an installation consisting of multiple Unit computers and their associated peripheral equipment. It incorporates the following capabilities:

(1) A data entry facility—The Site Surveillance Console permits an operator to direct operation of the computer complex located at any given site. Commands may be originated at the Site Surveillance Console to load the system program, execute or terminate systems operations, and initiate emergency recovery procedures.

(2) Data output facility—The Site Surveillance Console permits display of system status and alarm information. Selected computer detectable faults and equipment malfunctions, may be displayed. This provides the Site operator with an indication of overall data processing system performance and permits him to decide when subsystem maintenance or an alternate mode of operation is required.

(3) Remote computer control—The Site Surveillance Console operates at a central location from which to operate the individual Unit computers which comprise a particular site.

Organization of the main hardware components which comprise the Site Surveillance Console is dependent on the number of Unit computers which it monitors at a particular installation. FIG. 13 is a block diagram illustrating the Site Surveillance Console control of three Unit computers. No consideration of the computer functional relationships is presented here. Basically, there are three types of equipment modules in the Site Surveillance Console. They are:

(1) A Keyset Control 300, one being provided for installation;

(2) Indicator Panels 302, one being provided for each Unit computer; and (3) Control Units 304, one being provided for each Unit computer.

The three Unit computers labeled 306, 308 and 310 which comprise this illustrative example, are connected to the Keyset Control by one of their normal input cables 312. The computers are coupled to their associated indicator panels by one of their normal output cables 314. Finally, the computers are coupled to the Control Units by individual control cables 316.

The Site Surveillance Console data entry function is performed by an operator using a Keyset. The Keyset is of a type well known in the art which is adapted to have the proper computer/keyset interface. The Keyset is capable of communicating directly with as many as three computers in this embodiment, the entries being directed to a selected computer by one of three computer-selection buttons. Communication is initiated by means of a computer Interrupt and does not require programmed interrogation. Thirty data lines, the Interrupt line, and the Input Acknowledge line are used in each input cable 312 from the Keyset control.

The keyboard layout and the input word format are shown in their functional relationship in FIG. 14. The Keyset functions are divided and will be described in the following paragraph.

The 30-bit machine word 318 utilized in the Unit computer is broken into five distinct segments. Bits 0–19 are used for the numeric display 320 representation and consist of five digits. Bits 20–23 are used to indicate the category display 322. Bits 24–26 indicate the command type 324. Bits 27 and 28 are utilized to indicate the selected computer, and comprise the computer designator 326. Bit 29 is utilized for error checking with a parity bit 328. The parity circuitry adjusts bit 29 to produce odd parity on each word sent to the Unit computer. There is no error indicator on the Keyset, but the computer alerts the operator to parity or format errors by way of the Site Surveillance Console Indicator Panel.

The Computer Designator Buttons 329 are used to select the desired Unit computer to which Keyset entry will be sent. These buttons control bits 27 and 28 in the data word, and perform the necessary switching to connect the Keyset with the selected computer. If Unit computer A is to be selected, button 330 is selected, thereby setting the code 00 in the control bits. If Unit computer B is to be selected, computer designator button 332 is depressed, thereby setting the control bits to the 01 condition. In the event Unit computer C is to be selected, computer designator button 334 is depressed, thereby setting the control bits to the 10 configuration. This selection allows all of the Unit computers to be controlled from a single source without duplication of control input circuitry.

The Secondary Code Buttons, or Command Type Buttons 335 are 8 in number and are used to control the entry of bits into bit-positions 24–26, thereby indicating to the selected computer the basic type of Site Surveillance Console message which is to be entered. The three available control bits in the command word allow eight possible combinations, and they are in order, starting from (000)—Enter Program 336, Start Program 338, Stop Program 340, Modify Program 342, Magnetic Tape Operation 344, Paper Tape Operation 346, Transfer Data 348 (XFER), and Alarm Display 350.

The Data Keyboard 351 consists of 10 keys which are used to enter the remaining 24 bits of data in the control word 318. Each key enters a four-bit binary coded decimal data unit. These include the Start category 352, which is comprised of the Cleared 354, and the With Data 356 options; the Transfer category 358, which is comprised of the Receive 360, and the Send 362 selections; and the Alarm category 364, which consists of the Amplify 366, and the Resume 368 selections. Additional selections are the 0 labeled 370, 1 labeled 372, 2 labeled 374, and 3 labeled 376.

The action keys consist of the Clear key 378 and the XMIT key 380. The Clear key extinguishes the read out displays and clears the display registers. The XMIT key initiates the transmission of a message by interrupting the computer, and illuminates the Wait light 382.

The read out display is an identifier display which shows both the selected computer and the command type. Of the six data display units, one shows category labels (where applicable) and the remaining five show numerical information. Some examples of display formats are shown in the table below.

Typical Keyset Display Formats

| IDENTIFIER DISPLAY | DATA DISPLAY | | | | | | |
|---|---|---|---|---|---|---|---|
| COMPUTER A / ENTER PROGRAM | 0 | 0 | 0 | 0 | 0 | 2 | NOT USED; PROGRAM IDENTIFIER(S) |
| COMPUTER A / START PROGRAM | WITH DATA | 0 | 7 | 3 | 5 | 0 | PROGRAM IDENTIFIER(S) |
| COMPUTER A / STOP PROGRAM | 0 | 0 | 0 | 0 | 0 | 0 | UNSPECIFIED |
| COMPUTER A / MODIFY PROGRAM | 0 | 0 | 0 | 0 | 2 | 4 | NOT USED; MODIFICATION CODE |
| COMPUTER A / MT OPER | 0 | 0 | 0 | 0 | 1 | 3 | NOT USED; OPERATION CODE |
| COMPUTER A / PT OPER | 0 | 0 | 0 | 0 | 0 | 1 | NOT USED; OPERATION CODE |
| COMPUTER A / TRANSFER DATA | SEND | 0 | 0 | 0 | 0 | 3 | TRANSFER PARAMETERS |
| COMPUTER A / ALARM DISPLAY | AMPLIFY | 0 | 0 | 0 | 1 | 4 | ALARM IDENTIFIER |

A typical Keyset entry operation would be summarized as follows:

(1) The operator enters the selected computer designator selection, and the command type followed by six sequential data units;

(2) The operator then inspects the message on the read-out display for accuracy of entry; and (3) When the message is satisfactory, the operator presses the XMIT key 380 which sets the Interrupt line. The computer interrupt processing routine stores the input channel and sends an input-acknowledge signal. This signal clears the data register 318, extinguishes the Wait light 382, and causes the Interrupt signal to be dropped. If the computer does not accept the message by executing an instruction which stores the input channel, the Wait light 382 remains illuminated.

The Site Surveillance Console data output function is performed by visual indicator panel for each computer (see FIG. 13). Each panel consists of a 15-bit register with each bit controlling the state of an indicator lamp. Each indicator panel is connected to a normal computer output channel 314 in which it uses 15 data lines and the External Function line. The computer sends a 15-bit External Function word to activate the indicators wherein bits set to 1 in this word cause bit-registers in the respective Indicator Panel to be set with the corresponding indicators becoming illuminated. Any bits which appear as 0 cause the respective bit-register to be cleared, and the indicators extinguished. The Indicator Panel has a manual master clear key which extinguishes all 15 indicators, and individual set buttons for each indicator position. The Indicator Panel external function word utilizes bits 15–29 to set or clear corresponding indicator numbers 0–14, with bits 0–14 of the computer word not being used. This is illustrated below:

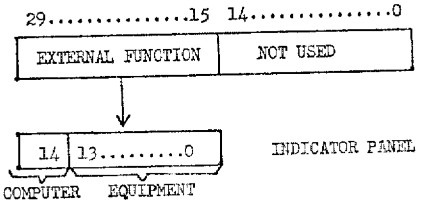

Each indicator represents a type of system malfunction with indicators 0–13 (if all are needed) being labeled to correspond to the equipment connected to the Unit computer communication channels 0–13. Indicator 14 is uniquely used to represent a computer malfunction. During system operation, an internal checking routine in each Unit computer continuously monitors the peripheral equipment operation and programs. When the respective routines detect a malfunction of the computer or of the peripheral equipment, or a program-error, it warns the operator of the condition by way of an illuminated indicator on the Site Surveillance Console.

In addition to the normal mode of operation described above, the Indicator Panels 302 also may be used in special ways to increase flexibility of the system. This situation may be necessary when (1) additional information is required to specify the exact nature of an alarm condition, or (2) when a Site Surveillance Console Keyset entry requires a feedback of an acknowledgement code to the operator. When the operator desires additional information about a specific subsystem fault, he may send a command via the Keyset, directing the computer to display temporarily these data on the Indicator Panel in the form of a binary code. After the code has been read, another Keyset command, such as Resume 368, causes the Indicator Panel to resume its normal mode. Feedback from a Keyset entry occurs when, after receiving and executing certain Site Surveillance Console Keyset commands, the particular Unit computer sends a binary acknewledgement code to the Indicator Panel. This code may be either maintained for a fixed time interval, or until such time as a Keyset command directs that the normal indicator mode be resumed.

The Site Surveillance Console has a Control Unit for each computer with which it is associated. In FIG. 13 Unit computer A 306 is associated with Control Unit A labeled 380; Unit computer B 308 is associated with Control Unit B labeled 382, and Unit computer C 310 is associated with Control Unit C labeled 384. Each control unit consists of push buttons, toggle switches, and indicators which are extensions of certain manual control functions from the maintenance panel of the associated Unit computer. Only those controls needed for efficient remote computer operation are included. The lines required to implement the following controls and indicators are extended to the Site Surveillance Console in a special Control Cable from each of the Unit computers.

*Controls*

(1) On Line toggle switch—transfers control to the Site Surveillance Console control unit and locks out control at the computer maintenance panel.

(2) Master Clear pushbutton (momentary)—clears computer registers and control bits.

(3) Enable "A" Sequence pushbutton (momentary)—enables computer operation sequence "A."

(4) High Speed pushbutton (momentary)—initiates the computer high speed mode. If the master clear precedes a high speed start, the first instruction is read from address 0 in magnetic core memory.

(5) Bootstrap Start pushbutton (momentary)—initiates the bootstrap mode by reading the first instruction from address zero in a special 16-word wired in memory 64 (see FIG. 2). The bootstrap mode locks out computer interrupts and permits initial program loading from external storage. The last bootstrap instruction jumps to the desired magnetic core memory address and terminates the bootstrap mode.

(6) Stop pushbutton (momentary)—forces the Unit computer to stop computation.

(7) Special Fault Jump toggle switch—causes a program fault condition (instruction 00 or 77) to result in a jump to address 0 of the bootstrap memory.

(8) Selective Jump (1, 2, 3) toggle switches—perform functions identical to the Unit computer jump selection switches.

(9) Selective stops (5, 6, 7) toggle switches—perform functions identical to that performed by the Unit computer selective stop switches.

*Indicators*

(1) High speed indicator—illuminated while computer is running.

(2) Fault indicator—illuminated after a 00 or 77 instruction OP code is read. This fault indicator may be extinguished by depressing the master clear (see 2 under Controls).

(3) Stop indicators 4, 5, 6, 7—indicate the type of stop condition when computation ceased.

(4) On-line indicator—illuminated while the Site Surveillance Console controls are live and computer maintenance panel switches are locked out.

(5) Overtemp indicator—warns of the situation when a high temperature condition exists within a Unit computer.

SECTION J. DATA FLOW AND EQUIPMENT CONFIGURATIONS

(J–*a*) *Functional tasks*

FIG. 15 is a block diagram indicating the task breakdown necessary for the functional operation of a site with respect to the remainder of a multicomputer system. Block 390 represents that portion of the system of computer sites which are remotely located from one another, and are remote from the reference site. Block 392 represents that portion of the hardware located at the reference site which is utilized to communicate with the remainder of the multicomputer system. This communication consists of transmittal from the system, as represented by lines 394, or communication to the system, as represented by line 396. The portion of the hardware represented by block 398 consists of the necessary controls required to process the data and issue commands to the processes being controlled 400. Information concerning the control of the processes, or data affecting the processes, is received from the system on line 402. Reduced data concerning the status of the processes being controlled is supplied to the Data Buffering portion 392 of the system by way of line 404. The actual control of the processes 400 subject to the surveillance of the reference site is handled by way of transmittal of control signals on line 406. The status of the processes being controlled is supplied to the controlling element 398 from sensors located at the process site, by way of line 408.

It will be noted that the function specified as System Time-Sharing and Data Buffering 392 may be performed by a single Unit computer, or may be joined in the computer which also is designated as the Control and Data Reduction Processor 398. The situation may also arise wherein the number of processes being controlled is of such a magnitude, or the processes are of a degree of complexity, to warrant the utilization of more than one Unit computer to control and reduce the sensed data. In such an instance, block 398 would represent more than one Unit computer. For the preferred embodiment of this invention block 392 consists of a Unit computer connected to communications equipment so that it may transmit and receive data from the remainder of the system of computer sites. Also, block 398 is one or more Unit computers so arranged to receive and transmit data to the Unit computer which is in communication with remainder of the system. The computer or computers designated by block 398 are in turn in communication with the various processes being controlled. This breakdown of task solution facilitates the control of the timing of communications to and from the system, while retaining sufficient real-time capabilities of communication to and from the processes being controlled.

This functional breakdown of the assignment of tasks is such that a close control of the timing may be kept by the Unit computer designated 392. The communications with the remainder of the system may thereby be fitted to the time slot arrangement of the system. Likewise, the Unit computer 392 is free when not communicating with remainder of the system to transmit data to and from the portion of this equipment at the site which is controlling the processes. This then provides a buffering process wherein the critical timing of the system communication is complied with by each individual site by the buffering and retention of data as it may become available from the process controller 398. This arrangement also provides adequate adaptability of the hardware represented by block 398 in supplying the process control for the widely varying real-time processes under consideration. The situation may exist where the particular site is controlling a process which issues data of interest to the remainder of the computer system each time the site is to communicate with the system, or it may be such that the process data is only of interest to the system at widely spaced time intervals. The decentralization of task control, then, allows the site to operate efficiently in its communication with the remainder of the system, while still providing the required real-time control for the processes being controlled.

(J–*b*) *System communication timing requirements*

The timing relationship illustrated in FIG. 16 shows the preferred method of communication by each site with the remainder of the system. The "transmit" period 410 is illustrated by a positive excursion, while the "receive" period 412 is represented by no excursion. As was stated above, the number of sites utilized in this invention may vary according to the requirements of the particular system. This means that the allowable transmission time T may vary depending upon the system configuration. Since each of the sites operate asynchronously with respect to the remainder of the system, it is desirable that each site have a fixed period of transmission and a fixed period of receiving. This allows each computer site by referencing its internally operative clock to determine when its turn to transmit arises. This cyclic determination of communication is termed "time-slotting." In the event that no information is available to be transmitted to the remainder of the system, the particular site would simply so indicate, and the normal allowable transmit time T would be allowed to elapse. Further, in the event that more data is available at a particular site for transmission than can be handled during the allowable transmission time, the transfer will be split such that only that capable of being transmitted in time T is handled. The remainder of the available but untransmitted data must await the next occurrence of the site in the communications cycle.

This illustration of the system communications timing utilizes a uniform transmit time T for each of the sites; and further, illustrates that all of the allowable time during the cycle is utilized. This need not be the case, and by appropriate adjustment of the internally stored programs at the sites the condition may exist wherein there may be safety margins added such that not all of the available time is utilized. It may also be arranged such that selected sites may be allowed to transmit for longer periods than is allowed to the remainder of the sites. For the situation where the number of sites is determined and it is determined that the period of transmission is to be equalled for each site, the relationship $$T \leq \frac{1}{n}$$

must be satisfied. If this relationship is not satisfied, the timing relationship will be upset. The cyclic operation will be so affected that the interrogation of the controlling clock will indicate that a particular site should be transmitting at a time when another of the sites has not completed its transmission period.

From the foregoing discussion it can be seen that the number of sites "*n*" must be kept at a number which provides for a reasonable transmit time T. If the situation should arise where the number of sites is so numerous that the transmission times does not provide adequate capacity to transmit the required amounts of data, the system will be inefficient or unworkable.

This time-slotting of the system communication results in a so-called Round-Robin system of communication, which differs from other possible systems of control. As was stated above, the Round-Robin provides for the self-determination by each site of its period of transmission and when such transmission should occur with respect to the remainder of the system without having to have outside request for transfer. Such a mode of operation provides for the timing and control which turns the asynchronously operating sites into a cohesive system.

(J–*c*) *Data transfers*

The Data Transfer Control illustrated in FIG. 17 shows in block diagram form a Unit computer 414 having a first input device 416 connected to one of its input channels, and an output device 418 connected to one of its output channels. Communications with the Unit computer 414 is carried on in a 30-bit parallel mode for this embodiment, but with no limitation thereto intended. Each of the 14 input and output channels associated with each Unit computer has 30 data lines plus the requisite number of control lines. A typical input cable for connecting the data handling device 416 to the Unit computer has 3 control lines: Input Data Request 420; Interrupt Line 422; and Input Acknowledge Line 424. When the computer notes the presence of a signal on the Input Request Line, it is informed that a peripheral device on this channel wishes to transfer information to the computer over its data lines 426. After the computer has responded to this request, accepted the data from the peripheral equipment 416, and stored it in its memory section, it sends out a signal over Input Acknowledge Line 424 to advise the peripheral equipment 416 that the transfer of data has been completed and that new information can now be placed on lines 426.

The control of peripheral equipment external to the central computer 414 is carried out with use of the "function word" and "interrupt words." Interrupt words are generated and sent by the peripheral equipment to the computer on Data Lines 426. By this means, the external equipment informs the Unit computer of such things as the operating status of the peripheral device or its desire to initiate or terminate a data transfer. An Interrupt word is distinguished from a Data word by activating the External Interrupt Control line 422. The activation of this line causes the computer program to jump unconditionally to an address in memory associated with the particular channel in question, where it will begin a subroutine to analyze the interrupt word and take appropriate action. When the data handling device 418 connected to the output channel of Unit computer 414 is in a condition to accept data from the computer, it presents an Output Request signal on control line 428. When this signal is detected by the Unit computer, it takes the data from the memory and places it on the Output Data Lines 430. Having done this, it then generates a signal on the Output Acknowledge line 432 to inform the peripheral device that the data on transmission lines 430 is ready for sampling. The peripheral equipment can now detect the Output Acknowledge signal, and thereafter samples the Data Lines to accept the data word. After acceptance, the peripheral device 418 terminates the Output Data Request signal from line 428, and thereby causes the Unit computer to drop the Output Acknowledge signal and the Data Signal from lines 432 and 430, respectively.

As described above, the control of the peripheral equipment is carried out with the use of Function words and Interrupt words. Function words sent to the peripheral equipment on the Output Data Lines 430, are the means by which the computer program controls its associated peripheral equipment. A Function word is distinguished from Data words by activating the External Function Line 434. The Function word is translated into a discrete set of actions by the peripheral device. The use of these program-generated Function words, rather than discrete instructions, to control the peripheral equipment yields a more versatile system in that the computer may operate to effectively control input/output devices which have varying operational characteristics.

A typical transfer, either into or out of a Unit computer, is started by two programmed commands, one being to the external equipment and the other to the computer's input/output section. The first places a signal (External Function) on a control line to the peripheral control equipment along with a word on the Output Data Lines 430 to tell exactly what is to be done. The other instruction defines the core storage buffer area in the Buffer Control Register (Z-register 68, 70, see FIG. 2), and specifies whether or not an interrupt is to occur upon completion of the transfer.

The following sequences of events will occur when data is transferred into the Unit computer from a system which has both input and output lines.

(1) The computer executes an instruction that puts into its Input Buffer Control Register the beginning and ending core memory addresses for the data to be transferred. It also specifies whether an Internal Interrupt is to occur upon completion.

(2) The Unit computer executes an instruction setting a control word on the Output Data Lines 430. This control word specifies the function to be performed by the equipment which, in this case, is to accept input data. It also sets a signal on one of the control lines that tells the equipment to sample the control word.

(3) Upon being informed that the input transfer is required, the external equipment assembles and places a word on the Input Data Lines 426. When ready, it signals that a word is available by placing the Request signal on the Input Data Request line 420.

(4) The Unit computer, finding a Request signal present on the control line, examines the Buffer Control Register to see where the data is to be placed in memory. During this memory cycle the lower address in the Buffer Control Register is automatically incremented by one in preparation for the next word to be transferred.

(5) The data is taken from the Input Data Lines 426 and placed in the memory location specified by the contents of the Buffer Control Register.

(6) The computer then outputs a signal on the Input Acknowledge Line 424 which indicates to the external equipment that the computer is ready to accept another word.

Steps 3 through 6 are repeated at a speed governed by the speed of the external equipment, and continues until the lower address in the Buffer Control Register (Z-register 68, 70, see FIG. 2) is equal to the upper address, thereby indicating that the transfer is complete. The Input channel 426 is then deactivated until such time as the internally stored program operates to perform an instruction such as step 1 again.

Following the completion of steps 1 and 2, the program and the Input/Output section work independently, with only an Interrupt of one form or another, or a special program interrogation bringing them back into synchronization. Block transfers may be occurring on any or all channels at one time, since peripheral equipment that is utilized in conjunction with the Unit computer is generally operable at a much slower rate than that of the basic memory cycle of the computer. As was stated above, when words are presented to the computer at exactly the same time on more than one channel, the lower numbered channel must wait its turn for two memory cycles before it can transfer the word into memory.

The block diagram illustrated in FIG. 18 shows the connections required for the transmission of data from Unit computer A labeled 436 to a second Unit computer B labeled 438. The transmission of data and control signals between computers presents problems not encountered in a normal transmission between a Unit computer and other external equipment. As was described in Section D. UNIT COMPUTER CHARACTERISTICS, the system forming the preferred embodiment of this invention has 12 normal input and output channels, and 2 special input and output channels. These 2 special channels are equipped with circuits for handling the transmission of data between compatible computers. As was described in the preceding paragraphs, the Acknowledge signal is always sent from the computer to the peripheral unit; and the Request signal is always sent from the peripheral unit to the Unit computer. In order to distinguish these control signals when describing inter-computer information transfers, the signal sent to the external computer by the reference computer will be termed the Ready signal 440, and the one sent from the external computer to the reference computer will be termed the Resume signal 442. When the sending computer has finished placing the data it wished to transmit in its output register, it sends the Ready signal on the designated channel. The receiving computer is thereby advised that data is available to it, and responds by first sampling this data and then returning a Resume signal to the transmitting computer.

The remaining line in the special input cable of FIG. 18 is the Input Buffer Active line 444. A signal on this line is the means by which the external computer (Unit computer B) informs the Unit computer of reference (Unit computer A) that it is in condition to receive data. This means that when the transmitting computer receives a signal on this line, it knows that the receiving computer is in an active state and capable of receiving information.

In light of the preceding it can be seen that the Ready signal enters the external computer as an Input Request while the Input Acknowledge enters the transmitting computer as a Resume signal. When the sending computer has finished placing the data it wishes to transmit in its output register it sends the Ready signal on the designated channel.

A special output register ($C_1$-Register 34, see FIG. 2) is incorporated into the Unit computer to alternately service the two output channels reserved for inter-computer communications. All output inter-computer communications are time-shared through this special output register which holds data until the Resume 442 signal is received from the receiving computer. In the event that a Resume signal is not received within a predetermined length of time, the register is automatically cleared and the computer is notified of this condition by an internal interrupt denominated the Inter-Computer Failure Monitor. This time interval is necessary to ensure that inter-computer output with other Unit computers is not suspended indefinitely.

The sequence of data and control signals for a normal transfer of data from computer A to computer B in buffer mode would proceed as follows:

(1) Unit computer B sets Input Buffer Active 444 signal;

(2) Unit computer A detects Input Buffer Active 444 signal;
(3) Unit computer A places data on 30 Data Lines 446;
(4) Unit computer A sets the Ready 440 signal which becomes the Input Data Request to Unit computer B;
(5) Unit computer B detects the Input Data Request signal;
(6) Unit computer B samples 30 Data Lines 446;
(7) Unit computer B sets Input Acknowledge line 442 which is the Resume signal to Unit computer A;
(8) Unit computer A senses the Resume signal on Resume line; and
(9) Unit computer A drops the 30 Data Lines 446 and the Ready line 440.

Steps 3 through 9 of this sequence are repeated for every data word, with the Input Buffer Active line 444 remaining energized during the entire transfer of the data.

FIG. 19 depicts the timing for data and control signals. When transmitting data from the computer to an external equipment, the data lines must be stable before being sampled. For this reason a fixed time delay of approximately 4.5 microseconds exists between the instant the computer loads the Output Register and the instant the Output Ready signal is energized. An analogous situation exists for computer Input period. A fixed delay of approximately 3 microseconds exists between the time the computer receives the Resume signal and the time the computer samples the input data and de-energizes the Ready line. This delay is not sufficient to ensure that the data lines are stable before being sampled by the computer if the external equipment resumes simultaneously with placing data on the line. For this reason, in each input equipment it is necessary to incorporate a delay of at least 4.5 microseconds between the time the data is placed on the lines and the time the Resume signal is initiated.

The special channels preserved for inter-computer communications do not have two of the normal control lines that other Input/Output channels have. The special output channels do not have an External Function Control line, and the special input channels do not have the External Interrupt Control line. Due to the absence of these control lines and because of the data transfer logic used on these special output channels, it is not feasible for this embodiment to connect any peripheral equipment to these special channels in the absence of the utilization for their intended purpose. It should be noted further that the normal priority scheme utilized for input or output is not used for inter-computer data channels. Instead, each channel is scanned and operated on in sequence.

Peripheral equipment items have been assigned to specific Input/Output channels of each computer at the site. In the event that a given piece of peripheral equipment is not used at the site under consideration, the normally assigned Input/Output channel is a spare which may be utilized for some other purpose. A given piece of peripheral equipment will not normally be assigned to differently numbered output or input channels. Table J–I defines the channel assignments for the preferred embodiment of this invention, but limitation thereto is not limited.

TABLE J–I

| Assignment | Channel |
|---|---|
| Communication | 15 |
| Radio Communication | 14 |
| Telephone Communication | 13 |
| Teletype | 12 |
| Magnetic Tape | 11 |
| Unassigned | 10 |
| Unassigned | 7 |
| Unassigned | 6 |
| Site Surveillance Console | 5 |
| Paper Tape Reader and Punch | 4 |
| Video Display | 3 |
| Keyset | 2 |
| Inter-Unit Computer | (1) Special |
| Inter-Unit Computer | (0) Special |

As was stated above, channel $15_8$ has the highest priority. In readity, there are no priority differences between the special channels since the circuitry internal to the Unit computer scans each special channel sequentially.

As was stated above, the amount of data transmitted by each site during its turn at communication to the remainder of the system is variable. This raises the major problem of the synchronization of the buffer control in the communicating computers. The solution to this problem is handled by appropriate programming techniques. The control problem exists primarily when the inter-computer data buffers are initiated, and when the transmission is terminated. Between initiation and termination the buffers are maintained in synchronism by the data control signals.

Limits for the input buffer must be defined before the input buffer mode can be initiated. Establishing this mode in the receiving computer is a prerequisite for inter-computer data transfer. Since the amount of data to be transmitted is not known by the receiving computer, the transmitting computer must define the starting and stopping buffer addresses for the receiving computer. The Input Buffer Control Register (Z-register 68, 70, see FIG. 2) of the receiving computer is programmed so that the first buffer word received is entered into this control register. In other words, the initial address (a lower-order 15 bits of the Input Buffer Control Register) is the same as the address of the Input Buffer Control Register. The terminal address is contained in the upper 15 bits of the Input Buffer Control Register and is greater than the initial address. Having set the initial address equal to the address of the Input Buffer Control Register, the input buffer mode can be initiated. This is accomplished by the execution of instruction 75, Initiate Input Buffer With Monitor. Before the transmitting computer can initiate the output buffer, the receiving computer must have established an input buffer mode. This is determined by the transmitting computers testing the state of the input buffer status line, with instruction 13, Enter External Function.

When the receiving computer is ready to receive data and the above conditions have all been met, the transmitting computer establishes the Input Buffer Control Word for the receiving computer. The first word of the output buffer data is the Input Buffer Control Word for the receiving computer. This consists of the lower-order 15 bits defining the initial address for data storage and the higher-order 15 bits defining the terminating address for data storage, thereby completely defining a buffer area for the receiving computer. It is necessary also that buffer limits for the output buffer of the transmitting computer be defined. The initial and final addresses for the output buffer are entered into the lower- and upper-order halves respectively of the 30-bit Output Buffer Control Register. Having defined the output buffer limits, the output buffer mode can be initiated. This is accomplished by execution of instruction 76, Initiate Output Buffer Mode With Monitor. As soon as this instruction is executed the first word of the output buffer data is transmitted to the receiving computer. It will be recalled that this first transmission consists of the Input Buffer Control Word to thereby define storage limits for the receiving computer. When the buffer conditions have been established, their transfer proceeds under control of the Ready and Resume 440, 442 signals for the transmitting computer and the Request and Acknowledge 440, 442 signals for the receiving computer which were described above.

As soon as the transfer is completed each computer will be interrupted, as a result of the buffer monitor, thereby allowing each computer to take follow-up action. The concept of system error-detection and recovery makes it imperative that each interconnected computer be ready with an established input buffer for reception of data from the other computer(s) at all times. The Executive Routine (to be described later) must be kept informed of the buffer status at all times to provide for scheduling the next inter-computer output buffer.

*(J–d) Hardware and timing considerations*

FIG. 20 is a block diagram illustration of a two-computer site, and illustrates the timing interface requirements at the various connecting points at the site. The portion of the system separate from the computer site of reference is shown enclosed in dashed box 450. The system of computer sites 452 supplies outputs 454 to the site of reference, and receives inputs 456 from the site of reference. The number of inputs to the site of reference 454 depend upon the number of sites in the entire system. It will be recalled from the description of the system communication timing requirements, as shown by FIG. 16, that the inputs 454 to the site of reference normally occur in a Round-Robin fashion. The system-to-site interface 458 is such that stringent timing controls must be met as illustrated by FIG. 16. This requires that the Unit computer A labeled 460, which is in communication with the remainder of the system, must keep close control of the timing relationship on the communications network. This is done by synchronization of the real-time clocks of all of the computers in the system, and by timely interrogation of the clock so that the period of transmission and receiving may be kept in constant check.

The portion of the equipment located at the site of reference which is on a system time-sharing and data-buffering assignment is shown enclosed in dashed block 462. It consists of Unit computer A, the communications equipment 464, the local peripheral input equipment 466, and the local output peripheral equipment 468. The numbers shown in the Input and Output sections of the Unit computers refer to the cable numbering assignment for the particular piece of equipment as was described in the Table J–I above. It will be noted that Unit computer A receives inputs from the communications equipment 464 on one or more cables 470 which are denominated selectively 13 through 15. The communications equipment 464 may consist of such items as radio carriers or telephone carriers. Unit computer A receives input on line 472 from the input peripheral equipment 466 which may consist of such items as a paper tape reader or punched card reader. Unit computer A supplies outputs to the communications equipment on the required cables 474, which are connected to selected terminals 13 through 15. Unit computer A also supplies an output on channel 4 over cable 476 to the output peripheral equipment 468, which may consist of paper tape punch or punched card equipment.

The portion of the site of reference which is in communication with the processes being controlled is shown enclosed in dashed block 478. This includes a Unit computer B, labeled 480, with its associated input peripheral equipment 482, output peripheral equipment 484, and the interconnections to the process being controlled. The input and output peripheral equipments are of the same nature as were described above. Communication between the two Unit computers is carried on by way of direct channel connection on channel 0 labeled 486 and channel 1 labeled 488. These channels handle the inter-computer data transfers in the manner described above.

Communications between the two computers may also be carried on by way of the duplexed equipment 490. "Duplexing" is the term applied to those equipment items which may be time-shared between two computers, and which have been designed with a built-in duplexing feature. Two computers are permanently connected to each of these equipment items. Each computer can gain control of the duplexed equipment, use the equipment, and release it by programmed instructions. Time-sharing is the primary purpose for duplexing equipment, but one computer may be so programmed to assume full responsibility for a duplexed equipment. One one computer may communicate with the selected piece of duplexed equipment at any given time. Before either computer may reference the duplexed equipment with a particular command, it must first gain control of the duplexed system. It is a function of the duplexer to grant or refuse control to the requesting computer. A computer request for control will be granted when the duplexed system is not being controlled by either computer. When one computer requests control of the duplexed system it is in the process of being utilized by the other computer, the request will be retained in memory, and the control will be granted when the other computer releases it. Items of peripheral equipment which may be appropriately duplexed are the Magnetic Tape System, the Keyset, the Communications Equipment, or the Video Displays. Detailed operation of this duplexing system will be found in copending application entitled Duplex Operation of Peripheral Equipment, Ser. No. 219,015, filed Aug. 23, 1962, the inventors being Albert J. Heideman and Robert J. Gountanis. The use of this duplexed equipment, such as the Magnetic Tape Unit, allows the computer under control of the process (Unit computer B) to record data on a particular magnetic tape unit, and thereafter allow Unit computer A to gain control of the tape unit to thereby utilize the information so recorded. This allows utilization of data by both computers without having to perform a data transfer on the special inter-computer channels. This facilitates the transmittal of data when timing is not extremely critical in a manner to most efficiently utilize the site capabilities.

The Control and Data-Buffering interface 492 is of a nature such that Unit computer A will request data during periods when it is free from its task of communicating with the remainder of the system. This interface provides for the variable availability of Unit computer B, due to its real-time process control function, which is of an unpredictable nature. This means that data must be transmitted between the two computers either directly over the special channels or by way of the duplexed equipment 490 during periods when computer time is available. It will be noted further, that the timing of Unit computer B is the controlling factor in this data exchange interface because of its real-time function, and data will be made available to the remainder of the system, by way of transmission through Unit computer A, during periods when Unit computer B is free from its process control operation.

The processes being controlled are shown illustrated enclosed in dashed box 494. The various processes are illustrated by block 496, and may be of any nature subject to computer control. Unit computer B supplies output control information to the controlled process output sensors 498 on a normal output cable such as channel 7 labeled 500. The output sensors then transmit the control information to the process hardware over control path 502. During the execution of the various processes being controlled, outputs are generated by the machinery and presented to the controlled process input sensors 504 over control lines 506. These signals are made compatible with the computer input and supplied to Unit computer B on one of the normal input cables such as channel 7 labeled 508. The site-to-process interface 510 is of a real-time nature and is geared to the operating speeds of the various process equipments being controlled. This means that Unit computer B must be in condition to accept information on line 508, process the information to determine the status of the various process, and supply the decisive commands to the process output sensors to thereby affect control of the completion of the work.

Unit computer B also serves in the capacity of a data manipulation and reduction computer concerning the process information. This is done to facilitate the transmittal of data to the remainder of the system which is of a nature that is of general interest. This may consist of summary information concerning the number of products arrived at, the amount of goods produced by the processes, etc.

From the above discussion it can be seen that the Executive Routines which control the operation of each Unit computer must be of such a nature to provide the appropriate timing control in the solution of the assigned tasks. This means, that the Executive Routine of Unit computer A must operate both to maintain the very stringent communications requirement with respect to the remainder of the system while fitting in the task of transmitting data between itself and Unit computer B on a basis which is contingent on the real-time availability of Unit computer B. Likewise, Unit computer B must contain an Executive Routine which controls the operation of the real-time processes, while, during idle periods, it maintains a system of data transfer between Unit computer A such that new control information may be received and summary site data may be transmitted. It can be seen then that the internally operative real-time clock is utilized in conjunction with the sensed real-time control signals issued by the processes being controlled in a manner to completely define the time relationship of the computers at the site of reference with respect to the remainder of the multi-computer system.

(J–e) *Keyboard Control Unit*

FIG. 21 is a block diagram illustrating the relationship of the keyboard Control Unit 512 to the equipment located at a particular site. The Data Processing System is equipped such that it can handle and utilize many equipment items that supply data to and receive data from the respective Unit computers. Some of these equipments exhibit data rates which are extremely high in relationship of the computer Input/Output capabilities, while others exhibit data rates which are extremely low. Further, much of the equipment will exhibit the property of supplying data on substantially intermittent bases, while others of the equipment will supply new meaningful data at regular intervals. To alleviate the uneconomical operation wherein separate Input/Output channels would be assigned to each of the associated pieces of external equipment, the Keyboard Control Unit is utilized as a digital input multiplexer, thereby permitting a maximum of data sources to time-share a single computer Input/Output channel. The equipment configuration is such that the Keyboard Control Unit 512 has an Analogue-to-Digital Converter 514 and a Duplexer 516 associated with it. This allows Unit computer A labeled 518 and Unit computer B labeled 520 each to communicate with the various equipments channelled through the Keyboard Control Unit. Unit computer A has its input channel 2 labeled 522 and its output channel 2 labeled 524 connected to the duplexer labeled 516. Likewise, Unit computer B has its input channel 2 labeled 526 and its output channel 2 labeled 528 connected to the Duplexer. The operation of the Duplexer is as was summarized above.

The Keyboard Control Unit 512 is designed to provide for entry of three major types of data which are summarized as follows:

(1) Demand Digital Data Devices 530 inputs are provided by such manually actuated input devices as the keyboard input. A data word is entered into the input device and its availability is indicated to the Keyboard Control Unit by an operator-initiated enter signal. Thereafter, the data word is available to the computer upon demand.

(2) Ready Digital Data Devices 532 inputs are characterized by the fact that data is normally available and may be sampled at any time except during periods of change, by the computer acting through the Keyboard Control Unit. The equipment subject to the process control of the site which provide digital inputs to the control computer would fall in this category.

(3) Ready Analogue Data Devices 534 inputs are provided to the Keyboard Control Unit via synchros, by such devices as are operable as analogue controls. These analogue inputs are converted to digital data by the Analogue-to-Digital Converter 514 which is of a type well known in the art.

Since the typical Data Processing System site configurations contain more than one Unit computer, and since division of data processing activities may require that information from the Keyboard Control Unit input complex be made available to at least two of these computers, the Keyboard Control Unit is duplexed. This provides a programmable control such that the Keyboard Control Unit operates as a switching network which allows the various pieces of associated peripheral equipment to communicate with either of the two attached Unit computers.

Each input device connected to the Keyboard Control Unit 512 is identified by a unique two digit address. In this context, an input device is defined as a device capable of entering only one data word at a time. If a device is capable of entering two or more data words simultaneously, a unique address is associated with each word. The general assignment of Keyboard Control Unit input addresses is as follows:

TABLE J-II

| Address (Octal) | Type Input Device |
|---|---|
| 00 | Illegal Address |
| 01–07 | Demand Digital |
| 10–17 | Ready Analogue |
| 20–27 | Ready Digital |
| 30–76 | Demand Digital |
| 77 | Illegal Address |

Prior to establishing a normal operational cycle with the Keyboard Control Unit the Unit computer must be certain that it has control. This is accomplished by way of an External Function Code associated with the Duplexer 516, the other with an Interrupt from the Keyboard Control Unit that certifies control has been gained by the requesting Unit computer. Interrogation of entry stations by the Keyboard Control Unit is normally initiated by an External Function command from the Unit computer in control. This command designates the beginning and final addresses of the sequential block of addresses the computer wishes to interrogate. Receipt of this command word causes the Keyboard Control Unit scan control to sequentially scan each of the designated addresses and decide as to availability of data at each address. If data is found to be present, it is transferred to the Unit computer which is in control. If no data is present or if this address is not assigned, the buffer register in the Keyboard Control Unit is cleared and an all zero word is presented to the Unit computer. Once the interrogation sequence has been initiated in the Keyboard Control Unit 512, elapsed time between receipt of an input acknowledge from the Unit computer for the previous data word and the transmission of the input request for the current data word may vary from 10 to 5,000 microseconds.

The External Function command includes not only starting and ending addresses of data sources to be interrogated, but also the arithmetic difference between these two values. This redundant information permits the Keyboard Control Unit to perform certain checks on the address counters and its scan control unit. If an error is detected, the interrogation sequence is terminated and an Interrupt is sent to the Unit computer. Address checking capability is important since the only means by which the computer can associate data words with data sources is by the position of the data word in core memory.

Bit 29 is a parity bit in all data words from the Demand Digital Input Devices 530. This bit is set to "1" or "0" to establish parity of the entire data word, including the parity bit, as odd. As described above, this means that totalling the 1's in the data word of a correct parity always results in an odd number. Ready Analogue 543 and Ready Digital 532 input devices do not provide a parity bit in data words they transmit to the Keyboard Control Unit. However, upon receipt of such words, the Keyboard Control Unit inserts the parity bit in bit position 29 such that the parity of the word presented to the Unit computer will be odd.

External Function Codes are used by the Unit computer program to control the operation of the Keyboard Control Unit. All normal data flow between the Keyboard Control Unit and the Unit computer is unidirectional, from the Keyboard Control Unit to the computer. Information flow from the computer to the Keyboard Control Unit consists solely of control codes and error feedback information which is transmitted by way of the External Function Codes.

The External Function Codes used with the Keyboard Control Unit may be divided into two major groups, those codes necessary for control of the Duplexer 516, and those codes necessary for control of the information exchange.

There are three External Function Codes required to control the computer duplex mode;

(1) Request control—bit position 0 set to 1
(2) Release remote—bit position 1 set to 1
(3) Release local—bit position 2 set to 1

Action initiated in the Keyboard Control Unit by each of these codes is a function of the immediate control history of the equipment configuration.

Referring to FIG. 21, the computer of reference is Unit computer A. It is assumed that the Keyboard Control Unit exists in one of its three permissible conditions at a given time: (1) in control of Unit computer A, (2) in control of Unit computer B, or (3) in control of neither computer.

Assuming that it is desired by the Unit computer A to request control of the Keyboard Control Unit the following circumstances occur:

(1) Computer A in control—The Keyboard Control Unit immediately ceases operation on any previous command from Unit computer A, clears the internal circuits, and sends a Control Acknowledge Interrupt to Unit computer A which consists of a word with bit position 0 set to 1. This External Function may be used as a control status check.

(2) Unit computer B in control—the Keyboard Control Unit stores this code until Unit computer B releases control. At that time the Keyboard Control Unit sends a Control Acknowledge Interrupt to the Unit computer A, thereby indicating that A now has control and may start communication.

(3) Neither computer in control—the Keyboard Control Unit sends a Control Acknowledge Interrupt to Unit computer A immediately following receipt of the External Function Code.

Next assume that Unit computer A desires to issue the Release Remote command. Under this situation the follow circumstances exist: Regardless of the Keyboard Control Unit operative situation, this function code immediately causes an effective master clear of the Duplexer. Any stored Request Controls are cleared and the Duplexer 516 is set to a neutral state. Thereafter, either computer can gain control by sending a Request Control signal.

Next assume that Unit computer A desires to issue the Release Local command. The following situations occur:

(1) Computer A in control—The Keyboard Control Unit immediately switches to neutral state. If Unit computer A receives a Request Control and stores it prior to execution of the Release Local, Unit computer B immediately gains control of the Keyboard Control Unit and receives a Control Acknowledge Interrupt.

(2) Computer B in control—The Keyboard Control Unit ignores the External Function.

(3) Neither computer in control—the Keyboard Control Unit ignores the External Function.

The control of the information exchange is maintained by the utilization of discrete External Function Codes. In order for the Keyboard Control Unit 512 to recognize any of the External Function Codes described below, the Unit computer originating the code must previously have gained control through the Duplexer 516. In addition to the External Function Codes described above the following special conditions occur:

Master clear—bit position 3 set to 1. This Function Code clears all non-duplexer logic in the Keyboard Control Unit.

Interrogation—this is utilized by the program to specify the sequential block of input addresses to be interrogated by the Keyboard Control Unit 512. The Keyboard Control Unit transmits one data word to the Unit computer from each address has that address interrogated. The interrogation External Function contains the beginning address of the block to be interrogated, the final address of the block to be interrogated, and the difference between these two values. Beginning address must always be less than the final address. The configuration shown below illustrates the format of the interrogation word.

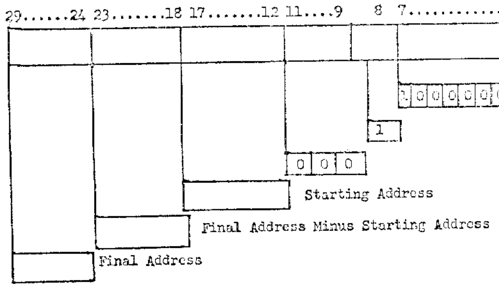

At the time this External Function is transmitted by the program, an input buffer should already be established of sufficient length to accommodate replies from the specified block of addresses.

Error Address—this Function Code specifies to the Keyboard Control Unit the address of the Demand Digital Input Device 530 to which an error signal is to be sent. The error may be a data word of bad parity, a data word of incorrect format, or any other program-detectable error in the word. The Keyboard Control Unit sends an end-of-error cycle interrupt to the computer after the error line to the Demand Digital Input Device has been activated. Only one error address may be specified at a time. If a Keyboard Control Unit address is specified which corresponds to a Ready Analogue 534 or a Ready Digital Input Device 532 in this External Function, the Keyboard Control Unit completes the error cycle and sends the interrupt to the computer but no error-line is activated.

(J–f) *Magnetic Tape Control Unit*

FIG. 22 is a block diagram which illustrates the relationship of the Magnetic Tape Control Unit 536 to the Unit computers at the site. Associated with the Magnetic Tape Control Unit is that portion of the circuitry termed termed the Duplexer 538 which provides the means by which the tape system is connected to communicate with one of two Unit computers. Associated with the Duplexer is Unit computer A labeled 540 and Unit computer B labeled 542. Unit A utilizes one of its normal input channels 11 labeled 544 and one of its normal output channels 11 labeled 546 to communicate with the Duplexer. Likewise Unit computer B has its normal input channel 11 labeled 548 and its normal output channel 11 labeled 550 connected to communicate with the Duplexer. Associated with the Magnetic Tape Control Unit is magnetic tape unit number 1 labeled 552 and magnetic tape unit number 2 labeled 554. These tape units communicate with the Magnetic Tape Control Unit by way of cables 556 and 558 respectively.

As was described above in summary form, the concept of duplexing is utilized such that selected peripheral equipments may be time-shared between two Unit computers. It is recognized that only one Unit computer may communicate with a magnetic tape unit at any given time. Before either computer may reference a selected magnetic tape unit with a particular command, it must first gain control of the magnetic tape system. It is the function of the Duplexer 538 to grant or refuse control to a requesting Unit computer. A computer request for control will be granted when the magnetic tape system is not being controlled by either computer.

The Magnetic Tape Control Unit 536 determines which operation, other than <u>control</u> of the magnetic tape units, is commanded by a Unit computer. It initiates the necessary actions to perform the requested operation. The Magnetic Tape Control Unit communicates with one of the Unit computers by way of the Duplexer 538, and with the selected tape transports by way of the interconnecting cables 556, 558. The Unit computer in control indicates which operation it desires of the tape transport by an appropriate code in the 30-bit External Function Word. The Magnetic Tape Control Unit operates to transmit data to, or receive data from both the computer in control, and the tape transport units. An additional function of the Magnetic Tape Control Unit 536 is in performing the assembly and disassembly of computer words. Upon completion of any magnetic tape function with the exception of master clear, the Magnetic Tape Control Unit transmits an Interrupt to the Unit computer by way of the normal interrupt line. It also places a status word on the 30 data lines of the input cable to the computer in control. The Interrupt informs the computer that the last requested External Function has been completed. The status word indicates successful or unsuccessful completion of the External Function.

Standard commands recognizable by the magnetic tape system consist of write, read, and rewind with variations as to direction, format, and selection of magnetic tape unit. The Duplexer 538 section of the Magnetic Tape Control Unit 536 is responsible for execution of all control functions. The Magnetic Tape Control Unit section is responsible for execution of all other operational functions. The following Table J–III provides a listing of the bit positioning and coding which is utilized in the External Function Word to indicate desired functions.

TABLE J–III

| Bit Position | Meaning |
|---|---|
| 0 | Request Control |
| 1 | Release Remote |
| 2 | Release Local |
| 3 | Master Clear |
| 4 | Read |
| 5 | Write |
| 6 | Rewind |
| 7 | Rewind with Lock-Out |
| 8 | Direction Forward |
| 9 | Direction Reserve |
| 10 | Format 1 |
| 11 | Format 2 |
| 12 | Magnetic Tape Unit No. 1 |
| 13 | Magnetic Tape Unit No. 2 |

(J–*g*) *Two computer data flow*

FIG. 23 is a block diagram of a two-computer site, and shows a sample configuration of some of the operable peripheral equipments. Unit computer A is labeled 560 and Unit computer B is labeled 562. As in previous discussions, the numbers in the Input and Output sections of the respective Unit computers refer to the channels with which the data flow lines are associated. The Site Surveillance Console 564 is shown connected to the input channels 5 labeled 566 of Unit computer A, and input channel 5 labeled 568 of Unit computer B. The input to the Site Surveillance Console from Unit computer A is also on channel 5 labeled 570, and the input from Unit computer B is on normal output channel 5 labeled 572. The operation of the Site Surveillance Console is in the same manner as was described in Section I of this specification.

The Magnetic Tape Control Unit 574 is shown connected only to Unit computer A. Input signals are received on normal output channel 11 labeled 576, and inputs from the magnetic tape units to Unit computer A are by way of normal input channel 11 labeled 578. It will be noted that this configuration does not illustrate the duplex mode of operation described above, but that by connection of the input and output channels of Unit computer B which are assigned from magnetic tape operation to the appropriate duplex portion of the Magnetic Tape Control Unit 574 it would result in a time-sharing capability for this site. The Magnetic Tape Control Unit 574 is connected to magnetic tape unit number 1 labeled 580 and to magnetic tape unit number 2 labeled 582. The operation of these magnetic tape units in conjunction with the Magnetic Tape Control Unit is similar to that described above.

Also associated with Unit Computer A is the Communications Control Unit 584. The communications system consists basically of two types of digital transmission carriers. The Telephone Carrier 586 operates to carry digital information directly to the interconnected computers which comprise the remainder of the system. This is performed in a manner which is not part of the inventive concept and is well known in the art. The other portion of the communications system consists of two Radio Carriers 588. One of these radio communications system consists of long range high frequency parallel transmission equipment. When operating with this first type of radio carrier, the Communications Control Unit 584 receives 30 parallel bits of binary information on the assigned output channel 590 from the Unit computer. The Communications Control Unit then operates to send this data in parallel transmission over the Radio Carrier over cable 592. When the communications system is receiving in this first radio mode of operation, inputs are fed from the Radio Carriers over cable 594 to the Communications Control Unit where it is appropriately interpreted and issued as inputs on the assigned input channel 596 to Unit computer A.

The second type of radio carrier associated with the communications system consists of a short-range, ultrahigh frequency serial transmission radio equipment. In this mode of communication, Unit computer A will transmit 30 parallel bits of information over assigned channel 590 to the Communications Control Unit 584. The Communications Control Unit then operates to send serially the 30 bits of information to the radio transmitter. When the site of reference is in the receive mode information is received serially by the radio equipment and transmitted over cable 594 to the Communications Control Unit 584, where it is assembled into 30-bit words. When the appropriate time arises, the received data words are transmitted over assigned channel 596 as an input to Unit computer A.

It will be noted that for all modes of communications the discussion has been with reference to a 30-bit data word. This particular size data word is with reference to this configuration of the associated computer and the inventive concept is not intended to be thereby limited.

One of the primary functions of the Communications Control Unit 584 is to perform low-level repetitive calculations with respect to the transmitted and received data. These clerical functions consist of separating the transmitted control messages, the transmitted data messages and receive noise signals, and forming the data signals into the appropriate formats for handling either by the Unit computer or by the communications equipment. The higher-level manipulation of the transferred data such as higher-ordered error checking is performed internally to the Unit computer controlling the Communications Control Unit.

The Teletype Unit 598 is associated with Unit computer A by way of normal output channel 12 labeled 600 and with Unit computer B by way of normal input channel 12 labeled 602. This equipment is capable of providing permanent printed copy of Unit computer data exchanges. The Teletype Unit is utilized to prepare typed copy of data as received or transmitted and in addition, prepare a punched 5-level chad tape in the standard Teletype code. Information transmitted from the Unit computer to the Teletype Unit consists of either control information or data. Control information is transmitted from the Unit computer as an External Function Word. Data transfer to Unit computer B is accomplished by use of an output buffer, while output from Unit computer A is accomplished by the use of an input buffer. Information transmitter from the Teletype Unit to Unit computer B consists of interrupts and data. Information may be transmitted into the Unit computer B either after having been received from Unit computer A, or as it is typed manually into the operator's keyboard.

Associated with Unit computer B is a Paper Tape Reader 604 which communicates with the Unit computer over one of the normal input channels 4 labeled 606. Also associated with Unit computer B is a Paper Tape Punch 608 which receives inputs from the Unit computer over normal output channel 4 labeled 610. The Paper Tape Punch 608 utilizes only 10 of the allowable 30 data signal lines thereby leaving 20 spares, while the Paper Tape Reader 604 utilizes only 7 of the input lines leaving 23 spares. In a normal two- or three-computer site, the Paper Tape Reader 604 and the Paper Tape Punch 608 are shared between all of the computers. This is accomplished by providing a manual switch at the Cable Interconnection panel to determine to which Unit computer the particular Paper Tape Reader or Paper Tape Punch will be associated. Both the Paper Tape Reader 604 and the Paper Tape Punch 608 are of a type well known in the art. Their utilization is primarily for off-line use. The Paper Tape Reader may also be used for emergency loading of programs in the event that the back-up magnetic tape units should become inoperative. Due to their rather slow speeds, however, they are not normally used during the on-line operation of the data processing system.

The Keyboard Control Unit 612 is of the type described above. The duplexer section receives inputs on normal output channel 2 labeled 614 from Unit computer A, and on normal output channel 2 labeled 616 from Unit computer B. The Keyboard Control Unit 612 provides inputs to Unit computer A on normal input channel 2 labeled 618, and to Unit computer B on normal input channel 2 labeled 620. The Keyboard Control Unit is illustrated as being connected to a Keyboard Input 622 which provides data signals on cable 624. The Keyboard Input consists of a standard keyset and is of a type well known in the art. Also connected to the Keyboard Control Unit 612 is Controlled Process I labeled 626. As was described in the previous discussion of the Keyboard Control Unit, this would be a process of the type which supplies intermittent inputs, which would be applied on cable 628 to be thereby entered as an input into the Unit computer which has control. Such a process would be one which has a relatively long period between required surveillance periods when compared to the operative speed of the Unit computer. Control signals are issued to Controlled Process I over normal output channel such as 7 labeled 630. The arrangement is such that either Unit computer A or Unit computer B, depending upon the Executive Routines within each of the computers, can interrogate Controlled Process I by gaining control of the Keyboard Control Unit 612. Also, associated with Unit computer B is Controlled Process II labeled 632. This process receives inputs from normal output channel 6 labeled 634 and provides input signals on normal input channel 6 labeled 636. This process is operative only with Unit computer B since it is not operated through the duplexed Keyboard Control Unit. Also associated with Unit computer B is Controlled Process III labeled 638. This process receives control information over normal output channel 10 labeled 640, and provides indications of the status of the process over normal input channel 10 labeled 642. It will be noted that only three Controlled Processes are illustrated in this configuration, but it will be recalled that it has been explained that the Keyboard Control Unit 612 may operate to utilize one of the normal input channels to monitor several processes, and that there may be as many directly controlled processes as there are available input and output channels. It will be noted further, that computer time permitting, the Unit computer A can also be utilized to directly control processes while maintaining the communications load. The nature of the Controlled Processes will be varied, so detailed description of each will not be made.

The inter-computer data transmission paths are maintained such that the output from Unit computer A is on normal channel 0 labeled 644 is applied directly as an input to normal input channel 0 of Unit computer B. Likewise, the normal output channel 1 labeled 646 is applied to normal input channel 1 of Unit computer A.

*(J–h) Three-computer data flow*

FIG. 24 is a block diagram of a 3-computer site, and illustrates a possible equipment configuration with the associated data flow indicated. While there are similarities in this configuration to that described for a two-computer site, there are enough differences to warrant using different reference numbers for the various components rather than trying to correlate the three-computer site to the two-computer site.

In this configuration Unit computer A labeled 648 is connected to the Magnetic Control Unit 650 by way of normal output channel 11 labeled 652 and normal input channel 11 labeled 654. The Magnetic Tape Control Unit is utilized to control magnetic tape unit number 1 labeled 656 and magnetic tape unit number 2 labeled 658 in a manner as has been previously described.

Unit computer A is also associated with the Communications Control Unit 660. This arrangement allows communications with the remainder of the system by way of the Telephone Carrier 662 or the Radio Carriers 664 in a manner similar to that described above. Data is transmitted from Unit computer A over the appropriate normal output channel 666, and received data is transmitted into Unit computer A over the appropriate input channel 668. Unit computer A has a direct data transfer channel over normal output channel 1 labeled 670 which is connected to the normal input channel 1 of Unit computer B labeled 672. Likewise, Unit computer A has a direct receiving data transfer path from Unit computer B over normal input channel 0 labeled 674 which is attached to Unit computer B's normal output channel 0. Unit computer A also has a direct data transfer link with Unit computer C labeled 676 over normal output channel 0 labeled 678, which is connected directly to normal input channel 0 of Unit computer C. Unit computer A also has a direct data transfer input from Unit computer C which connects the normal output channel 1 labeled 680 of Unit computer C to the normal input channel 1 of Unit computer A.

Unit computer A also has an input to the Site Surveillance Console 682 by way of normal output channel 5 labeled 684, and receives control signals from the Site Surveillance Console by way of normal input channel 5 labeled 686. Unit computer B is associated with the Site Surveillance Console and receives inputs on normal input channel 5 labeled 687, while providing output information to the Site Surveillance Console over normal output channel 5 labeled 688. Unit computer C is also associated with the Site Surveillance Console, and receives inputs over normal input channel 5 labeled 690, while providing output information over normal output channel 5 labeled 692. The operation of the Site Surveillance Console 682 is the same as that described above, and for further reference see Section I of this specification.

Unit computer B has a direct transmission path with respect to Unit computer C by way of normal output channel 1 labeled 694, which is connected to normal input channel 1 of Unit computer C. Unit computer B also receives information transfers directly from Unit computer C on normal input channel 0 labeled 696, which is connected to normal output channel 0 of Unit computer C.

Unit computer B is associated with the Keyboard Control Unit 698, and supplies output control signals on normal output channel 2 labeled 700. Unit computer B receives data from the Keyboard Control Unit 698 over normal input channel 2 labeled 702. The Keyboard Control Unit 698 is herein illustrated as operating in the duplex mode in conjunction with Unit computer C. Unit computer C supplies output data to the Keyboard Control Unit over normal output channel 2 labeled 704 and receives input data over normal input channel 2 labeled 706. From this it can be seen that the status of the Controlled Process I labeled 708 may be interrogated either by Unit computer B or Unit computer C, while the control of the process is delegated to Unit computer B by way of normal output channel 7 labeled 710. Also, the Keyboard Input 712 may be associated with either Unit computer B or Unit computer C. Controlled Process II labeled 714 receives control words over normal output channel 6 labeled 716 of Unit computer B, and transmits the status of the process over normal input channel 6 labeled 718 of Unit computer B. Controlled Process III labeled 720 receives its control over normal output channel 10 labeled 722 of Unit computer B, while providing inputs as to the status of Controlled Process III to Unit computer B over normal input channel 10 labeled 724. Again, it will be noted that only two processes are shown being in direct control of Unit computer B, but this is illustrative only and not limitive on the inventive concept.

Unit computer B receives input information from the Teletype Input 726 over normal input channel 12 labeled 728. Also, associated with the Teletype Unit is Unit computer C by way of normal output channel 12 labeled 730. The operation of this Teletype Unit is the same as described above.

Unit computer C also has a Paper Tape Reader 732 and a Paper Tape Punch 734 shown in conjunction with its operation. It will be recalled in the discussion as presented above that the Paper Tape Reader and the Paper Tape Punch is equipped with a manually selective switch such that they may be associated with any of the Unit computers at a particular site. This alleviates the necessity of providing logical switching through hardware components, or the necessity of providing separate Paper Tape Readers and Punches for each of the Unit computers. The Paper Tape Reader 732 provides its input to Unit computer C on normal input channel 4 labeled 736 and the Paper Tape Punch receives its input signals on normal output channel 4 labeled 738. It will be recalled that only 7 of the allowable 30 lines of the normal channel are utilized for the Paper Tape Reader and the Paper Tape Punch.

Unit computer C is shown to be controlling the operation of Controlled Process IV labeled 740, which receives its control signals on normal output channel 6 labeled 742. It supplies input signals as to the status of the Controlled Process over normal input channel 6 labeled 744.

This configuration is presented to illustrate the situation where the capacity of a single Unit computer such as B is insufficient to handle the magnitude or the complexity of the processes to be controlled, thereby requiring the addition of another Unit computer, such as C.

(J–*i*) *Cable Interconnection Panel*

The Cable Interconnection Panel (not illustrated) provides a convenient easily accessible means for manually switching certain peripheral equipment from one computer to another. The Cable Interconnection Panel allows complex equipment arrangements and interconnections to be efficiently realigned to meet changing process and data reduction requirements.

With the exception of the magnetic tape units, all equipments cabled through the interconnection panel are nonduplexed equipments. It will be recalled that duplexed refers to equipment connected to two computers and operated by both on a time-sharing basis. In a three-computer site it is desirable to have the magnetic tape units available to any two of three computers, therefore, they are connected through the switching facilities of the Cable Interconnection Panels. Each Cable Interconnection Panel is constructed in modular form and consists of a grouping of identical 68-pole, double throw, individually operated switches. There are two switches associated with each switching operation for a given peripheral device. One switch is associated to realign input channel connections, while the other is utilized to realign output channel connections. This means that at given change of equipment configuration both switches must be set to provide equipment input and output connections to the selected computer.

Peripheral equipment connectors are grouped together, appropriately labeled, and considered semipermanent connections. Any change in normal cable connections should be accomplished with the computer cable connections rather than the equipment cable connections. To provide the necessary facilities for peripheral equipment switching, a two-computer site requires one Cable Interconnection Panel, while a three-computer installation requires two Cable Interconnection Panels. Each panel provides the facility such that five units of peripheral equipment may be switched from one Unit computer to another. The Paper Tape Reader, the Paper Tape Punch, and the Teletype Unit are basic input and output devices. For this reason, they are treated as site-oriented peripheral equipment and are made available to each computer through the Interconnection Panel as was described above.

SECTION K.—MULTI-COMPUTER PROGRAMMED CONTROL

The Data Processing System operates primarily in a real-time mode. This means, the time delay between input and output for a given function is negligible in relation to the time scale of the functions involved. It is the operational requirements of the equipment in the system which dictate the response times for individual system functions. To relate a real-time system to a real-time data processing, it can be said that real-time data processing is that done immediately in response to an input for the purpose of providing an essentially instantaneous output. Processing must be done at a rate which is greater than the input data rate, or else the processing will fall behind and eventually the system will be operating out of real-time. The system saturation point is reached when the processing rate actually equals the input rate.

From the foregoing it is clear that the real-time data processing system must have at least a data processing capability sufficient to handle the average input rate from all input functions. Moreover, since system inputs will occur randomly, it must be assumed that all inputs could occur simultaneously, thereby representing the peak load. The primary system function exists in the scheduling (queuing) of these tasks. The functions to be performed in such a way that under peak load conditions all functions are performed and satisfied within the real-time requirements. To fully utilize the inventive concept of the data processing system herein disclosed in solving any particular system tasks, it is necessary to break the system tasks down in order of overall system priority and distribute the tasks among the various system computers. It then becomes the function of the individual sites to proceed in the solution of these tasks independently, under the control of an Executive Routine within each of the Unit computers.

(K–*a*) *Multi-computer system philosophy*

Each installation-oriented task is performed by one or more Unit computer routines called "subprograms." By definition, a subprogram is any routine of Unit computer instructions referenced directly by the Executive Routine. At least one Executive Routine is contained within each Unit computer of a multi-computer complex, and maintains complete automatic control of the operational program within the computer. No overall control of a multi-computer program is employed. Instead, each Unit computer controls the execution of its assigned tasks. It will be noted that any number of these tasks may be concerned, either by way of requiring data for computation or supplying data for computation, with inter-computer data transfers.

Since not all tasks associated with any particular site are of equal importance to the overall system operation, it is desirable to assign priorities to the respective tasks. This allows the subprograms within each Unit computer to be considered for execution on the basis of the priority of the task with which they are related. Priority of subprograms for any given site is relative, and is determined in the following manner: If the tasks corresponding to subprogram D and E have response requirements of 100 milliseconds and 1 second respectively, then subprogram D would have a higher site priority than would subprogram E. Normally, installation tasks associated with inputs and outputs, where stringent timing requirements are imposed by external equipment, have highest priority. Then process control tasks, data processing tasks, and installation tasks associated with output to the system follow in that order. Each Unit computer also contains a subprogram of lowest priority to perform such operations as program checking and equipment evaluation when no other site tasks require execution.

Considering a listing of subprograms within a Unit computer listed in order by priority, the Executive Routine will dictate that this list be scanned sequentially, executing subprograms when they are needed. After each subprogram execution, the scanning process is resumed starting with the highest priority entry. Under a peak load condition where all subprograms may require execution, the top priority subprogram will be executed instantaneously, the next highest immediately following, and so on through the listing. The resultant response time of each subprogram under these circumstances will be the sum of the previous execution times for all higher ordered priority subprograms, recognizing that some of the higher priority subprograms may be executed more than once. It must be assumed that when the tasks are assigned to each Unit computer, there has been adequate consideration of the problem such that sufficient computational capability exists to perform all assigned tasks. If this should not be the case, penetration of the list will not be realized. The only solution to this situation is the addition of another Unit computer to share the computational load. If computational capability is sufficient to handle the average input rate for all functions, then under peak load conditions the higher priority tasks are performed first and the lower priority tasks are delayed until such time as computer-time availability exists. This results in a definition that a lower priority task is one which does not have a critical response time, and its late execution will not seriously degrade the overall system operation. An example of such a task might be the output on the monitoring typewriter of summary data of interest to the operator at the particular site. While such an operation would normally flow in normal sequence, at peak load periods it may be delayed a matter of seconds to allow the completion of additional higher priority operations.

(K–*b*) *Assignment and distribution of tasks between computers*

The Data Processing System approach to the solution of wide-spread system problems recognizes the need for varying computer capacity among the various sites. The adoption of a standard Unit computer, designed with inter-computer data transfers in mind, creates the need for multi-computer programs to control the operation of each site while operating to solve the problem of transferring data between sites. In a two-computer site, the Unit computer which communicates with the remainder of the system and acts as a data buffer may be termed a System computer, while the computer which is utilized to operate as the process controller and to reduce the data may be termed the User computer. In a three-computer complex the computer which is utilized to communicate with the remainder of the system may properly be termed a system-oriented computer while the two Unit computers utilized to control the respective processes and to act as data transmittal vehicles may properly be termed User computers. In all cases, equipments associated with specific tasks are connected to the appropriate computer which is to perform that task. Likewise, the subprograms which are associated with the particular tasks are located within the computer assigned to handle the tasks. The only exception to this distribution of the subprograms exists with respect to the subprograms necessary for inter-computer data transfers. This class of subprograms exists in each of the Unit computers.

With respect to the assignment of the respective tasks, it will be noted that most tasks having a critical response time are assigned to the Unit computer which is in communication with the remainder of the system. This automatically follows from the fact that the communication with the system is under very rigid timing restrictions as was described above, and the allowable time between references to the Executive Routine is very small; e.g., on the order of 10 milliseconds. This situation can be distinguished from the tasks which are assigned to the process control computers wherein the tasks normally do not have critical response times. In the event that critical response times do occur they are processed by Interrupt routines and rigid timing restrictions are not necessary. Since many of the subprograms corresponding to the User tasks are long and time consuming, to impose stringent timing restrictions in the order of 10 milliseconds would reduce overall system efficiency.

The primary differences with respect to the task assignment between three-computer and two-computer complexes exist in the capacity and the degree of sophistication of the processes to be controlled, with the three-computer site obviously having the higher capacity. With respect to the system tasks, such as communication, there is very little difference between the load assigned at a three-computer site to that of a two-computer site. At this point it should be again noted that the inventive concept does not limit the equipment at each site to two- or three-Unit computers but instead, may operate with only a single Unit computer or with more than three. It follows, however, that there is no task distribution problem in a one-computer site, since all of the computation and system communication is carried on in the single unit. This does not mean that many multi-computer programming techniques are not used. On the contrary, it is expedient to utilize subprograms developed for the multi-computer sites in the solution of the problems at a single computer site. This may be accomplished by utilizing the data manipulation techniques and the buffer handling techniques in a slightly modified manner, while utilizing the same basic program structures that exist in the multi-computer operation.

(K–*c*) *Executive Routine Control-Tables*

FIG. 25*a* illustrates an example of the Subprogram Entrance Address Table 750. This table consists of a predetermined number of memory address registers, which exist in the main memory of the Unit computer, and for this embodiment are located at sequential addresses. As specified, A is used to denote the initial memory address of the Subprogram Entrance Address Table. The letter X is utilized to denote the maximum number of subprograms which may be associated with the particular Executive Routine. This means that $A+X$ yields the upper limit address of the Subprogram Entrance Address Table. The individual letters listed within the blocks representing the memory addresses of the Subprogram Entrance Address Tables are utilized to denote memory register addresses which are the entrance addresses for the various subprograms. As an illustration, by referring to address A in the Subprogram Entrance Address Table, it will be seen that the letter D is therein stored. This indicates that the subprogram which starts at memory address D is therein referenced. It can be said, then, that each of the memory registers in the Subprogram Entrance Address Table stores a subprogram starting address.

FIG. 25*b* illustrates an Example Priority Time Table 752. This table also consists of a predetermined number of memory registers which exist in the memory section of a Unit computer. The letter B is utilized to indicate the starting address of the Priority Time Table. It will be noted that this table corresponds exactly in length to that of the Subprogram Entrance Address Table described above. The function of the Priority Time Table 752 is to indicate at what intervals the corresponding subprograms are to be executed, thereby determining the automatic delay between executions of periodic subprograms. It will be noted that there are periodic and non-periodic time indications. Examples of the periodic subprograms exist at address $B+3$ which corresponds to subprogram G, as denoted in the Subprogram Entrance Address Table at address $A+3$. Another periodic subprogram will be found at address $B+5$ wherein a one second periodic reoccurrence is shown, and corresponds to subprogram H, as indicated at address $A+5$. Yet another periodic subprogram may be found at address $B+7$ wherein it is indicated that a 50 millisecond periodic program is to be executed, and by reference to the Subprogram Entrance Address Table at address $A+7$, it will be found that this refers to subprogram I. The one minute periodic subprogram indicated at address $B+14$ will be found to be subprogram M by reference to address $A+14$. Finally, by reference to address $B+X$, there will be found a 30 second periodic subprogram, and by reference to address $A+X$ it can be determined that the entrance address designated is for subprogram N. It will be noted that the remainder of the addresses specified in the priority time table contain times of 24 hours. This is a very large delay with respect to the overall operational time of the computer, and insures that the corresponding flag will be cleared automatically after the first reference of the corresponding subprogram. This will be explained in more detail in following subsections.

FIG. 25*c* illustrates an example of the Subprogram Flag Table 754. The letter C is utilized to indicate the initial address of the Subprogram Flag Table. This table is of the same length as the Subprogram Entrance Address Table 750 and the Priority Time Table 752. The Subprogram Flag Table also consists of sequentially addressed memory address registers which reside in the main memory section of the Unit computer. It is the function of the Subprogram Flag Table to store selectively designated flag indicators which will determine when it is desirable to require the execution of specified subprograms. The operation of this table in conjunction with the Executive Routine will be more fully explained and more clearly understood by reference to the description in the following subsection.

(K–*d*) *Executive Routine operation*

Executive Routine control is accomplished by searching the Subprogram Flag Table 754, which is ordered by priority of subprograms, for flags that are set, starting at the task of top priority. A subprogram is to be executed only when its flag is set. By definition, a flag consists of, and is set, when the time at which the task is scheduled to be executed is equal to, or less than, the real-time value exhibited by the real-time clock. It is the function of the Executive Routine to determine when a flag is set by comparing the current time against the time specified for execution as stored in the Subprogram Flag Table for each entry. Comparison between the value of the real-time clock and the value stored in the referenced memory register within the Subprogram Flag Table is made by the Executive Routine, and when the requisite conditions are met, it is determined that a subprogram is to be executed. This situation of comparison resulting in the execution of a subprogram is termed a "hit." On a hit, the Executive Routine adds the corresponding time increment in the Priority Time Table 752 to the current time as designated by the real-time clock, and stores the sum in the corresponding address in the Subprogram Flag Table 754. It is then only necessary to reference the corresponding address in the Subprogram Entrance Address Table 750 for the starting address of the subprogram which is to be executed, and transfer the control of operation to that subprogram. When control is returned to the Executive Routine by the completed subprogram, or if no hit occurs during the scan of the Subprogram Flag Table 754, the search of the Subprogram Flag Table is repeated starting from the highest priority. This means, that penetration toward the lower priorities of the subprogram flag table 754 for any given cycle will vary with the load. The Executive Routine is designed such that when two or more tasks require execution at the same time, the higher priority task is performed first. This means, that under heavy load conditions, lower priority tasks are delayed until time is available for their execution.

FIG. 26 is a logical flow diagram illustrating the operation of an Executive Routine. It will be noted that references in FIG. 26 refer to the tables illustrated as: Example Subprogram Entrance Address Table, FIG. 25*a*; the Example Priority Time Table, FIG. 25*b*; and the Example Subprogram Flag Table, FIG. 25*c*.

At the Start 756, it is necessary to initialize the Subprogram Flag Table 754. This operation is illustrated in block 758 and consists of transmitting the entire contents of the Priority Time Table 752 to the corresponding addresses in the Subprogram Flag Table 754. From this it will be seen that the Priority Time Table 752 is unaltered by the operation of the Executive Routine, and is maintained as an existing record of the relative priorities and periodicity of the respective subprograms. Once this transfer has been completed, it is necessary to clear the real-time clock 760. This is done to put the real-time clock in a known condition such that the subsequent operation will be appropriately timed. It will be noted that it is allowable at some later time for the real-time clock to be synchronized with the real-time clock of a master control computer, as previously described.

These two steps 758 and 760 comprise the only initialization that is necessary at the outset, and once it is done need not be redone until the site operation has been terminated and it is desired to start it up again. Having initialized the proper control registers (the tables and the real-time clock), it is necessary to initialize the program such that the first address of the Subprogram Flag Table 754 is made available. This is illustrated in block 762 by the step designating that the initial address C is to be stored at temporary address P, thereby leaving the contents of P final equal to C. Having set this initial condition, it is now time to examine the value of the real-time clock ($t$) 764. This allows the program to compare the value of the real-time clock to the time specified for the corresponding subprogram at the address in the Subprogram Flag Table 754. The step that indicates this comparison 766 must answer the question—"Is it time to execute subprogram specified at $C+i$?." To answer this question it compares the value of the real-time clock to determine whether it is equal to, or greater than, the time specified at address $C+i$. In this context $i$ may be of the value 0 through X and indicates the scanning modification of the initial address C. The first time through the table and real-time clock will be compared to address C. In the event that the condition is not met that subprogram D should be executed at this time, the "No" path 768 will be taken. This indicates that no subprogram is to be executed at this time and that it is necessary to test to determine whether or not the entire Subprogram Flag Table 754 has been scanned. This step is indicated by decision element 770. It will be recalled that initially address C was stored at address P, so at this time the contents of address P is compared for equality to the predetermined value $C+X$. In the event that equality is found, or the threshold is exceeded, it is known that the entire Flag Table has been scanned and the "Yes" alternative 772 will be taken. In this event the Executive Routine determines that it must start to rescan the Subprogram Flag Table 754 from the highest priority item. This means reinitializing the starting address, so the program proceeds to block 762. In the event that there is no equality between the value stored at address P and the value $C+X$, the "No" path will be taken 774. The latter alternative results in a situation that the Subprogram Flag Table address to be scanned next must be calculated 776. To make this calculation it is necessary only that the present contents of address P be advanced by one and restored to address P. Having done this, the program path 778 references the decision element 766 which again tests to determine whether or not it is time to execute the subprogram specified at $C+i$.

Having now made one path through the scan sequence, it will be noted that the contents of memory address P will now be $C+1$. Therefore, by referencing the P memory address it can be determined that it is time to compare the value of the real-time clock to the $C+1$ memory address register in the Subprogram Flag Table 754. Considering now that the condition is met such that subprogram E is to be executed, as indicated by Subprogram Entrance Address Table 750, the "Yes" program path 780 will be taken. For this alternative it is necessary to advance the Subprogram Flag Table entry corresponding to the selected subprogram (contents of address $C+1$), as indicated by block 782. This is accomplished by adding the value of the real-time clock to the value of the Priority Time Table which is stored in the address corresponding to the subprogram which has met the hit condition, and transmitting the sum to the corresponding address in the Subprogram Flag Table 754. Having done this, the Executive Routine is now in a condition to extract the initial address of the hit subprogram from the Subprogram Entrance Address Table 750. This may be done by well known address correlation techniques, wherein the hit address in one table may be translated into a corresponding address in a second table by utilizing the known starting addresses of each table. After having extracted this address, control is transferred to the subprogram to be executed, which then operates to perform its specified function. This step is illustrated by subroutine block 784. Upon completion of the hit subroutine, the control is returned to the Executive Routine, which follows logical path 786 to return to the logical function which again initializes the address of the Subprogram Flag Table to start scanning at the highest priority. It will be noted also, that when the entire Subprogram Flag Table 754 has been scanned, as indicated by decision element 770, the program logic also returns to the instructions which initialize the address of the Subprogram Flag Table to the highest priority, as designated by box 762.

The detail Unit computer programming is not set forth for the Executive Routine, since the inventive concept lies in the method of controlling the computer operation rather than in the detail organization of the specific instructions. For similar reasons, the detail addressing for the tables associated with the Executive Routine is made of a general nature in letter-form rather than indicating specific table sizes or specific table addresses. Given the instruction repertoire of the Unit computer, or any other general purpose computer of similar versatility, one skilled in the art could provide the detailed instruction coding which would conform to the requirements of the invention herein illustrated.

It should also be noted at this point, that the general purpose Unit computer utilizing a form of control such as the Executive Routine could be provided for by another machine having general purpose characteristics, but with the executive control being made a part of the hardware rather than provided for by programmed control.

(K–*e*) *Variable priorities for optimum time usage*

Referring again to FIG. 25*a*, consider the subprogram corresponding to task D shown at Subprogram Entrance Address Table address A. From its listing in the first position in the table, it is determined, that subprogram D is of the highest priority and will be executed upon demand. It will be recalled that the maximum response time tolerable for this subprogram is 100 milliseconds, as was described earlier in this section. This means that a response from subprogram D would be acceptable as late as 100-milliseconds after the original demand without degrading the system operation. In the event that the present computer load is quite high, it would be desirable to defer execution of subprogram D for a predetermined period of time such as 50 to 75 milliseconds. This may be accomplished in the same priority list described earlier by including the time element in the ordering of the subprograms. Examination of Subprogram Entrance Address Table 750 will show that subprogram D is referenced three times; at address A at, address $A+4$, and at address $A+13$. The corresponding multiple entries for subprogram D can be made in the Priority Time Table 752 as follows:

(1) An entry is made as a low priority item for execution immediately. This would occur at address $B+13$.

(2) An entry is made as an intermediate priority item to be executed for example, in 50 milliseconds. This entry would be made in the Priority Time Table at address $B+4$.

(3) An entry is made as a top priority item to be executed after 75 milliseconds, for example, have elapsed. This entry would be made in the Priority Time Table in address B.

This arrangement results in a mode of operation such that after a processing demand has been received for the execution of subprogram D, it will be executed in the following manner:

(1) Immediately out of the low priority entry, if the overall computer load is low;

(2) Out of the intermediate priority entry after 50 milliseconds have elapsed, if the computer load is moderate; and (3) Out of the top priority entry after 75 milliseconds have elapsed when the computer is under a condition of peak load.

This assures that under all load conditions subprogram D will be performed within the required response interval. This procedure of assigning various priorities to the respective subprograms will result in automatic smoothing of the process load, and will still allow execution of each subprogram in the absolute minimum time which is consistent with the combination of system priority and the existing computational load requirements.

(K–*f*) *Methods of flag determination*

Four basic methods are utilized to set the flags as they appear in the Subprogram Flag Table 754. Each subprogram associated with a particular Executive Routine normally utilizes but one of these mechanisms.

One of the primary methods of determining the flag condition in the Subprogram Flag Table 754 consists of utilizing External Interrupts or Internal Buffer Monitor Interrupts to set the flags of programs associated with the servicing of external equipments. An example of such a situation may be found in the task of transmitting data over the inter-site communications link. The Communications Control Unit (see FIGS. 23 and 24) will send an External Interrupt to the computer thereby signaling the start of a transmission period. The Unit computer must at that time have data to be transmitted available for transfer to the communications equipment within a certain time period. If the communications link is not operating, there is no need to execute the communications transmit subprogram. This means that the condition of the operative system concerning the communications equipment for this example will determine the status of the flag to be entered, if any, in the Subprogram Flag Table 754.

The Executive Routine (see FIG. 26) provides another method whereby flags may be set. It operates to reschedule the time when the next flag for the subprogram being considered will be automatically set. The technique illustrated in the Executive Routine allows for tasks that must be executed at approximate periodic rates to be so entered in the Subprogram Flag Table. This is illustrated at block 782 wherein it is shown that the contents of the real-time clock is added to the increment stored in the Priority Time Table 752, thereby always keeping the subprogram of reference within its periodic requirements. It will be noted that this action by the Executive Routine is automatic for all subprograms, whereby even the non-periodic subprograms are rescheduled to a time in the future which is greater than the programmed real-time modulus of the system. In the example given 24 hours is chosen to exceed the real-time modulus of the system thereby insuring that the subprograms so referenced will occur only on demand. This means that the non-periodic subprograms will be processed only in response to a specific interrupt signals as received by the Unit computer.

The situation may occur where one subprogram is of a nature such that it will set, or partially set, the flag of another subprogram which is to be executed only after completion of a previous task. An example of this in the non-periodic subprograms of process control, would be the situation wherein, for example, the automatic process of packaging refined petroleum products would occur only upon completion of the process of refining. Since this would be of a non-periodic nature, it is expedient to set the packaging subprogram flag when it is determined within the subprogram which controls the process of refining that it has reached a point of substantial completion. Many other examples of process control come readily to mind wherein a non-periodic occurrence is utilized to trigger a process which must follow in sequence.

Finally, a particular subprogram may reset its own flag, if during this operation, it determines that more than its allowable amount of processing time will be required to complete the task. This method of setting flags in the Subprogram Flag Table 754 is utilized only by the lower priority subprograms, and is designed to guarantee that the system meet the more stringent response time requirements of the higher priority subprograms. The operation is such that when the Executive Routine again considers a task of this nature for execution on the basis of penetration of the priority list, control will be returned to the specified subprogram to enable further processing. This cycle may continue as many times as may be required to complete the task.

(K–*g*) *Subprogram operation*

FIG. 27 illustrates the basic subprograms required for the operation of the System Computer (Unit computer A, as illustrated in FIG. 23), while FIG. 28 illustrates the basic subprograms required for the operation of User computer (Unit computer B, as illustrated in FIG. 23). These two sets of subprograms will be considered together to facilitate description of the subprograms that are common to the two computers. It should be noted at this time that this illustration of subprograms is illustrative only and will vary depending upon the nature of the system of which the site is a part and the tasks assigned. The Executive Routine of System Computer labeled 800, and the Executive Routine of the User computer labeled 802, are identical and are of the type described in Subsection K–*d* above. Each is operative within its associated Unit computer to control the operation of the various subprograms as dictated by their respective Subroutine Flag Tables, as illustrated in FIG. 25*c*. It will be seen that some of the subprograms are periodic in nature, while others occur randomly upon demand. It should also be noted that even though identical subprograms may exist in several Unit computers, that their respective assigned priorities may very well be different.

The Keyboard Control Unit is responsible for multiplexing the input signals of selected low speed input devices on a single Unit computer channel. The subprogram Interrogate Keyboard Control Unit 804 is responsible for initiation of the interrogation of said low speed devices, such as the Keyboard input. The arrangement is such that the Interrogate Keyboard Control Unit subprogram is operated periodically by the Executive Routine. The period is arbitrarily set at 60 milliseconds to provide sufficiently frequent sampling to obtain reasonable results for the connected equipments. This means that in the Priority Time Table 752, a factor of 60 milliseconds would be entered corresponding to the address which refers to the Interrogate Keyboard Control Unit subprogram. The initial address of this subprogram would be stored in the corresponding address in the Subprogram Entrance Address Table 750.

It will be noted that this subprogram appears in both Unit computer A and Unit computer B. This is as a result of the duplexing of the Keyboard Control Unit labeled 612 in FIG. 23.

The operation performed by the Interrogate Keyboard Control Unit 804 subprogram is to determine if the previous interrogation was satisfactorily completed. This is done by testing the contents of the cycle field in the Keyboard Control Unit message store for equality to zero. When the normal condition is found, the Keyboard Control Unit establishes an Input Buffer With Monitor to accommodate the specified group of requirements. It then sends the interrogation request function to the Keyboard Control Unit. The External Function specifies:

(1) The requested start data source address;
(2) The requested final data source address;
(3) The final address minus the starting address.

When the External Function has been sent, no further program intervention is necessary and the program control is returned to the Executive Routine.

On receipt of the External Function Code, the Keyboard Control Unit 612 decodes and sets up the starting data source address. The address is probed to determine whether there is data present or not, and if present, the data are gated into the 30-bit data buffer of the Keyboard Control Unit. For the condition when no data are present, the 30-bit data buffer is cleared to all zeros. An Input Data Request is sent to the Unit computer in control, and the contents of the data buffer are transferred to the computer. Upon completion of the transfer of the block of addresses, the Keyboard Control Unit clears its counters and sends an End-Of-Normal cycle interrupt to the computer. The normal condition is fully met when an Input Buffer Monitor generated by the computer occurs.

The operation, then, of the Interrogate Keyboard Control Unit 804 subprogram is to probe the Keyboard Control Unit and transmit requested addresses into the Unit computer which is in control of the Keyboard Control Unit.

A further operation of the subprogram Interrogate Keyboard Control Unit 804, is to set the appropriate flag in the Subprogram Flag Table 754 such that the Process Keyboard Control Unit 806 may appropriately be executed. This assumes a successful completion of the Interrogate Keyboard Control Unit subprogram. In the event of erroneous operation in the Interrogate Keyboard Control Unit subprogram, a flag is set such that the Process Keyboard Control Unit 806 subprogram can not be referenced until such time as the erroneous condition has been rectified. This is an illustration of a method of setting the flags wherein the flag is determined by a subprogram which must be satisfactorily completed to thereby allow a subsequent subprogram to be executed.

Having successfully completed the Interrogate Keyboard Control Unit subprogram, the Process Keyboard Control Unit 806 subprogram is executed. It is responsible for processing intermittent and low data rate inputs as received from the Keyboard Control Unit as a result of the prior interrogation. This subprogram is utilized in both Unit computer A and Unit computer B, due ot the duplexing of the Keyboard Control Unit 612, whereby either Unit computer A or Unit computer B may appropriately interrogate the peripheral equipment multiplexed therethrough.

The Process Keyboard Control Unit 806 subprogram is illustrated in flow-diagram form in FIG. 29. Therein it is shown that at block 808 the number of words to be tested is determined. The next step is to load for consideration a selected word, as shown in block 810. This word is then tested for correct parity 812, which must be odd. In the event that an even number of ones is found to occur in the word, the "No" path 814 is taken, whereby an error indication to the Keyboard Control Unit 816 is generated. Having made the appropriate error indication, the program proceeds to determine whether or not all of the words have been processed 820. When all of the words have been processed the program exits 822 to the Executive Routine. When there are more words to be processed, it is neecssary to calculate the address of the next word 824 and return by path 826 to a point (junction 828) in the program where the newly selected word is loaded for consideration. If, in the first instance, the parity was correct, the "Yes" path 830 is taken and the format of the word is tested 832 by a subroutine (to be described later). If the word under test meets all of the format requirements, as determined by subroutine 832, the program continues to convert the various data bits to appropriate machine language 834 such that it may be utilized by the Unit computer. Finally, it is necessary to store the word in the appropriate address in the Keyboard message storage, as illustrated by block 836, for future reference. Having completed the operation on a satisfactory test word, it is again necessary to determine whether or not all of the words have been processed 820 with the alternatives again arising as they were previously described.

The Format Testing Subroutine 832 is illustrated in FIG. 30. At the start 838, the first check that occurs is to determine whether or not the number of digits as read is correct 840. In the event that the number of digits is correct, the word is tested to determine whether or not the word code is permissible 842 as determined by the particular input equipment. Finally, it is necessary to determine whether the previous message was completed 844. If all of these tests are answered in the affirmative, the word under test meets the format requirements and the subroutine exists 846 to complete the subprogram Process Keyboard Control Unit. In the event that any of the format tests are failed whereby the "No" paths 848, 850, or 852 are taken, an error indication 854 is sent by External Function to the Keyboard Control Unit. After having done this, the subroutine exits 846 to complete the subprogram Process Keyboard Control Unit.

The preceding discussion illustrates the utilization within a subprogram of a subroutine of instructions. It will be noted that the subroutine is directly referenceable by the subprogram, and in this case is not directly referenceable from the Executive Routine.

Referring again to FIG. 27, it will be found that the subprogram Transfer Data To Unit Computer B labeled 856 is used. In FIG. 28 the same subprogram Transfer Data To Unit Computer A labeled 856 is found. The programming for these two subprograms is identical and the operation for each is the same. Also, in FIG. 27 it will be found that the subprogram Receive Data Transfer From Unit Computer B labeled 858 is utilized. This subprogram is also found in FIG. 28 where it is titled Receive Data Transfer From Unit Computer A and is labeled 858. These two subprograms are also identical.

The cable connections and the appropriate control signals for the inter-computer data transfers is described in detail in Subsection J–*c*, Data Transfers.

The inter-computer buffer transfers are of a nature such that they would normally be placed quite high in the list of priorities as defined by the Subprogram Entrance Address Table 750. They would normally be of a non-periodic nature such that they would be executed upon demand as determined by the Priority Time Table 752, and the Subprogram Flag Table 754.

FIG. 31 is a block diagram of the subprogram which would be referenced by the Executive Routine to Initiate Inter-Computer Transfers. This subprogram and an associated subroutine comprise the intercomputer data transfer subprogram. When the Subprogram Flag Table 754 indicates that it is desirable to initiate an inter-computer transfer, the Executive Routine references the start 860 portion of the subprogram. As was described above, this is accomplished by extracting the starting address from the Subprogram Entrance Address Table 750 which corresponds to the subprogram, by the Executive Routine, and transferring the program operation to the control of the selected subprogram. Having entered the subprogram, it is first necessary to determine whether or not the input buffer status line is active, as indicated by decision element 862. In the event that it is determined to be active, the "Yes" path 864 is taken whereby the next program operation consists of establishing the input buffer control word 866. The buffer control word, as described above, consists of the final and starting buffer addresses for the receiving computer to define the scope of the input buffer. Having performed this operation, it is necessary to enter the buffer control word as the first entry in the output buffer 868. This assures that the first word received by the receiving computer when transmission starts will be the control word which will define the scope of the buffer. Upon completion of this task it is necessary only to execute the command to Initiate Output Buffer With Monitor 870. Having performed this step the subprogram may exit 872 to the Executive Routine, and allow the data transfer to proceed to its normal termination unattended. If at the outset it should have been determined that the buffer status line was inactive, the "No" path 874 would be taken. This would lead to the program operation wherein the flag would be calculated which would cause the subprogram Initiate Inter-Computer Transfer to be rechecked after a predetermined time 876. Having calculated this new flag, it is necessary to insert the flag in the Subprogram Flag Table 754 for future Executive Routine scanning 878. When this step has been completed control is returned to the Executive Routine 872 for a predetermined time prior to rechecking the status of the Input Buffer Status Line.

When a buffer transfer is appropriately initiated by the Initiate Inter-Computer transfer subprogram, it is necessary to provide a termination subroutine. FIG. 32 illustrates a flow-diagram of a subroutine which is responsive to an Input Buffer Termination Interrupt such that when it occurs, the start 880 of the subroutine is referenced. This subroutine causes the end of inter-computer data transfer flag to be calculated and set in the Subprogram Flag Table as indicated by block 882. It is then necessary only to reinstate the input buffer 884 and exit 886 from the subroutine.

The steps necessary to receive data transfers consist of detecting the Input Data Request signal provided by the sending computer and sampling the data line. The receiving computer then issues a Resume signal to the sending computer indicating that another word may be transmitted. This procedure continues until such time as the input buffer control word transmitted to the receiving computer indicates that the transmission is completed at which time the transfer is terminated and the Input Buffer Active Line is deenergized.

The overall time sequence of events for inter-computer data transfers is illustrated in the table below.

TIME SEQUENCE FOR INTER-COMPUTER DATA TRANSFER

| The Command Computer | Time | Slave Computer |
|---|---|---|
| Initialize clear input buffer and output buffer; schedule first output buffer. | $t_0$ | Initialize clear input buffer and output buffer. |
| Establish input buffer | $t_1$ | Establish input buffer. |
| Establish output buffer | $t_2$ | |
| Output buffer terminates | $t_3$ | Input buffer terminates. Reinitiate input buffer. Inform Executive Routine to permit scheduling of next output buffer. |
| | $t_4$ | |
| | $t_5$ | Establish output buffer. |
| Input buffer terminates. Inform Executive Routine to schedule next output buffer; | $t_6$ | Output buffer terminates. |
| Cycle back to time $t_1$ | $t_7$ | Cycle back to time $t_1$. |

Returning again to FIGS. 27 and 28, it will be noted that the subprogram Low Priority Functions 888 is common to both computers. The function of this subprogram is to act as an auxiliary Executive Routine to control infrequent tasks which: (1) can be rapidly performed, and (2) have a non-critical time of execution. The minimum rate for subroutines in this group is arbitrarily set at once every five seconds.

As with other subprograms, the Low Priority Functions 888 subprogram is initiated by the Executive Routine and has a periodicity of 100 milliseconds as determined by the entry in the Priority Time Table 752. This subprogram is so arranged that it has the lowest priority as determined by the Subprogram Entrance Address Table 750. Due to this lowest priority condition, the subprogram Low Priority Functions 888 is most ap to be delayed due to chance multiple settings of flags in the Subprogram Flag Table 754.

The operation of the Low Proirity Functions subprogram is directly analogous to the Executive Routine. Utilization is made of a store and two tables similar to those described in conjunction with the Executive Routine. These tables are entitled (1) Low Priority Entrance Address Table; (2) Low Priority Time Table; and (3) Low Priority Flag Table. When this subprogram is entered, a search is made of the Low Priority Flag Table in a manner similar to that described for the Executive Routine, for a time flag less than or equal to the current value of the real-time clock. If none is found, control is immediately returned to the Executive Routine. If it is determined that a flag is set, this subprogram modifies the flag by adding the value in the Low Priority Time Table to the value of the flag time in the Low Priority Flag Table. It should be noted that this operation is different from that of the modification utilized in the Executive Routine. This type of modification allows the period to remain fixed with no slippage being reflected due to lateness or delay, as would be found with the Executive Routine. The subprogram extracts the address of the subroutine from the Low Priority Entrance Address Table and executes the subroutine therein indicated. When the task subroutine has been completely executed, control is returned to the Executive Routine such that only one low priority task is executed during any one reference of the Low Priority Functions 888 subprogram by the Executive Routine.

Examples of tasks which might be assigned to be controlled by the Low Priority Functions subprogram would be "bookkeeping" subroutines, "cleanup" subroutines, automatic diagnostic routines, peripheral equipment checking routines, and any other of the widely varied tasks which fit the requirements set forth to be assigned to this category of control.

The transmit displays to Site Surveillance Console 889 subprogram appears in both Unit computer A and Unit computer B. This subprogram is non-periodic and consists of required program instructions to assemble and transmit the signal configurations required at the Site Surveillance Console to indicate the respective errors or the status of the site.

The foregoing discussion has been with reference to subprograms which are common to both Unit computer A and Unit computer B as illustrated in FIGS. 27 and 28. The subprogram to process the Paper Tape Reader Input 890 and the Paper Tape Punch Output 892 may or may not be common to both computers. This will depend upon the load capacity of the various computers and the purpose to which these subprograms are put. As was described in Subsection J–g, Two-Computer Data Flow, the Paper Tape Punch and the Paper Tape Reader are normally utilized in an off-line manner. It was also pointed out that the Paper Tape Reader and the Paper Tape Punch might be shared by appropriate connection through the cable-interconnection panel. A manual selection may normally be made as to which computer the device will be associated with. With this capability in mind, it might well be determined that the subprograms for processing the input 890 and the output 892 would be available to both Unit computers, for off-line manipulations such as loading of programs and checkout of peripheral equipments.

The situation might well arise where the Paper Tape Reader Input 890 subprogram is utilized in an on-line manner to process control inputs which are utilized in conjunction with the processes to be controlled. In this light, it is the function of the Paper Tape Reader Input 890 subprogram to appropriately read the coded data as presented by the Paper Tape Reader and form it into computer-length words which are utilizable by the Unit computer with which it is associated. It is also the function of the Paper Tape Reader Input subprogram to perform any conversion in format such as from well-known typewriter codes to binary codes utilizable by the computer. A further function of the Paper Tape Reader Input subprogram is to provide error-checking of the input data such that proper solutions based on the received data are assured.

It is the purpose of the Paper Tape Punch Output 892 subprogram to provide conversion required from the binary machine language to the desired codes. Examples of this would be conversion from binary to the well-known bioctal code, or other codes utilized by off-line peripheral equipment, such as electric typewriters. It is also the function of the Paper Tape Punch Output subprogram to provide the appropriate formats for recording program information in a "hard copy" backup condition.

Detailed flow-diagramming of the Paper Tape Reader Input 890 and the Paper Tape Punch Output 892 subprograms will not be presented since it is not felt that such a presentation would tend to clarify the specification.

In FIG. 27 the Transmit Data To Teletype Unit 894 subprogram is illustrated. The computer instructions which comprise this subprogram are arranged to process the control functions or the data words transmitted from the Unit computer A to the Teletype Unit. The subprogram operates to transform the data arranged in computer words such that bits appear of significance only in the lower five digit positions, as transmitted to the Teletype Unit. It is also a function of the subprogram to convert the coding of the transmitted data to that recognizable by the Teletype Unit. The determination as to whether the output to the Teletype Unit shall be copied as printed matter, or recorded on perforated paper tape is made by the subprogram issuing the appropriate External Function Code.

The problem exists in regard to termination of the output buffer, when utilizing the Teletype in the output mode. After the output buffer terminates, there is a 100 millisecond delay before the last word is printed or punched. If an External Function word is issued to the Teletype within this period, the last word from the output buffer will not be printed or punched and will be lost. This follows from the fact that the External Function word takes precedence over the data word. To overcome this problem, the Transmit Data To Teletype 894 subprogram is so arranged to provide that the last data word of an output buffer is transmitted as a Blank symbol. This has no effect on the appearance of the printed page since the Blank is not printed. The utilization of the punched paper tape is such that Blank characters are ignored in the event that such a code should be punched.

In FIG. 28 the Receive Data From Teletype Unit 896 subprogram is illustrated. Information transmitted from the Teletype equipment to Unit computer B consists of interrupts and data. The subprogram is non-periodic in nature and is referenced upon demand by the issuance of an interrupt. This piece of peripheral equipment is normally of a low priority such that it would appear in one of the lower addresses of the Subprogram Entrance Address Table 750. In the corresponding Priority Time Table address would be stored the large time value indicating the non-periodicity of the subprogram. It is the function of the Transmit Data To Teletype Unit 894 subprogram to assemble the received Teletype codes into computer-length words and translate the Teletype codes into the appropriate machine language. No detail consideration of the coding for the Receive Data From Teletype Unit 896 will be presented, since it would not tend to clarify the specification.

In FIG. 27 the Transmit To System Via Radio Carrier I labeled 898 subprogram is illustrated. This subprogram controls the operation of the radio equipment which supplies site information for use by other sites of the Data Processing System. The communication is carried on by way of a digital data network. It operates to transmit data messages concerning the status of the transmitting site, and control messages to indicate courses of action to be followed by other sites in the system. The subprogram controls an equipment configuration as illustrated in block diagram form in FIG. 33. The System Unit computer 900 is connected to the Communications Control Unit 902 over normal output channel 14 labeled 904. The Communications Control Unit, as was described above, operates as a temporary storage device wherein low-level data manipulation and format arrangement is done. It operates as the terminal through which data is transmitted, and received. The radio transmitter 906 is connected to the Communications Control Unit by way of cable 908. The Communications Control Unit 902 operates to transfer 30-bit words for transmission in a parallel mode to the radio transmitter 906. The operation of the radio transmitter, then, is to perform the transmission to the remainder of the system. The subprogram controlling the receiving of data will be described later, but at this time the equipment function will be considered. The radio receiver 910 receives input signals from the remainder of the system and transmits them over cable 912 to the Communications Control Unit 902, which operates to evaluate the received data to distinguish between control words and transmitted data. After having taken appropriate action, the Communications Control Unit transmits the data words over normal input channel 14 labeled 914 to the System Unit computer 900.

The subprogram Transmit To System Via Radio Carrier I is illustrated in FIG. 35. Prior to the execution of this subprogram, it is necessary upon determination that it is time for the site to transmit, to execute the Prepare-To-Transmit subprogram as illustrated in FIG. 34. The execution of the latter subprogram comes in response to the Prepare-To-Transmit Interrupt that is generated by the communications equipment. At the start 916 in response to the Prepare-To-Transmit Interrupt, it is necessary to initiate the Output Buffer With Monitor as illustrated by block 918. The program then loads a preassembled message-type word into the buffer area 920 and proceeds to set the flag in the Subprogram Flag Table 754 which will cause the execution of the Transmit To System Via Radio Carrier I 898 subprogram, as illustrated by block 922. This sequence of instructions then exits 924 to the Executive Routine.

Normally the computer will be transmitting the information from one of two 10-word buffer areas, while the second area is being filled with new messages. The abnormal case occurs during the first time the transmit subprogram (FIG. 35) is referenced after a Prepare-To-Transmit subprogram has been executed in response to the interrupt. The first messages to be processed, will be loaded into the active buffer. When the area is completely filled, a marker is set to thereafter transfer loading to the empty buffer area. After the second buffer area has been completely filled, all references to the transmit subprogram are controlled by the Output Buffer Monitor subroutine, which is illustrated in FIG. 36.

FIG. 35 is the block diagram of the actual subprogram which is utilized to transmit to the system by way of Radio Carrier I. It is referenced from the Executive Routine according to the flag determined by the Prepare-To-Transmit subprogram which was discussed above. At the start 926, it is necessary to assemble words for transmission to the control unit in a proper format for transmission, as indicated by box 928. This would include such functions as coding the data words for error detection-correction techniques to be applied at the receiving end, and by inserting the appropriate marker words to indicate the types of data being transmitted and the length of the messages. As was described in the preceding paragraph, an abnormal condition exists on the first reference to this subprogram. This is indicated in block 930 wherein the program logic is such that during the first operation the program loads the first buffer area which is in the active state. Thereafter, the assembled words are transmitted to the non-active buffer during the period of generation. The program operates to transmit the coded words to the Communications Control Unit from the active buffer as indicated by block 932. This transmission continues until such time as the active buffer has been depleted. This is determined by decision element 934 which asks the question—Have all words been transferred? An answer of "Yes" 936 will result in an Interrupt Buffer Output 938. In the event that all the words have not been transmitted, the "No" decision 940 will result in continued buffering until such time as the buffer is completed. Upon completion of the transfer of the active buffer, and the issuance of the Interrupt Buffer Output 938, the subprogram exits 942 to the subroutine entitled Output Monitor Subroutine, which is illustrated in FIG. 36.

Having triggered the Interrupt Buffer Monitor upon the completed transfer of one of the two buffer areas, the Output Monitor Subroutine is started 944, whereby it operates to switch the output buffers such that the depleted buffer is now made subject to being loaded, while the buffer which was loaded in the preceding operation of the transmit subprogram, will be made the active output buffer. This is shown in block 946. After the buffer switch it is necessary to initiate the Output Buffer With Monitor for the newly determined active buffer. It is then necessary only to set the flag in the Subprogram Flag Table 754 to again execute the transmit subprogram. This operation is illustrated in block 948. Having completed this, the Output Monitor Subroutine can exit 950 and the Transmit To System Via Radio Carrier I labeled 898 subprogram will again be referenced.

It can be seen, then, that to effect a transmission over Carrier I it is necessary to execute the three sets of routines just described.

There are three basic types of transmission modes. They may be described as follows:

(1) *Round-Robin*.—This type of transmission exists when one site is designated the control site and all others are designated as system sites. In the Round-Robin communication, each site assumes transmission control in turn and transmits data on the Radio Carrier, as was described in Subsection J–*b*, System Communications Timing Requirements. Following data transmission, the terminal automatically calls the next site in the system. The next site will then assume transmission control, transmit its data, and call the next site. This continues in predetermined sequence from site to site. If a site fails to respond to the first Round-Robin sequence call, the site in transmission control repeats the call; if the called site fails to respond on the second call, an indicator lights above that site's address on the operator panel and the equipment automatically sequences to the next designated site. The program is so arranged that if the calling site receives no response from three consecutive sites, the Round-Robin sequence ceases and remains inactive for a predetermined length of time. Following this delay, the control site re-initiates net operation to again attempt to proceed in the Round-Robin communications manner.

(2) *Roll Call*.—In the Roll Call mode of communications, one site is again designated the control site. The control site interrogates the other sites, which are designated as system sites, in sequence. When a particular site is interrogated by the control site it broadcasts data from its computer. The interrogation sequence is selectively alterable by manual switches selections at the control site operator panel. If a system site does not respond after having been called two times, the control site sequences to the next installation. The control site will continue to sequence through installations in the Data Processing System until it receives a response. In the event that a site is called but fails to answer, an indicator light representing that station is lighted on the control site's operator panel.

(3) *Long Broadcast*.—The Long Broadcast mode of communication, wherein the Data Processing System control site transmits data continuously, is initiated and terminated manually. If the site fails to respond to a request for data within a six milliseconds time period, the terminal equipment sends a Stop code over the net and re-initiates the Broadcast mode. This process continues on until manually terminated by the control switches. In the Long Broadcast mode, the control computer periodically transmits Start codes to activate terminal equipments at sites which may have entered the overall communications net after the previous initiation of Long Broadcast. If this is not done, a site entering the data processing system after having been off the air for one reason or another, will not have its terminal equipment triggered, and consequently, will not receive the data transmitted via Long Broadcast.

The System computer of FIG. 27 also is utilized to control the Receive From System Via Radio Carrier I 952 subprogram. Physically, the relationship of the radio receiver 910 to the Communications Control unit 902 is illustrated in FIG. 33. It will be noted there that inputs received from the radio receiver are transmitted over normal input channel 14 labeled 914, after having been partially processed by the communications Control Unit, to the Systems Unit computer 900. This means that in the normal system of Input/Output cable priorities that the communications by Carrier I, either into, or out of the Unit computer rates right at the top of the priority list. Considering the priority of the subprogram 952 with relation to the Unit computer A, it can be seen that this critically times subprogram will be placed near the top of the Subprogram Entrance Address Table 750. This means that upon demand it will be subject to execution within the controlled priority scan time.

The subprogram Receive From System Via Radio Carrier I 952 is responsible for processing all incoming communications associated with this class of radio transmitter and receivers. The messages are received in the parallel mode, as was described for the transmission of data over Radio Carrier I, and transmitted to the Communications Control Unit for low-level operation, such as basic format checking.

The Receive From System Via Radio Carrier I 952 subprogram is illustrated in flow diagram form in FIG. 38. A prerequisite to the execution of this subprogram is the execution of the Prepare-to-Receive subroutine, which is illustrated in FIG. 37. The receive cycle is initiated in response to a Prepare-to-Receive Interrupt which is generated by the terminal equipment in response to a Start code directed to the site. The Prepare-to-Receive subroutine starts 954 by initiating an Input Buffer With Monitor into one of the two buffer areas 956 available for temporary storage of the incoming message. Having initiated the input buffer, the program proceeds to set the flag in the Subprogram Flag Table to reference the receive subprogram. This operation is indicated in block 958. Having completed the setting of the flag, the subroutine exits 960 to the Executive Routine. When the Executive Routine scans the Subprogram Flag Table 754 and comes to the flag set to require the execution of the Receive From System Via Radio Carrier I 952 subprogram, it starts 962 by receiving a buffer load of data 964. Having received the data, each message word is evaluated to determine whether or not it was correctly received 966. This is accomplished by examining the parity bits generated in each message word. This test computes parity on received message content, and compares the newly determined parity with received parity for identity. In the event that parity is found to be in error, 968, it is determined whether the message word being considered is the first word of the message or not 970. In the event that the message word is not the first in the list 972, it is necessary only to disregard the word found to be in error and to continue testing the remainder of the words in the message. However, in the event that it is found that the first word of the message is in error 974, it is necessary to disregard the entire message 976, and exit 978 to the Executive Routine. The reason for having to disregard the entire message in the event that the first word is found to be erroneous, arises from the fact that the first word contains the designation of the type of data which is being transmitted. Therefore inability to determine the nature of the data renders the entire message worthless. For the situation when all words are determined to have been received correctly 980, it is necessary to determine the message type received 982. This is done by de-coding the first word of the message to determine the nature of the data transmitted, and the category to which it is assigned. Having determined the nature of the data received, the subprogram then proceeds in accordance with this determination, to decode the data and perform appropriate error-detection-correction manipulation 984 if specified. This results in the data being put in a condition such that it may be utilized by the Unit computer, and assuring that the data as utilized is correct. The nature of the error-detection-correction techniques consists of applying the Hamming techniques to the data bits in a manner well known in the art. When it is determined that the input buffer has been completed, an Interrupt Buffer Input is executed 986, and the subprogram is terminated 988.

When a buffer is filled and Input Buffer Monitor Interrupt is triggered, it is then necessary to execute the Input Buffer Monitor subroutine as illustrated in FIG. 39. At the start 990 the Input Buffer Monitor subroutine operates to switch to the other input buffer, and initiates a new input buffer with monitor operation 992. Having initiated the new input buffer, the subroutine operates to set the flag in the Subprogram Flag Table 754 such that the Executive Routine will cause the receive subprogram to be executed again 994. Having done this, the subroutine exits 996.

The above procedure continues until such time as an End-Of-Data Interrupt is generated by the terminal equipment as a result of a Stop code being detected. Since the final buffer may be only partially filled, the End-Of-Data Interrupt subroutine, as illustrated in FIG. 40, must be executed. At the start 998 of this subroutine, the program operates to set the flag in the Subprogram Flag Table 754 to require the final execution of the receive subprogram whereby the data existing in the final buffer may be processed 1000. Having set this flag, the End-Of-Data Interrupt subroutine exits 1002 to the Executive Routine. The Executive Routine acknowledges the flag that has just been set by giving control to the Receive From System Via Radio Carrier I labeled 952 subprogram, which then processes the filled, or partially filled, final buffer. When this last buffer has been completely processed and the information placed in the proper storage addresses, control is returned to the Executive Routine for further scanning of the Subprogram Flag Table.

In FIG. 27 the Transmit To System Via Radio Carrier II 1004 subprogram, and the Receive From System Via Radio Carrier II 1006 subprogram, are associated with the ultra-high frequency communications equipment. The primary operational difference between Radio Carrier II and Radio Carrier I, described above, exists in the nature of the transmission. Transmission is serial in nature for Radio Carrier II. This requires that the Communications Control Unit 902, illustrated in FIG. 33, performs slightly different checks on the transmitted and received words when operating with the ultra-high frequency radio. It will be recalled, that the primary mode of controlling the communications utilized with Radio Carrier I existed in the control words which were transmitted. In contra-distinction to this method, Radio Carrier II utilizes a time-slot counter to determine the periods of transmission. Like Radio Carrier I, Radio Carrier II is capable of operating in a system of Round-Robin, Roll Call or Long Broadcast, as described above. Since the nature of the programming for Radio Carrier II is similar to that described in detail for Radio Carrier I, no detailed consideration of the program flow-diagrams will be presented.

Another method of communication associated with the System computer illustrated in FIG. 27, is the Transmit To System Via Telephone Carrier 1008 subprogram and the Receive From System Via Telephone Carrier 1010 subprograms. This method of communication requires that there be telephone transmission interconnection between the respective sites. As was the case with Radio Carrier II, the Telephone Carrier operates in a serial mode. It will be noted by reference to the table of assigned cable hookups that the telephone carrier is operative with cable number 138, thereby putting it in the lowest channel priority with respect to the overall communications assignment. Likewise, its position in the Subprogram Entrance Address Table 750 would normally be at a lower priority rating than would be Radio Carrier I, or Radio Carrier II, which normally appear in that order. Again, the nature of the detailed programming is similar to that for Radio Carrier I, therefore, detailed flow-diagram consideration will not be presented since it would not tend to clarify the operation of this embodiment.

The final subprogram illustrated as being connected with Unit computer A of FIG. 27 is the Communicate With Selected MT Unit 1012 subprogram. It should be noted that this subprogram actually consists of two subprograms which are directly referenceable by the Executive Routine of Unit computer A. They are the Write On Magnetic Tape subprogram as illustrated in FIG. 41, and the Read From Magnetic Tape subprogram as illustrated in FIG. 42.

The tape system is manually placed in an operational condition by an operator who mounts the magnetic tapes on the transports, turns on the power, and initially positions the tapes.

All programmed commands from the Unit computer to a tape system are sent by way of 30-bit External Function Words as an External Function Instruction. These External Function Words convey 3 basic types of commands to the tape system:

(1) Control Commands;
(2) Master Clear Commands; and
(3) Standard Tape System Commands.

The Magnetic Tape Control (see Section J–*f*, Magnetic Tape Control Unit) determines which operation, other than control is requested by a computer, and initiates necessary action to perform that operation. The computer indicates which operation it desires of the tape system by an appropriate code in the 30-bit External Function Word. Upon completion of any tape system function, except Master Clear, the Magnetic Tape Control Unit transmits an interrupt to the computer by way of the interrupt line and places a status word on the 30 data lines of the input cable to the Unit computer. The interrupt informs the computer that the last requested External Function was completed and the status word indicates successful or unsuccessful completion of the External Function.

It will be recalled that the magnetic tape units are capable of being duplexed. This illustration does not show the magnetic tape system in a duplexed manner. In the event that duplexing is utilized, it would be necessary to include the magnetic tape communication subprograms in both Unit computer A and Unit computer B, and would require the addition of another subroutine which would reference the duplexer to gain control of the magnetic tape system prior to execution of the requested function. This operation was explained in Subsection J–*f*, Magnetic Tape Control Unit. Table J–III in Subsection J–*f* provides a summary of the tape system functions and bit position selections.

Upon completion of each tape system function, with the exception of Master Clear, the Magnetic Tape Control Unit transmits an interrupt to the computer, and automatically applies a 30-bit status word to the 30 data lines. An Interrupt subroutine must be included in all programs referencing the tape system. The only functions that will not result in an interrupt upon completion of execution are those functions which render it impossible; they are the control functions, release Local, Release Remote, and Master Clear.

Status words transmitted at completion of a tape system function inform the computer of either successful or unsuccessful completion of the function. A status word containing all zeros conveys to the computer that the function was completed successfully. There are six additional messages which may be conveyed to the computer by setting bits of the status word to the one condition. These messages are of two basic types consisting of (1) the control acknowledge, and (2) five error messages. The control acknowledge bit is set in response to a Request Control External Function code, providing the requesting computer was given control. This is operative only in the event that the magnetic tape system is duplexed. A following table gives the complete list of interrupt messages in the status word.

INTERRUPT MESSAGES

| Bit position | Meaning |
|---|---|
| 29 | Improper condition |
| 28 | Data error |
| 27 | Out of synchronism |
| 26 | Input timing error |
| 25 | Output timing error |
| 24 | Control acknowledge |

The Unit computer in control of the tape system must always perform a Write function, which consists of transmitting data to the tape system, in accordance with the sequence of program instructions illustrated in FIG. 41. At the start 1014 the instructions provide for the initiation of an output buffer on the assigned output channel 1016. The size of the buffer will determine the length of the block of words to be written on a magnetic tape. This means, that if variable buffers are transmitted to the magnetic tape unit, that there will exist variable sized blocks of data on the magnetic tape. Having initiated the output buffer, the program operates to issue the External Function code to the tape system which contains the Write bit selection and any other desired selected bits 1018. Having made the External Function selection, the tape system will provide an interrupt.

When the interrupt occurs, it is necessary for the program of instructions to execute the Interrupt subroutine. This subroutine operates such that the status word on the input cable is removed and sets a flag in the Subprogram Flag Table to indicate that the tape system may be referenced now. This program operation is illustrated in block 1020.

Having completed the Write operation, the subprogram will exit 1022 to check three final conditions to determine successful completion of the function. The function is successfully completed if:

(1) Bit 29 in the status word is zero;
(2) Bit 25 in the status word is zero; and
(3) The output buffer is terminated.

If bit 29 is set to one, an Improper Condition exists which may mean that operator intervention is necessary. As Improper Condition will occur whenever a referenced magnetic tape unit is not automatic, an illegal magnetic tape selection has been made, a Forward reference to the magnetic tape unit has been made, when the tape is positioned at the end of the tape, or a Reverse reference to the tape unit has been made to a tape unit which is positioned at the beginning of a tape.

If bit 25 is set to the 1 condition, it indicates an output timing error. This results when the computer acknowledges an output data request from the tape system too late for the data word to be written in its proper place on the moving tape. It should be noted that it is possible for an output timing error to occur that will *not* cause bit 25 to be set to 1. Such a condition results if the computer did not acknowledge the output data request. The tape system recognizes this situation as end-of-block and consequently, indicates no error. If words are left unwritten in the output buffer, this constitutes an output timing error condition. It is for this reason that the program must check termination of output buffer *and* check the 25 in the status word.

The subprogram which is directly referenceable by the Executive Routine which will Read from magnetic tape is illustrated in FIG. 42. When referenced, the start 1024 of this subprogram operates to initiate an input buffer on the input channel assigned, as indicated by block 1026. It will be noted that the size of the buffer receiving the input data must be of a size large enough to cover the length of a block which is to be read from tape. It will be recalled from the discussion of the Write On Magnetic Tape subprogram, that the size of the output buffer determines the length of the block of data to be written on the magnetic tape. For this reason there may be blocks of variable length recorded such that care must be exercised in the programming of the reading of the magnetic tape to assure an adequate buffer size. Having initiated the input buffer, the program of instructions executes an External Function Code to the tape system wherein the External Function Word contains the Read bit set in a condition, and other pertinent select bits in a set condition. This function is illustrated in block 1028. Examples of "other pertinent select bits" would be the select bits indicating the Direction selection for the read operation, the Format selection of the magnetic tape to be read, and the selection of the magnetic tape transport which is to be referenced. Having issued the External Function Code to the tape system, the tape system interrupt occurs. Upon the occurrence of the tape system interrupt, the program of instructions will execute the interrupt subroutine which operates to remove the status word from the input line and to set the flag to indicate the tape system may now be referenced. This operation is indicated in block 1030. After the interrupt is received that signifies End-of-Read function, the program must check bits 27 and 26. The occurrence of a 1 in bit 27 indicates an out-of-synchronism condition such that at least one frame was not read from tape when it should have been. The existence of a 1 in bit 26 indicates that the Magnetic Tape Control Unit information was not accepted by the computer before it was time to transmit the next word to the computer. This condition indicates that the computer effectively lost one or more words of the last block.

Having considered all of the subprograms illustrated as being directly referenceable from Unit computer A in FIG. 27, it should be noted that this array of subprograms may be expanded as far as may be desired, while keeping the computing capabilities and the time requirements within the restrictions put on the Unit computer which is associated primarily with the remainder of the system. It is now necessary to consider the subprograms associated with Unit computer B as illustrated in FIG. 28 which have not previously been discussed as being identical to those contained in Unit computer A.

The Data Processing and Reduction 1034 subprogram is illustrative of the non-real-time internal computational type of program that would be associated with the User computer. Such a subprogram would be utilized to reduce the raw process data to a form usable by the remainder of the system. It should be noted that the Data Processing and Reduction subprogram indicated as being a single subprogram would very likely exist as multiple subprograms to handle the various other non-real-time computational tasks. These subprograms would normally be of relatively low priority compared to the actual process control operations. Examples of these would be the bookkeeping requirements, the inventory listings, the payroll deductions, etc. type problems that are non-process oriented but are associated with the site. Examples of programming required for these widespread types of data handling programs will not be presented since they do not form a part of the inventive concept nor would they tend to clarify the understanding of the specification.

The subprograms to Interrogate Status Of Process II 1036, and Transmit Control Signals To Process II 1038 may be considered the Unit computer oriented solution to the process control described in an article entitled Process Evaluation in Computer-Run Microplant appearing in the Periodical Chemical Engineering on Oct. 30, 1961, by C. W. Dowding and F. R. Russell. The process there involved and the peripheral type problems are discussed as being handled by a general purpose computer. The general purpose computer therein utilized is operated solely to control the process described. The sensors and control elements therein described are all of a nature subject to utilization and control by the Unit computer attached thereto. The nature of that process is such that the operation of Unit computer B labeled 802 would be only on a part-time basis, and could be handled in conjunction with the other functions illustrated in FIG. 28. This provides an example of the type of commercial real-time process which is directly adaptable to real-time computer control and could be made a part of the overall Data Processing System.

The subprograms Interrogate Status of Process III 1040 and Transmit Control Signals To Process III 1042 would be made up of the required instructions to perform the various interrogation and control of another process such as the "cracking" process of petroleum products.

The subprogram Transmit Control Signals To Process I 1044 consists of the required instructions to control the designated process after having interrogated the status of the process through the utilization of the Interrogate Keyboard Control Unit 804 subprogram as was described above.

The programming required for the Interrogation and the Control of Processes I, II, and III are not presented since these processes could be of such a wide variety that their solution would only tend to confuse the specification, and the processes do not form a part of the inventive concept.

L. MASTER CONTROL ROUTINE

To provide a more readily adaptable system, each Unit computer in the Data Processing System is equipped with a Master Control Routine which provides access to the control of the Unit computer from external sources. The nature of the Executive Routine (see Subsection K–*d* above) is such that it is utilized to provide continuous control of the performance of the specified tasks. Since this control is cycling continuously, it is necessary to provide an overriding means for altering this predetermined sequences of operation. It is the function of the Master Control Routine to provide just such an overriding control. Having overriding control, an operator can enter his externally selected commands into an operating computer without having to stop the operation of the installation.

The nature of the commands which are externally specifiable and the various operation sequences which may be requested are discussed in Section I, Site Surveillance Console, above. As is described therein, the external specification of computer operations whereby the control of the Executive Routine is interrupted is made by entry through the Site Surveillance Console. This provides a remote control of the selected associated Unit computers.

(*L–a*) *Specifying the control word*

The input to the Unit computer from the Site Surveillance Console consists of a 30-bit control word. It is necessary for the operator to make appropriate bit selections at the Site Surveillance Console which determines the nature of the command to be effected within the Unit computer. These bit settings have been discussed in detail in Section I, and may be summarized as—

(a) Computer designation selection,
(b) Command type selection,
(c) Category display selection (when required),
(d) Numeric display selections.

Once the operator has made the selections desired for the operation to be performed, the Site Surveillance Console operates to calculate the proper odd parity and insert it in the control word at bit 29.

Upon completion of the selection of the control word, and its verification for accuracy, the operator initiates the request for external control of the operation of the selected Unit computer by depressing the Transmit key (see FIG. 14). Control of the execution of the selected request is thereafter turned over to the internally stored Master Control Routine within the selected computer.

(*L–b*) *Master Control Routine*

FIG. 43 is a flow diagram of the Master Control Routine which is operative in response to manually selectable control words entered at the Site Surveillance Console to alter the predetermined order of program executions, thereby providing externally selectable means for altering the mode of operation of the Unit computer.

When the operator depresses the Transmit key 380 (see FIG. 14), the Site Surveillance Console operates to issue an External Interrupt to the Unit computer selected. For this embodiment, the Site Surveillance Console has been arbitrarily assigned to input and output channels 5 for each of the respective computers to which it may be coupled. This means that the issuance of an External Interrupt on input channel 5 of the selected computer will cause access to address 00025 which is the address specified as the External Interrupt Entrance Register for channel 5 (see Subsection E–*h*, Magnetic Core Memory Assignments).

By referencing address 00025, the External Interrupt is provided access to the address of the Master Control Routine, as illustrated in FIG. 43. At the start 1034, the Master Control Routine operates to store the 30-bit control word which was issued from the Site Surveillance Console. This 30-bit word appears on the 30 data lines which comprise input channel 5, and are stored for evaluation by the Master Control Routine. This operation is shown in block 1036.

The first evaluation of the control word performed by the Master Control Routine is to determine whether or not the parity of the transmitted word is correct 1038. In the event that the parity is found to be other than odd, the "No" path 1040 causes the Master Control Routine to provide an error-indication to the Site Surveillance Console 1042, and end 1044 the operation of the Master Control Routine. At the end, control is returned to the Executive Routine.

In the event that parity is determined to be correctly presented, the "Yes" path 1046 is taken. This causes the Master Control Routine to evaluate bits 24–26 to determine the requested Command Type, as illustrated by block 1048. See Section I and FIG. 14 for description of the allowable Command Types. It is the function of the Command Type selection to inform the Master Control Routine of the nature of the computer operation selection made at the Site Surveillance Console.

Having determined the nature of the Command Type selected, the Master Control Routine operates to determine whether or not the selected Command Type utilizes a Category Display selection 1050. This is done by examining bits 20–22 of the previously stored control word in light of the requested Command Type selection. In the event that it is determined that the Category Display selection is to be utilized, the "Yes" path 1052 is taken. This selection operates to set the conditions specified by the selected Category Display bits 1054, as determined by bits 20–22. Having completed the selection of this condition, the Master Control Routine returns to the normal sequence of instructions by path 1056.

In the event that the Command Type requested does not utilize the Category Display selection, the "No" path 1058 is taken by the Master Control Routine to continue on directly with the examination of the control word.

At this juncture, it is necessary for the Master Control Routine to evaluate bits 0–19 of the control word to determine the Numeric Display selections made for the operation control 1060. It is the function of the Numeric Display selection to operate as the final control indication in combination with the Command Type requested and the Category Display selection when the latter is applicable. Such control may operate to identify the selected program when the Enter Program Command Type is selected, to determine the Operation Code when the MT Operation is selected as the Command Type, to determine the Modification Code when the Modify Program Command Type is selected, as the Transfer Parameter selection when the Transfer Data Command Type is selected, etc., to list but a few examples of the available selections for the Numeric Display bits. A full listing of the possible selections is presented in Section I above.

Having determined the requested Command Type, the necessity and the utilization of the Category Display selection, and the Numeric Display selections, it is necessary for the Master Control Routine to execute the externally specified function 1062. These functions exist as subroutines, and operate to return control to the Master Control Routine upon completion of their execution. Having returned control to the Master Control Routine, it is necessary only to end 1064 its operation, and return control to the Executive Routine for automatic system operation. Detailed consideration of the various subroutines which are operative to carry out the requested Command Type operations, will not be presented here since it is not felt that it would tend to clarify the specification.

It should be noted, that the utilization of the Master Control Routine allows an operator to change the whole nature of the operation of any or all Unit computers at the location under his control. This follows from the fact that by external selection the operator may initiate magnetic tape operation in a manner wherein new control tables, of the type illustrated in FIGS. 25*a*–25*c*, are entered for operatoin such that the nature of the Executive Routine is completely changed. Assuming the situation where no changes are required in external equipment selection, then, it can be seen that without undue delay or the requirement of stopping operation, that the operator may override the existing Executive Routine control and substitute therefor a newly selected mode of operation.

It is understood that suitable modifications may be made in the structure as disclosed provided such modifications come within the spirit and scope of the appended claims. Having now, therefore, fully illustrated and described our invention, what we claim to be new and desire to protect by Letters Patent is defined in the appended claims.

What is claimed is:

1. A multi-computer data processing system having certain of said computers being remotely located with respect to one another comprising:

a plurality of independently operable computers for utilization selectively singly and in combination at each of the locations the locations each having at least one computer with a terminal portion for inter-location communication, said plurality of independently operable computers performing independent control and data signal manipulating tasks on a time-sharing basis while operating as a part of the data processing system;

selectively actuatable communication means coupled to the terminal portion of each of said locations for transmitting data signals therebetween;

executive control means at each of said locations for determining the order of performance of said independent control and data manipulating tasks; and a control device, including manual entry means, responsively coupled to each of said locations for altering the order of task performance of the locations.

2. A data processing system comprising:

a plurality of independently operating computer locations;

each location having at least one independently operable programmed computer, input means and output means respectively coupled to said computer, and at least one terminal portion coupled to said computer for inter-location signal transfer;

at least one computer at each location having facilities for communicating with other computers having like facilities;

communications means joining said terminal portions of various locations for permitting inter-computer signal transfers between the locations via said computers having like facilities;

programmed control means in one computer at each location for monitoring the data transfers, for assigning computational time at said location, for assisting in the solution of problems being solved by computers at more than one location, and for assigning computer time for solving location assigned problems; and a control panel including manual entry means at each location, said control panel being selectively operatively connected to each computer thereat for controlling the operation of the location.

3. Apparatus as in claim 2 wherein each location has at least two independently operating computers, the two computers having inter-computer data-transfer means for transferring data signals therebetween, at least one of the computers having the terminal portion for communicating with other computer locations and having said programmed control means, and at least another computer at each location having programmed control means responsive to control signals of the one computer for performing problem solutions and providing signals thereto for transmission to the other locations which are indicative of such solutions.

4. Apparatus as in claim 3 wherein the control panel at each location is selectively operatively coupled to each computer, and further includes system malfunction indicating means responsively coupled to each of said computers to provide external indication of detected erroneous system operation.

5. Apparatus as in claim 2 wherein at least one location has three computers with at least two of the computers being programmed for performing problem solutions and the remaining computer being programmed for maintaining the location as part of the system, all three of said computers being independently interconnected for direct transfer of digital signals therebetween, and the control panel at the three computer locations being selectively operatively coupled to the three computers.

6. A complex data processing system comprising:

a plurality of computer installations independently operable one from the other, said installations arranged to utilize selectively one or more computers, where each of said plurality of computer installations operates in a single system on a time-sharing basis for performing a first set of site-oriented data signal manipulating and control tasks and a second set of system-oriented control tasks;

first automatic control means operatively associated with each of said computer installations to allocate the computation assignments and the time allowable for the execution of said first set of tasks;

second automatic control means operatively associated with each of said computer installations to allocate the computation assignments and the time allowable for execution of said second set of tasks;

first data-transferring system associated with each installation having more than a single computer, and being responsively coupled to said first automatic control means for selectively transferring data signals between said installation computers;

second data-transferring system connected between the installations, and being responsively coupled to said second automatic control means to provide data-transfers therebetween, and manually operable control means, each selectively coupled to said computer installations to provide overriding control over said first and second automatic control means to thereby allow selective alteration of tasks to be performed by said installation.

7. A complex system as in claim 6 and further including task-request determining means operably coupled to said first automatic control means for initiating the performance of one of said first set of tasks.

8. A system as in claim 7 and further including a task-priority determining means coupled to said task-request determining means for determining task-precedence in order of execution of requested task performance.

9. A system as in claim 8 and further including a selectively variable task-priority determining means operably coupled to said task-request determining means to provide predetermined delay in the execution of selected tasks during periods of high-task rate occurrence.

10. A data processing system as in claim 6 wherein said control device comprises a manually operable input-selection panel, being selectively operatively connected to each computer thereat, and further including system malfunction indicating means responsively coupled to each of said computers to provide external indication of detected erroneous operation.

11. A data processing system as in claim 6 wherein said first automatic control means comprises an executive program of computer instructions for interrogating a task-request indicating memory table to determine the necessity of initiating the respective task-executing subprograms of computer instructions, and for issuing the command to execute said subprograms as requested.

12. A data processing system as in claim 11 and further including a task-priority indicating memory table operable with said executive program to determine task-precedence in order of execution of requested task performance.

13. A data processing system as in claim 12 and further including a variable task-priority indicating memory table accessible by said executive program for providing predetermined delays in the execution of selective tasks during periods of high-task rate occurrence.

14. A data processing system comprising:

a plurality of independently operable system computers each having an internal memory and an established repertoire of sequenced instructions, and said computers each capable of operating pursuant to an executive program of instructions to solve a predetermined set of programmed data manipulating and control tasks;

signal transfer means, including a first control means, interconnecting the computers such that signals are transferred from one computer to another independent of execution of said executive programs except that such signal transfers are initiated by activation of said first control means by said programs, the grouping of said signals being indicative of the state of execution of any one of said programmed data manipulating and controlled tasks, each of the computers operating pursuant to their respective executive programs such that the transferred digital signals are monitored; and second control means within each of the computers being responsive to said transferred signals for determining that the execution of their respective programs will proceed in an orderly manner whereby all of the computers assist in the solution of specified tasks in a cooperative manner.

15. A system as in claim 14 wherein the execution of the respective programs for performance of the specified tasks are kept in compatible states of performance by means for interspersing the execution of other tasks when the respective program execution is ahead in performance of any of said specified tasks.

16. A system as in claim 15 wherein each of the system computers consists of at least two individual computers, one computer capable of communicating with the memories of other system computers and a second computer for providing task-execution or partial task execution as assigned by the one individual computer, said assignment being effective by transfer of signals from the memory of the one individual computer to the memory of the second computer.

17. A data processing system as in claim 14 and further including a manually operative control device selectively operatively coupled to said operating system to provide overriding control for altering the order of execution of said data manipulating and control tasks.

18. A complex computer system comprising:

a plurality of computer installations operable both independently and together as a system, said installations each arranged to selectively utilize either one one or more computers each having internal memories with predetermined instruction repertories, independently operating to provide predetermined instruction sequences, the capability to perform by said instruction sequences computational and process control functions, and an input and output section including at least one terminal portion at each installation for inter-installation signal transfers, said computers having data handling and control peripheral equipments coupled to respective input and output sections, where said installations operate on a time-sharing basis to perform a set of installation-oriented control functions and a set of system-oriented data-manipulating functions;

installation-oriented programmed automatic control means operatively associated with each of said installations to direct the performance of said installation-oriented control functions;

system-oriented programmed automatic control means operatively associated with each of said installations to direct the performance of said system-oriented data-manipulating functions;

inter-computer data-transfer system at each installation having a plurality of computers for transmitting signals therebetween, said data-transfer system responsively actuated by said installation-oriented programmed automatic control means;

system communications means coupled to said terminal portions for transmitting signals between said locations and being selectively actuated by said system-oriented programmed automatic control means; and manually selective control means being selectively operatively coupled to each of said computer installations to provide overriding control of said installation-oriented and said system-oriented programmed automatic control means to thereby allow the alteration of the functions to be performed by said installation.

19. A system as in claim 18 wherein said installation-oriented programmed automatic control means and said system-oriented programmed automatic control means at each installation are responsively coupled to an elapsed-time determining means for providing self-timed control of the execution of said functions.

20. A system as in claim 19 wherein said programmed automatic control means comprises a predetermined sequence of computer instructions utilizing a task-request determining memory table for storing signal manifestations indicative of the necessity of initiating the execution of selected ones of said functions.

21. A system as in claim 20 and further including a task-priority indicating memory table for indicating to said programmed control means the order of task-precedence when more than one task execution is requested by said task-request determining table.

22. A system as in claim 21 and further including a selectively variable task-priority memory table coupled to said programmed automatic control means for providing predetermined delay in execution of selected functions during periods of substantially high rates of function requests, thereby providing system function performance smoothing.

23. A system as in claim 18 and further including system malfunction indicating means responsively coupled to said manually selective control means to provide external indication of detected erroneous system operation.

24. A data processing system comprising:

at least two modular computers, independently operable to provide independent instruction sequences, each computer having a predetermined repertoire of instruction sequences, an input section, an output section, a programmable elapsed time-determining clock of incremental accuracy, at least one terminal portion for inter-computer signal transfers, an addressable memory means, monitoring means for completing data signal transfers between computers once initiated without program surveillance, said computers being assigned data signal manipulating and control tasks, each of said tasks having a predetermined priority rating with respect to the other tasks, a predetermined maximum period of delay between the time execution of the respective tasks may be requested and the time when response must be made, predetermined ones of said tasks being operative in real-time and other predetermined ones of said tasks being operative at computer operational rates, with predetermined ones of said tasks being periodic in required performance with the remainder of said tasks being performed on demand;

data signal transfer means joining said terminal portions for permitting monitored inter-computer signal transfers;

selectively alterable task-request determining indicators responsively actuated by each of said computers, said task-request determining indicators being arranged in order of said predetermined task priorities; and executive control means responsively actuated by cyclic interrogation of said task-request determining means to control initiation of execution of requested tasks in order of priority by determining that selected ones of said indicators are set thereby requiring task execution.

25. A system as in claim 24 wherein said executive control means comprises a predetermined sequence of computer instructions responsively coupled to said elapsed-time determining clock, said executive control means arranged for recurrently scanning said task-request determining indicators to initiate selected ones of said tasks when the signal composition magnitude of said elapsed-time determining clock and selected ones of said task-request determining indicators have a predetermined signal magnitude relationship; said control means further including sensing and indicating means responsive to the rate of task requests.

26. A system as in claim 25 wherein said predetermined signal value relationship operates to indicate the necessity of initiating a selected task when the signal composition magnitude of the task-request determining indicators is equal to or greater than the signal composition magnitude of said elapsed-time determining clock.

27. A system as in claim 25 and further including task-priority indicating means coupled to said executive control means to control the order of task execution when a plurality of said predetermined signal magnitude relationships are present.

28. A system as in claim 27 and further including a selectively variable task-priority means coupled to said executive control means to selectively provide predetermined periods of time delay in the execution of selected tasks during periods when said sensing and indicating means indicate that a period of substantially high rates of task-requests is present.

29. A system as in claim 24 and further including external entry means selectively operatively coupled to each computer to provide a predetermined interruption signal and to provide externally selectable overriding control signals to allow selective alteration of the sequence of operation of the interrupted computer, the interruption signal operating to halt the controlled initiation of requested task execution by said executive control means, said external entry means further being operative to provide overriding control of the sequence of operation of the interrupted computer.

30. A system as in claim 29 and further including master control means in each of said computers actuated by said interruption signal to provide predetermined evaluation of said externally selectable control signals, said evaluation operating to selectively initiate execution of said externally selected sequence of operation of said computer.

31. A system as in claim 30 wherein said master control means comprises a predetermined sequence of computer instructions responsively initiated by said interruption signal, and responsive to said externally selectable overriding control signals to initiate the externally selected sequence of operation of said computer.

32. A data processing system comprising:

two modular computers independently operable for providing independent instruction sequences, each computer having a predetermined repertoire of instructions, an input section, an output section, a programmable elapsed time-determining clock of incremental accuracy, a terminal portion for inter-computer signal transfers, an addressable internal memory, monitoring means for completing data signal transfers between computers once initiated without program surveillance, said computers having assigned data signal manipulating and control tasks, each of said tasks having a predetermined priority rating with respect to the other tasks, a predetermined maximum period of delay between the time execution of the task is requested and the time when response must be made, predetermined ones of said tasks requiring execution in real-time and other predetermined ones of said tasks requiring execution at computer operational rates, with predetermined ones of said tasks being periodic in required performance with the remainder of said tasks being performed on demand;

data signal transfer means joining said terminal portions for permitting monitored inter-computer signal transfers;

selectively alterable task-request determining means arranged in order of said predetermined task priorities and being actuatable by any one of said computers;

task-sequence initiating means arranged according to said predetermined task priorities;

predetermined task reoccurrence indicating means arranged in order of said predetermined task priorities;

each computer having executive control means for performing recurrent interrogation of said task-request determining means to control initiation of execution of requested tasks in order of priority by referencing said task-sequence initiating means in said predetermined priority order;

manual entry means selectively operatively coupled to each computer to provide a predetermined interruptions signal, the controlled initiation of requested task execution by said executive control means ceasing in response to said interruption signal, said manual entry means further providing externally selectable overriding control signals to allow selective alteration of the sequence of operation of the interrupted computer; and master control means responsive to said interruption signal and said control signals to selectively initiate execution of the manual entry means selected sequence of operation of said computer.

33. A program execution control for a digital computer for solving a plurality of separate tasks having varying degrees of solution urgency, each task having an assigned unique signal combination for identifying the task, comprising:

a plurality of registers for storing the task identifying signal combinations and the registers being arranged in an order of task priority;

control means for recurrently scanning the registers in order of said priority to selectively extract stored signal combinations;

task performing means responsive to the control means upon the extraction of a signal combination to perform the identified task; and the control means being operable for selectively inserting any desired signal combination in any register.

34. A program execution control as in claim 33 wherein said plurality of registers comprise:

a first group of registers for storing the unique signal combinations for identifying the respective tasks; and a second group of registers for storing unique signal groups for selectively determining which tasks are to be performed, said control means arranged for scanning said second group of registers and in response to an extracted signal group to extract signal combinations in a predetermined manner from said first group of registers for actuating the task performing means to perform the identified task.

35. A program execution control as in claim 33 wherein selected ones of said plurality of registers store similar signal combinations for identifying the same task and being arranged in predetermined priority position order, said control means including means for monitoring and indicating the rate of task performance for each task identified in the registers, said control means responsively coupled to said registers for extracting a selected one of said similar signal combinations according to then indicated task-rate performance thereby providing selectively variable priority of execution of selected tasks.

36. A program execution control as in claim 35 wherein said similar signal combinations are stored in a first group of registers for identifying the respective tasks, and further including a second group of registers for storing a second set of signals for selectively indicating the allowable time of delay for performing the selected tasks, said signals being arranged in identical priority order as said first group of registers.

37. A control system for selectively altering the predetermined automatic sequence of operation of a programmable computer comprising:

external entry means coupled to said computer to provide an interruption signal, and selectively determined overriding control signals for directing the computer operation, said interruption signal being operative to interrupt the predetermined automatic sequence of operation; and master control means responsive to said control signals to selectively initiate execution of the external entry means selected computer operation.

38. A control system as in claim 37 wherein said master control means comprises control circuits for executing a programmed sequence of computer instructions, said circuits actuated in response to said interrupt signal to initiate execution of the externally selected computer operation according to evaluation of said selectively determined overriding control signals by said program of instructions.

39. A data processing system comprising:

a plurality of programmable modular computers, each having addressable storage means for storing data signal groupings and instruction signal sequences indicative of predetermined operable programs, independently operable means for executing predetermined data signal manipulating and control tasks in accordance with selected ones of said stored instruction sequences, and each of said computers also including programmable elapsed-time determining means for providing elapsed-time indicating manifestations;

communications means, including means for reading and recording signals directly in said addressable storage means, intermediate each of said computers and responsive thereto for providing computer controlled and monitored transfer of signals between programmably selectable ones of said storage means; and executive control means within each modular computer coupled to said elapsed-time determining means and responsive at least in part thereto, for selecting the ordered execution of ones of said predetermined instruction sequences, thereby controlling the order of performance of the predetermined tasks.

40. A data processing system as in claim 39 wherein the programmable elapsed-time determining means comprises a directly referenceable and programmably alterable clock-register for determining actual time, said clock-register having a predetermined period of incremental accuracy.

41. A data processing system as in claim 39 wherein said modular computers are arranged in a plurality of groups, each of said groups comprising a predetermined number of modular computers, and said groups being substantially independent from one another.

42. A data processing system as in claim 41 wherein each of said groups includes control means, said control means being substantially operative for causing the respective groups to appear and effectively operate as a unitary data processing system with respect to the remainder of said groups.

43. A data processing system as in claim 42, wherein each of said plurality of groups comprises at least two modular computers, each of said groups having intercomputer data signal transferring means for transferring data signals therebetween.

44. A data processing system as in claim 39 wherein the plurality of modular computers are arranged in a plurality of substantially independently operable groups, and further including:

inter-group communications control means operable with each group of modular computers to initiate and provide surveillance of inter-group data-transfers; and inter-computer data-transfer control means operable with each of the modular computers to initiate and provide surveillance of data-transfers between computers that comprise the respective groups.

45. A data processing system as in claim 44 wherein said inter-group communications control means comprises:

data-transfer initiating means; and data-transfer control means responsively coupled to said elapsed-time determining means to limit the period of data-transfer.

46. A data processing system as in claim 44 wherein said inter-computer data-transfer control means comprises:

data-transfer interconnection means coupling said modular computers comprising the respective groups;

data-transfer initiation means responsively coupled to said elapsed-time determining means for selectively determining the time of initiation of said data-transfers;

data-transfer duration determining means operative in the transferring computer to inform the receiving computer of the extent of said data-transfer; and monitoring means operative with said transferring computer for determining the duration of said data-transfer.

47. A data processing system as in claim 39 wherein said executive control means comprises interrogating means responsively coupled to task execution requesting means for providing control signals indicative of the necessity of performing the requested tasks.

48. A data processing system as in claim 47 and further including a task priority determining means for providing selectively operable control of the order of performance of tasks requiring substantially simultaneous execution.

49. A data processing system comprising:

a plurality of programmable modular computers each having addressable storage means for storing data signal groupings and instruction signal sequences indicative of predetermined operable programs, arithmetic means for performing computations in accordance with said instructions, independently operable control means for reading instructions from said memory in a predetermined order and performing the designated operations for executing the instructions, and programmable elapsed-time determining means for providing manifestations indicative of elapsed time, where each of said computers is assigned to perform predetermined data signal manipulating and control tasks in accordance with respective ones of said instruction signal sequences;

communication means, including means for reading and recording signals directly in said addressable storage means, intermediate each of said computers and responsive thereto for providing computer controlled and monitored transfer of signals between programmably selectable ones of said storage means; and executive control means within each of said modular computers coupled to said elapsed-time determining means and responsive at least in part thereto, for selecting the ordered execution of ones of said predetermined instruction sequences, thereby controlling the order of performance of the assigned tasks.

References Cited

UNITED STATES PATENTS

| | | | |
|---|---|---|---|
| 2,910,238 | 10/1959 | Miles et al. | 340—172.5 |
| 2,946,986 | 7/1960 | Harrison | 340—172.5 |
| 3,067,937 | 12/1962 | Hinkein et al. | 235—157 |
| 3,056,110 | 9/1962 | Cysper | 340—172.5 |
| 3,061,192 | 10/1962 | Terzian | 235—157 |
| 3,094,610 | 6/1963 | Humphrey | 235—157 |
| 3,106,698 | 10/1963 | Unger | 340—172.5 |

OTHER REFERENCES

Proceedings of the Eastern Joint Computer Conference, Dec. 1–3, 1959, pp. 101–107, paper on The System Organization of MOBIDIC B by Chas.

Pilot, A New Multiple Computer System by Leiner et al., Journal of the Association for Computing Machinery, July 1959, pp. 313–335.

PAUL J. HENON, *Acting Primary Examiner.*

K. CLAFFY, CHESTER L. JUSTUS, *Examiners.*